(12) United States Patent
Singh et al.

(10) Patent No.: US 11,687,762 B2
(45) Date of Patent: Jun. 27, 2023

(54) ACCELERATION UNIT FOR A DEEP LEARNING ENGINE

(71) Applicants: STMICROELECTRONICS S.R.L., Agrate Brianza (IT); STMICROELECTRONICS INTERNATIONAL N.V., Schiphol (NL)

(72) Inventors: Surinder Pal Singh, Noida (IN); Thomas Boesch, Rovio (CH); Giuseppe Desoli, San Fermo Della Battaglia (IT)

(73) Assignees: STMICROELECTRONICS S.r.l., Agrate Brianza (IT); STMICROELECTRONICS INTERNATIONAL N.V., Schiphol (NL)

( * ) Notice: Subject to any disclaimer, the term of this patent is extended or adjusted under 35 U.S.C. 154(b) by 1164 days.

(21) Appl. No.: 16/280,991

(22) Filed: Feb. 20, 2019

(65) Prior Publication Data
US 2019/0266479 A1    Aug. 29, 2019

Related U.S. Application Data

(60) Provisional application No. 62/636,022, filed on Feb. 27, 2018.

(51) Int. Cl.
*G06N 3/063* (2023.01)
*G06F 17/17* (2006.01)
(Continued)

(52) U.S. Cl.
CPC ............... *G06N 3/063* (2013.01); *G06F 1/26* (2013.01); *G06F 17/16* (2013.01); *G06F 17/175* (2013.01);
(Continued)

(58) Field of Classification Search
None
See application file for complete search history.

(56) References Cited

U.S. PATENT DOCUMENTS 5,768,613 A    6/1998 Asghar
9,436,637 B2   9/2016 Kommanaboyina
(Continued)

FOREIGN PATENT DOCUMENTS

CN   101739241 A    6/2010
CN   104484703 A    4/2015
(Continued)

OTHER PUBLICATIONS

'Microcontroller Based Maximum Power Point Tracking Through FCC and MLP Neural Networks' by Gabriele Maria Lozito et al., from Proceedings of the 6th European Embedded Design in Education and Research, 2014. (Year: 2014).*
(Continued)

*Primary Examiner* — Steven G Snyder
(74) *Attorney, Agent, or Firm* — Seed Intellectual Property Law Group LLP

(57) ABSTRACT

Embodiments of a device include an integrated circuit, a reconfigurable stream switch formed in the integrated circuit along with a plurality of convolution accelerators and an arithmetic unit coupled to the reconfigurable stream switch. The arithmetic unit has at least one input and at least one output. The at least one input is arranged to receive streaming data passed through the reconfigurable stream switch, and the at least one output is arranged to stream resultant data through the reconfigurable stream switch. The arithmetic unit also has a plurality of data paths. At least one of the plurality of data paths is solely dedicated to performance of
(Continued)

operations that accelerate an activation function represented in the form of a piece-wise second order polynomial approximation.

20 Claims, 25 Drawing Sheets

(51) Int. Cl.
　　　*G06N 20/00*　　　(2019.01)
　　　*G06F 1/26*　　　(2006.01)
　　　*G06F 17/16*　　　(2006.01)
　　　*G06N 3/045*　　　(2023.01)
　　　*G06N 3/08*　　　(2023.01)
(52) U.S. Cl.
　　　CPC ............... *G06N 3/045* (2023.01); *G06N 3/08* (2013.01); *G06N 20/00* (2019.01)

(56) References Cited

U.S. PATENT DOCUMENTS

| | | | |
|---|---|---|---|
| 9,779,786 B1 | 10/2017 | Wu et al. | |
| 9,978,014 B2 | 5/2018 | Lupon et al. | |
| 10,366,050 B2 | 7/2019 | Henry et al. | |
| 10,372,456 B2 | 8/2019 | Fowers et al. | |
| 10,402,527 B2 | 9/2019 | Boesch et al. | |
| 10,657,668 B2 | 5/2020 | Hassan et al. | |
| 10,949,736 B2 | 3/2021 | Deisher et al. | |
| 11,227,086 B2 | 1/2022 | Boesch et al. | |
| 11,270,201 B2 | 3/2022 | Sridharan et al. | |
| 2012/0303932 A1 | 11/2012 | Farabet et al. | |
| 2014/0032465 A1* | 1/2014 | Modha .................... | G06N 3/04 706/27 |
| 2015/0170021 A1 | 6/2015 | Lupon et al. | |
| 2015/0212955 A1 | 7/2015 | Easwaran | |
| 2015/0278596 A1 | 10/2015 | Kilty et al. | |
| 2016/0379109 A1 | 12/2016 | Chung et al. | |
| 2017/0169315 A1 | 6/2017 | Vaca Castano et al. | |
| 2018/0046458 A1 | 2/2018 | Kuramoto | |
| 2018/0121796 A1* | 5/2018 | Deisher ................. | G06N 3/0472 |
| 2018/0144214 A1 | 5/2018 | Hsieh et al. | |
| 2018/0189229 A1 | 7/2018 | Desoli et al. | |
| 2018/0189641 A1 | 7/2018 | Boesch et al. | |
| 2018/0189642 A1 | 7/2018 | Boesch et al. | |
| 2018/0315155 A1 | 11/2018 | Park et al. | |
| 2019/0042868 A1 | 2/2019 | Oesterreicher et al. | |
| 2019/0155575 A1* | 5/2019 | Langhammer .......... | G06F 7/483 |
| 2019/0205746 A1 | 7/2019 | Nurvitadhi et al. | |
| 2019/0205758 A1 | 7/2019 | Zhu et al. | |
| 2019/0251429 A1 | 8/2019 | Du et al. | |
| 2019/0266479 A1 | 8/2019 | Singh et al. | |
| 2019/0266485 A1 | 8/2019 | Singh et al. | |
| 2019/0266784 A1 | 8/2019 | Singh et al. | |
| 2019/0354846 A1 | 11/2019 | Mellempudi et al. | |
| 2019/0370631 A1* | 12/2019 | Fais .......................... | G06F 8/31 |
| 2020/0133989 A1 | 4/2020 | Song et al. | |
| 2020/0234137 A1 | 7/2020 | Chen et al. | |
| 2020/0272779 A1 | 8/2020 | Boesch et al. | |
| 2021/0073450 A1 | 3/2021 | Boesch et al. | |
| 2021/0073569 A1 | 3/2021 | Gao et al. | |
| 2021/0192833 A1 | 6/2021 | Singh et al. | |
| 2021/0240440 A1* | 8/2021 | Langhammer ........ | G06F 7/5443 |
| 2021/0256346 A1 | 8/2021 | Desoli et al. | |
| 2022/0121928 A1* | 4/2022 | Dong ...................... | H04L 49/25 |
| 2022/0188072 A1* | 6/2022 | Langhammer .......... | H04L 9/008 |

FOREIGN PATENT DOCUMENTS

| | | | | |
|---|---|---|---|---|
| CN | 105488565 A | | 4/2016 | |
| CN | 106650655 A | | 5/2017 | |
| CN | 110214309 A | * | 9/2019 | ......... G06F 13/1689 |
| EP | 3346423 A1 | | 7/2018 | |
| EP | 3346424 A1 | | 7/2018 | |
| EP | 3346427 A1 | | 7/2018 | |
| EP | 3 480 740 A1 | | 5/2019 | |
| JP | 2002183111 A | * | 6/2002 | |
| KR | 10-1947782 B1 | | 2/2019 | |
| WO | 2019/227322 A1 | | 5/2019 | |

OTHER PUBLICATIONS

'Analysis of Function of Rectified Linear Unit Used in Deep Learning' by Hara et al., 2015. (Year: 2015).*
'FPGA Implementations of Feed Forward Neural Network by using Floating Point Hardware Accelerators' by Lozito et al., 2014 Advances in Electrical and Electronic Engineering. (Year: 2014).*
'Fast-Track to Second Order Polynomials' by Antonio Sodre, 2011. (Year: 2011).*
'FpgaConvNet: A Framework for Mapping Convolutional Neural Networks on FPGAs' by Stylianos I. Venieris et al., 2016 IEEE 24th Annual International Symposium on Field-Programmable Custom Computing Machines. (Year: 2016).*
Brownlee, "A Gentle Introduction to Pooling Layers for Convolutional Neural Networks," published online Apr. 22, 2019, downloaded from https://machinelearningmastery.com/pooling-layers-for-convolutional-neural-networks/ on Dec. 11, 2019, 19 pages.
Choudhary et al., "NETRA: A Hierarchical and Partitionable Architecture for Computer Vision Systems," *IEEE Transactions on Parallel and Distributed Systems* 4(10):1092-1104, 1993.
Cook, "Global Average Pooling Layers for Object Localization," published online Apr. 9, 2019, downloaded from https://alexisbcook.github.io/2017/global-average-pooling-layers-for-object-localization/ on Dec. 11, 2019, 14 pages.
Desoli et al., "14.1: A 2.9TOPS/W Deep Convolutional Neural Network SoC in FD-SOI 28nm for Intelligent Embedded Systems," *IEEE International Solid-State Circuits Conference (ISSCC)*, San Francisco, California, Feb. 5-9, 2017, pp. 238-239, (3 pages).
Du et al., "ShiDianNao: Shifting Vision Processing Closer To The Sensor," *2015 ACM/IEEE 42nd Annual International Symposium on Computer Architecture (ISCA)*, Portland, Oregon, Jun. 13-17, 2015, pp. 92-104.
Gokhale et al., "A 240 G-ops/s Mobile Coprocessor for Deep Neural Networks (Invited Paper)," *The IEEE Conference on Computer Vision and Pattern Recognition (CVPR) Workshop*, Columbus, Ohio, Jun. 23-28, 2014, pp. 696-701.
Graf et al., "A Massively Parallel Digital Learning Processor," *Advances in Neural Information Processing Systems (NIPS)*, pp. 529-536, 2009.
Jagannathan et al., "Optimizing Convolutional Neural Network on DSP," IEEE International Conference on Consumer Electronics, Jan. 7-11, 2016, Las Vegas, Nevada, pp. 371-372.
Lin et al., "Network In Network," *arXiv:1312.4400v3 [cs.NE]*, Mar. 4, 2014, 10 pages.
Meloni et al., "A High-Efficiency Runtime Reconfigurable IP for CNN Acceleration on a Mid-Range All-Programmable SoC," *International Conference on ReConFigurable Computing and FPGAs (ReConFig)*, Nov. 30-Dec. 2, 2016, Cancun, Mexico, 8 pages.
Moctar et al., "Routing Algorithms for FPGAS with Sparse Intra-Cluster Routing Crossbars," *22nd International Conference on Field Programmable Logic and Applications (FPL)*, Aug. 29-31, 2012, Oslo, Norway, pp. 91-98.
NVIDIA Deep Learning Accelerator, "NVDLA," downloaded from http://nvdla.org/ on Dec. 12, 2019, 5 pages.
Stenström, "Reducing Contention in Shared-Memory Multiprocessors," *Computer* 21(11):26-37, 1988.
Stoutchinin et al., "Optimally Scheduling CNN Convolutions for Efficient Memory Access," *IEEE Transactions on Computer-Aided Design of Integrated Circuits And Systems*, Feb. 4, 2019, 14 pages.
Tsang, "Review: DeconvNet—Unpooling Layer (Semantic Segmentation)," published online Oct. 8, 2018, downloaded from https://towardsdatascience.com/review-deconvnet-unpooling-layer-semantic-segmentation-55cf8a6e380e on Dec. 12, 2019, 7 pages.
UFLDL Tutorial, "Pooling," downloaded from http://deeplearning.stanford.edu/tutorial/supervised/Pooling/ on Dec. 12, 2019, 2 pages.
Wikipedia, "Convolutional neural network," downloaded from https://en.wikipedia.org/wiki/Computer_vision on Dec. 12, 2019, 29 pages.

(56) References Cited

OTHER PUBLICATIONS

GitHub, "Building a quantization paradigm from first principles," URL=https://github.com/google/gemmlowp/blob/master/doc/quantization.md, download date Jul. 29, 2021, 7 pages.
GitHub, "The low-precision paradigm in gemmlowp, and how it's implemented," URL=https://github.com/google/gemmlowp/blob/master/doc/low-precision.md#efficient-handling-of-offsets, download date Jul. 29, 2021, 4 pages.
Kiningham, K. et al., "Design and Analysis of a Hardware CNN Accelerator," Stanford University, 2017, 8 pages.
Zhong, K. et al., "Exploring the Potential of Low-bit Training of Convolutional Neural Networks," *IEEE Transactions on Computer-Aided Design of Intergrated Circuits and Systems*, arXiv:2006.02804, version 4, p. 1-13.
U.S. Appl. No. 16/280,960, filed Feb. 20, 2019, Arithmetic Unit for Deep Learning Acceleration.
U.S. Appl. No. 16/280,963, filed Feb. 20, 2019, Data Volume Sculptor for Deep Learning Acceleration.
Bhatele et al (Ed)., *Programming and Performance Visualization Tools*, Springer Publishing, New York, New York, 2018, pp. 74-89, Pradelle et al., "Polyhedral Optimization of TensorFlow Computation Graphs," 7 pages.
Blanc-Talon et al (Ed)., *Advanced Concepts for Intelligent Vision Systems*, Springer International Publishing, New York, New York, 2016, pp. 217-227, Desoli et al., "The Orlando Project: A 28nm FD-SOI Low Memory Embedded Neural Network ASIC".
Chen et al., "A High-Throughput Neural Network Accelerator," *IEEE Micro*, 35:24-32, 2015.
Chen et al., "DaDianNao: A Machine-Learning Supercomputer," 47th Annual IEEE/ACM International Symposium on Microarchitecture, Cambridge, United Kingdom, Dec. 13-17, 2014, pp. 609-622.
Chen et al., "Eyeriss: An Energy-Efficient Reconfigurable Accelerator for Deep Convolutional Neural Networks," IEEE International Solid-State Circuits Conference, San Francisco, California, Jan. 31-Feb. 4, 2016, pp. 262-264.
Dai et al., "Deformable Convolutional Networks," PowerPoint Presentation, International Conference on Computer Vision, Venice, Italy, Oct. 22-Oct. 29, 2017, 17 pages.
Dai et al., "Deformable Convolutional Networks," *Proceedings of the IEEE International Conference on Computer Vision* :264-773, 2017.
Desoli et al., "A 2.9TOPS/W Deep Convolutional Neural Network SoC in FD-SOI 28nm for Intelligent Embedded Systems," IEEE International Solid-State Circuits Conference, San Francisco, California, Feb. 5-9, 2017, pp. 238-240.
Erdem et al., "Design Space Exploration for Orlando Ultra Low-Power Convolutional Neural Network SoC," IEEE 29th International Conference on Application-specific Systems, Architectures and Processors, Milan, Italy, Jul. 10-12, 2018, 7 pages.
Han et al., "Deep Compression: Compressing Deep Neural Networks with Pruning, Trained Quantization and Huffman Coding," International Conference on Learning Representations, San Juan, Puerto Rico, May 2-4, 2016, 14 pages.
Hou et al., "An End-to-end 3D Convolutional Neural Network for Action Detection and Segmentation in Videos," *Journal of Latex Class Files* 14(8):2015, 15 pages.
Hou et al., "Tube Convolutional Neural Network (T-CNN) for Action Detection in Videos," International Conference on Computer Vision, Venice Italy, Oct. 22-29, 2017, pp. 5822-5831.
Hu et al., "MaskRNN: Instance Level Video Object Segmentation," 31st Conference on Neural Information Processing Systems, Long Beach, California, Dec. 4-9, 2017, 10 pages.

Jouppi et al., "In-Datacenter Performance Analysis of a Tensor Processing Unit," 44th International Symposium on Computer Architecture, Toronto, Canada, Jun. 26, 2017, 17 pages.
Kang et al., "T-CNN: Tubelets with Convolutional Neural Networks for Object Detection from Videos," *arXiv:1604.02532*: Aug. 2017, 12 pages.
Krizhevsky et al., "ImageNet Classification with Deep Convolutional Neural Networks," *Proceedings of the 25th International Conference on Neural Information Processing Systems* 1:1097-1105, 2012 (9 pages).
Lascorz et al., "Tartan: Accelerating Fully-Connected and Convolutional Layers in Deep Learning Networks by Exploiting Numerical Precision Variability," *arXiv:1707.09068v1*:Jul. 2017, 12 pages.
LeCun et al., "Gradient-Based Learning Applied to Document Recognition," *Proceedings of the IEEE* 86(1):2278-2324, 1998.
Lin et al., "A Digital Circuit of Hyperbolic Tangent Sigmoid Function for Neural Networks," IEEE International Symposium on Circuits and Systems, Seattle, Washington, May 18-21, 2008, pp. 856-859.
Merritt, "AI Silicon Gets Mixed Report Card," EE Times, published online Jan. 4, 2018, downloaded from https://www.eetimes.com/document.asp?doc_id=1332799&print=yes on Jan. 15, 2018, 3 pages.
Redmon, "YOLO: Real-Time Object Detection," archived on Jan. 9, 2018, downloaded from https://web.archive.org/web/20180109074144/https://pjreddie.com/darknet/yolo/ on Jul. 23, 2019, 11 pages.
Ren et al., "Faster R-CNN: Towards Real-Time Object Detection with Region Proposal Networks," *arXiv:1506.01497v3*, Jan. 2016, 14 pages.
Salakhutdinov et al., "A Better Way to Pretrain Deep Boltzmann Machines," Advances in Neural Processing Systems 25, Lake Tahoe, Nevada, Dec. 3-8, 2012, 9 pages.
Scardapane et al., "Kafhets: kernel-based non-parametric activation functions for neural networks," arXiv:1707.04035v2, Nov. 2017, 35 pages.
Sim et al., "A 1.42TOPS/W Deep Convolutional Neural Network Recognition Processor for Intelligent IoE Systems," International Solid-State Circuits Conference, San Francisco, Californai, Jan. 31-Feb. 4, 2016, pp. 264-266.
Simonyan et al., "Very Deep Convolutional Networks for Large-Scale Image Recognition," International Conference on Learning Representations, San Diego, California, May 7-9, 2015, 14 pages.
TensorFlow "How to Quantize Neural Networks with TensorFlow," Downloaded on Jul. 23, 2019 from https://web.archive.org/web/20170925162122/https://www.tensorflow.org/performance/quantization, archived on Sep. 25, 2017, 10 pages.
Vassiliadis et al., "Elementary Function Generators for Neural-Network Emulators," *IEEE Transactions on Neural Networks* 11(6):1438-1449, 2000.
Vu et al., "Tube-CNN: Modeling temporal evolution of appearance for objest detection in video," *arXiv:1812.02619v1*, Dec. 2018, 14 pages.
Wang et al (Ed)., *Advances in Neural Networks*, Springer Verlag, Berlin, Germany, 2006, pp. 1319-1327, Larkin et al., "An Efficient Hardware Architecture for a Neural Network Activation Fucntion Generator".
Wang et al., "DLAU: A Scalable Deep Learning Accelerator Unit on FPGA," *IEEE Transactions on Computer-Aided Design of Integrated Circuits and Systems* 36(3):2017, 5 pages.
Xu et al., "R-C3D: Region Convolutional 3D Network for Temporal Activity Detection," *arXiv:1703.07814v2*, Aug. 2017, 10 pages.

\* cited by examiner

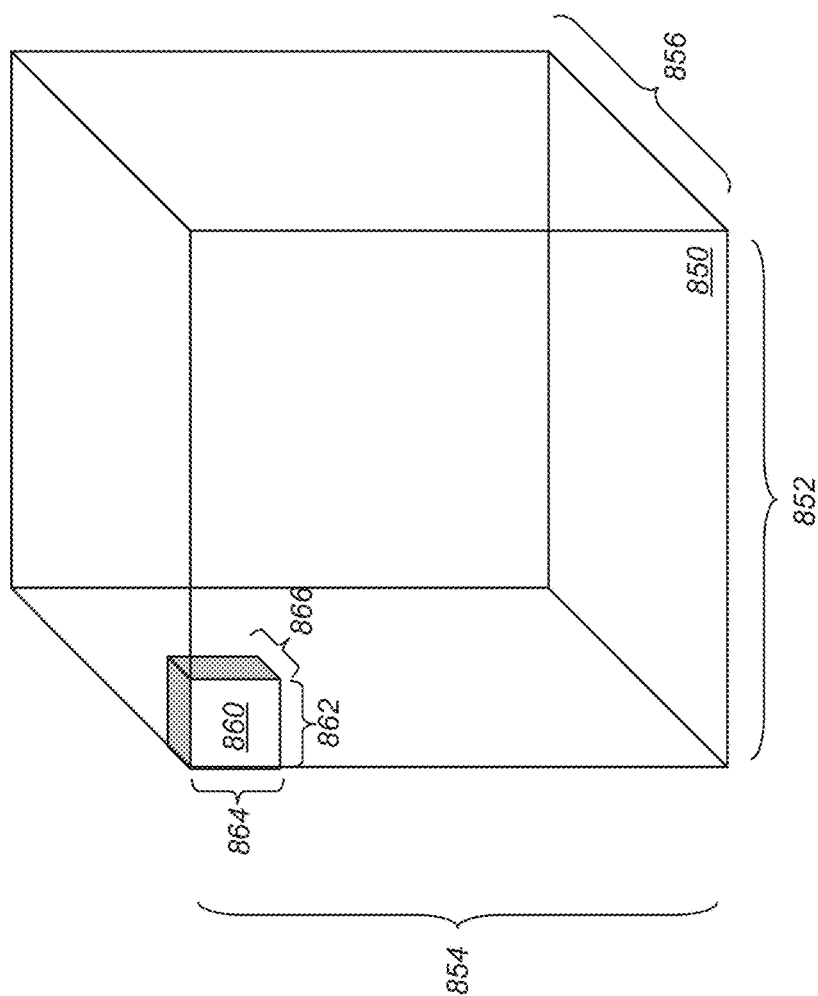

ACCELERATION UNIT FOR A DEEP LEARNING ENGINE

BACKGROUND

Technical Field

The present disclosure generally relates to structures that improve flexibility, data locality, and faster execution of deep machine learning systems, for example in convolutional neural networks (CNN). More particularly, but not exclusively, the present disclosure relates to an activation function accelerator for a deep learning acceleration engine.

Description of the Related Art

Known computer vision, speech recognition, and signal processing applications benefit from the use of learning machines. Learning machines discussed in this disclosure may fall under the technological titles of machine learning, artificial intelligence, neural networks, probabilistic inference engines, accelerators, and the like. Such machines are arranged to quickly perform hundreds, thousands, and millions of concurrent operations. Conventional learning machines can deliver hundreds of TeraFlops (i.e., one million millions ($10^{12}$) floating-point operations per second) of computing power.

In some cases, learning machines are organized as deep convolutional neural networks (DCNN). A seminal work in the DCNN arts is "Gradient-Based Learning Applied To Document Recognition," by Y. LeCun et al., Proceedings of the IEEE, vol. 86, no. 11, pp. 2278-2324, 1998, which led to winning the 2012 ImageNet Large Scale Visual Recognition Challenge with "AlexNet." AlexNet, as described in "ImageNet Classification With Deep Convolutional Neural Networks," by Krizhevsky, A., Sutskever, I., and Hinton, G., NIPS, pp. 1-9, Lake Tahoe, Nev. (2012), is a DCNN that significantly outperformed classical approaches for the first time.

A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer.

For example, if a plurality of two-dimensional pictures of faces is provided as input to a DCNN, the DCNN will learn a variety of characteristics of faces such as edges, curves, angles, dots, color contrasts, bright spots, dark spots, etc. These one or more features are learned at one or more first layers of the DCNN. Then, in one or more second layers, the DCNN will learn a variety of recognizable features of faces such as eyes, eyebrows, foreheads, hair, noses, mouths, cheeks, etc.; each of which is distinguishable from all of the other features. That is, the DCNN learns to recognize and distinguish an eye from an eyebrow or any other facial feature. In one or more third and then subsequent layers, the DCNN learns entire faces and higher order characteristics such as race, gender, age, emotional state, etc. The DCNN is even taught in some cases to recognize the specific identity of a person. For example, a random image can be identified as a face, and the face can be recognized as Orlando Bloom, Andrea Bocelli, or some other identity.

In other examples, a DCNN can be provided with a plurality of pictures of animals, and the DCNN can be taught to identify lions, tigers, and bears; a DCNN can be provided with a plurality of pictures of automobiles, and the DCNN can be taught to identify and distinguish different types of vehicles; and many other DCNNs can also be formed. DCNNs can be used to learn word patterns in sentences, to identify music, to analyze individual shopping patterns, to play video games, to create traffic routes, and DCNNs can be used for many other learning-based tasks too.

Figure 1E:
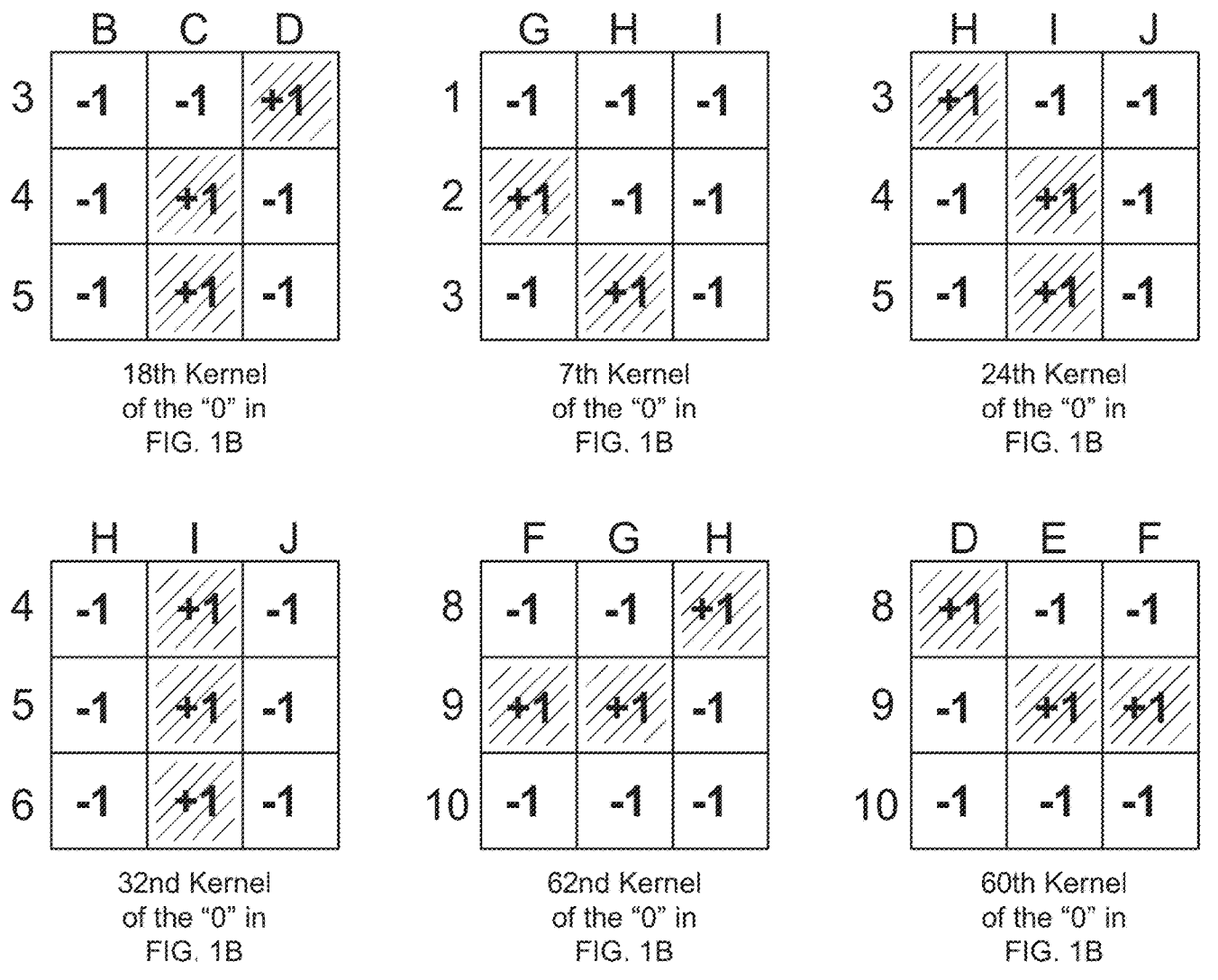
Figure 1I:
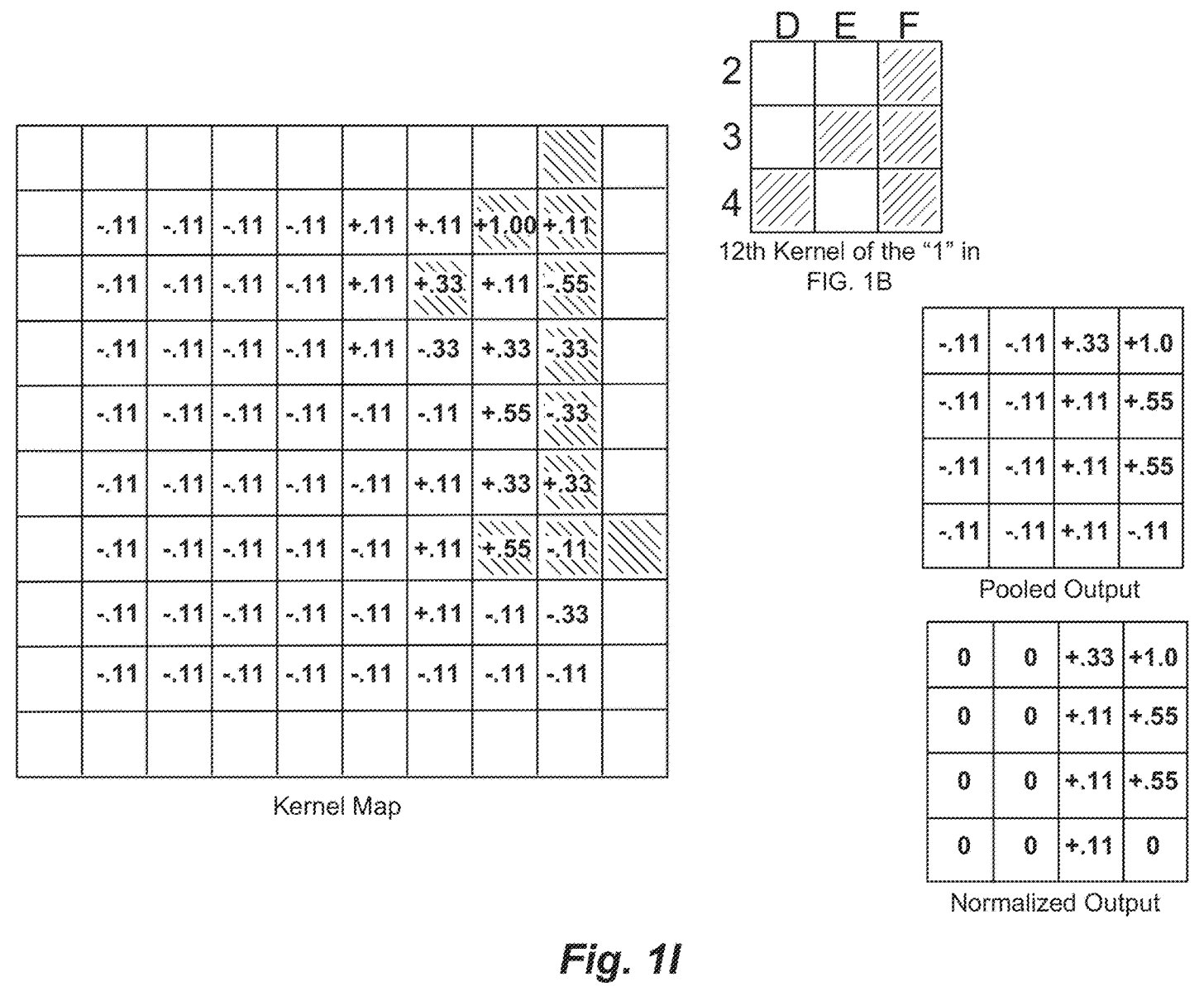

FIGS. 1A-1J may collectively be referred to herein as FIG. 1.

FIG. 1A is a simplified illustration of a convolutional neural network (CNN) system 10. In the CNN system, a two-dimensional array of pixels is processed by the CNN. The CNN analyzes a 10×10 input object plane to determine if a "1" is represented in the plane, if a "0" is represented in the plane, or if neither a "1" nor a "0" is implemented in the plane.

In the 10×10 input object plane, each pixel is either illuminated or not illuminated. For the sake of simplicity in illustration, illuminated pixels are filled in (e.g., dark color) and unilluminated pixels are not filled in (e.g., light color).

FIG. 1B illustrates the CNN system 10 of FIG. 1A determining that a first pixel pattern illustrates a "1" and that a second pixel pattern illustrates a "0." In the real world, however, images do not always align cleanly as illustrated in FIG. 1B.

In FIG. 1C, several variations of different forms of ones and zeroes are shown. In these images, the average human viewer would easily recognize that the particular numeral is translated or scaled, but the viewer would also correctly determine if the image represented a "1" or a "0." Along these lines, without conscious thought, the human viewer looks beyond image rotation, various weighting of numerals, sizing of numerals, shifting, inversion, overlapping, fragmentation, multiple numerals in the same image, and other such characteristics. Programmatically, however, in traditional computing systems, such analysis is very difficult. A variety of image matching techniques are known, but this type of analysis quickly overwhelms the available computational resources even with very small image sizes. In contrast, however, a CNN system 10 can correctly identify ones, zeroes, both ones and zeroes, or neither a one nor a zero in each processed image with an acceptable degree of accuracy even if the CNN system 10 has never previously "seen" the exact image.

FIG. 1D represents a CNN operation that analyzes (e.g., mathematically combines) portions of an unknown image with corresponding portions of a known image. For example, a 3-pixel portion of the left-side, unknown image B5-C6-D7 may be recognized as matching a corresponding 3-pixel portion of the right-side, known image C7-D8-E9. In these and other cases, a variety of other corresponding pixel arrangements may also be recognized. Some other correspondences are illustrated in Table 1.

TABLE 1

| Corresponding known to unknown images segments | |
|---|---|
| FIG. 1D<br>Left-side, unknown image | FIG. 1D<br>Right-side, known image |
| C3-B4-B5<br>C6-D7-E7-F7-G6<br>E1-F2<br>G2-H3-H4-H5 | D3-C4-C5<br>D8-E9-F9-G9-H8<br>G2-H3<br>H3-I4-I5-I6 |

Recognizing that segments or portions of a known image may be matched to corresponding segments or portions of an unknown image, it is further recognized that by unifying the portion matching operation, entire images may be processed in the exact same way while achieving previously uncalculated results. Stated differently, a particular portion size may be selected, and a known image may then be analyzed portion-by-portion. When a pattern within any given portion of a known image is mathematically combined with a similarly sized portion of an unknown image, information is generated that represents the similarity between the portions.

FIG. 1E illustrates six portions of the right-side, known image of FIG. 1D. Each portion, also called a "kernel," is arranged as a 3-pixel-by-3-pixel array. Computationally, pixels that are illuminated are represented mathematically as a positive "1" (i.e., +1); and pixels that are not illuminated are represented mathematically as a negative "1" (i.e., −1). For the sake of simplifying the illustration in FIG. 1E, each illustrated kernel is also shown with the column and row reference of FIG. 1D.

The six kernels shown in FIG. 1E are representative and selected for ease of understanding the operations of CNN system 10. It is clear that a known image can be represented with a finite set of overlapping or non-overlapping kernels. For example, considering a 3-pixel-by-3-pixel kernel size and a system of overlapping kernels having a stride of one (1), each 10×10 pixel image may have 64 corresponding kernels.

A first kernel spans the 9 pixels in columns A, B, C, and rows 1, 2, 3.

A second kernel spans the 9 pixels in columns B, C, D, and rows 1, 2, 3.

A third kernel spans the 9 pixels in columns C, D, E, and rows 1, 2, 3.

This pattern of kernels continues until an eighth kernel spans the 9 pixels in columns H, I, J, and rows 1, 2, 3.

Kernel alignment continues in this way until a $57^{th}$ kernel spans columns A, B, C, and rows 8, 9, 10, and so on until a $64^{th}$ kernel spans columns H, I, J, and rows 8, 9, 10.

In other CNN systems, kernels may be overlapping or not overlapping, and kernels may have strides of 2, 3, or some other number. The different strategies for selecting kernel sizes, strides, positions, and the like are chosen by a CNN system designer based on past results, analytical study, or in some other way.

Returning to the example of FIGS. 1D and 1E, a total of 64 kernels are formed using information in the known image. The first kernel starts with the upper-most, left-most 9 pixels in a 3×3 array. The next seven kernels are sequentially shifted right by one column each. The ninth kernel returns back to the first three columns and drops down to the second row, similar to the carriage return operation of a text-based document, which concept is derived from a twentieth-century manual typewriter. In following this pattern, FIG. 1E shows the $7^{th}$, $18^{th}$, $24^{th}$, $32^{nd}$, $60^{th}$ and $62^{nd}$ kernels of the 10×10 image in FIG. 1D(b).

Sequentially, or in some other known pattern, each kernel of the known image is aligned with a correspondingly sized set of pixels of the image under analysis. In a fully analyzed system, for example, the first kernel of the known image is conceptually overlaid on the unknown image in each of the kernel positions. Considering FIGS. 1D and 1E, the first kernel is conceptually overlaid on the unknown image in the position of Kernel No. 1 (left-most, top-most portion of the image), then the first kernel is conceptually overlaid on the unknown image in the position of Kernel No. 2, and so on, until the first kernel is conceptually overlaid on the unknown image in the position of Kernel No. 64 (bottom-most, right-most portion of the image). The procedure is repeated for each of the 64 kernels, and a total of 4096 operations are performed (i.e., 64 kernels in each of 64 positions). In this way, it is also shown that when other CNN systems select different kernel sizes, different strides, and different patterns of conceptual overlay, then the number of operations will change.

In the CNN system 10, the conceptual overlay of each kernel on each portion of an unknown image under analysis is carried out as a mathematical process called convolution. Each of the nine pixels in a kernel is given a value of positive "1" (+1) or negative "1" (−1) based on whether the pixel is illuminated or unilluminated, and when the kernel is overlaid on the portion of the image under analysis, the value of each pixel in the kernel is multiplied by the value of the corresponding pixel in the image. Since each pixel has a value of +1 (i.e., illuminated) or −1 (i.e., unilluminated), the multiplication will always result in either a +1 or a −1. Additionally, since each of the 4096 kernel operations is processed using a 9-pixel kernel, a total of 36,864 mathematical operations (i.e., 9×4096) are performed at this first stage of a single unknown image analysis in a very simple CNN. Clearly, even simple CNN systems require tremendous computational resources, and the computational requirements for more complex CNN systems grow exponentially.

As just described, each of the 9 pixels in a kernel is multiplied by a corresponding pixel in the image under analysis. An unilluminated pixel (−1) in the kernel, when multiplied by an unilluminated pixel (−1) in the subject unknown image will result in a +1 indicated a "match" at that pixel position (i.e., both the kernel and the image have an unilluminated pixel). Similarly, an illuminated pixel (+1) in the kernel multiplied by an illuminated pixel (+1) in the unknown image also results in a match (+1). On the other hand, when an unilluminated pixel (−1) in the kernel is multiplied by an illuminated pixel (+1) in the image, the result indicates no match (−1) at that pixel position. And when an illuminated pixel (+1) in the kernel is multiplied by an unilluminated pixel (−1) in the image, the result also indicates no match (−1) at that pixel position.

After the nine multiplication operations of a single kernel are performed, the product results will include nine values; each of the nine values being either a positive one (+1) or a negative one (−1). If each pixel in the kernel matches each pixel in the corresponding portion of the unknown image, then the product result will include nine positive one (+1) values. Alternatively, if one or more pixels in the kernel do not match a corresponding pixel in the portion of the unknown image under analysis, then the product result will have at least some negative one (−1) values. If every pixel in the kernel fails to match the corresponding pixel in the corresponding portion of the unknown image under analysis, then the product result will include nine negative one (-1) values.

Considering the mathematical combination (i.e., the multiplication operations) of pixels, it is recognized that the number of positive one (+1) values and the number of negative one (−1) values in a product result represents the degree to which the feature in the kernel matches the portion of the image where the kernel is conceptually overlaid. Thus, by summing all of the products (e.g., summing the nine values) and dividing by the number of pixels (e.g., nine), a single "quality value" is determined. The quality value represents the degree of match between the kernel and the portion of the unknown image under analysis. The quality value can range from negative one (−1) when no kernel pixels match and positive one (+1) when every pixel in the kernel has the same illuminated/unilluminated status as its corresponding pixel in the unknown image.

The acts described herein with respect to FIG. 1E may also collectively be referred to as a first convolutional process in an operation called "filtering." In a filter operation, a particular portion of interest in a known image is searched for in an unknown image. The purpose of the filter is to identify if and where the feature of interest is found in the unknown image with a corresponding prediction of likelihood.

FIG. 1F illustrates twelve acts of convolution in a filtering process. FIG. 1G shows the results of the twelve convolutional acts of FIG. 1F. In each act, a different portion of the unknown image is processed with a selected kernel. The selected kernel may be recognized as the twelfth kernel in the representative numeral one ("1") of FIG. 1B. The representative "1" is formed in FIG. 1B as a set of illuminated pixels in a 10-pixel-by-10-pixel image. Starting in the top-most, left-most corner, the first kernel covers a 3-pixel-by-3-pixel portion. The second through eighth kernels sequentially move one column rightward. In the manner of a carriage return, the ninth kernel begins in the second row, left-most column. Kernels 10-16 sequentially move one column rightward for each kernel. Kernels 17-64 may be similarly formed such that each feature of the numeral "1" in FIG. 1B is represented in at least one kernel.

In FIG. 1F(a), a selected kernel of 3-pixels by 3-pixels is conceptually overlaid on a left-most, top-most section of an unknown image. The selected kernel in this case is the twelfth kernel of the numeral "1" of FIG. 1B. The unknown image in FIG. 1F(a) may appear to a human observer as a shifted, poorly formed numeral one (i.e., "1"). In the convolutional process, the value of each pixel in the selected kernel, which is "+1" for illuminated pixels and "−1" for unilluminated pixels, is multiplied by each corresponding pixel in the unknown image. In FIG. 1F(a), five kernel pixels are illuminated, and four kernel pixels are unilluminated. Every pixel in the unknown image is unilluminated. Accordingly, when all nine multiplications are performed, five products are calculated to be "−1," and four products are calculated to be "+1." The nine products are summed, and the resulting value of "−1" is divided by nine. For this reason, the corresponding image of FIG. 1G(a) shows a resulting kernel value of "−0.11" for the kernel in the left-most, top-most section of the unknown image.

In FIGS. 1F(b), 1F(c), and 1F(d), the kernel pixel is sequentially moved rightward across the columns of the image. Since each pixel in the area of the first six columns and first three rows spanning the first six columns is also unilluminated, FIGS. 1G(b), 1G(c), and 1G(d) each show a calculated kernel value of "−0.11."

FIGS. 1F(e) and 1G(e) show a different calculated kernel value from the earlier calculated kernel values of "−0.11." In FIG. 1F(e), one of the illuminated kernel pixels matches one of the illuminated pixels in the unknown image. This match is shown by a darkened pixel in FIG. 1F(e). Since FIG. 1F(e) now has a different set of matched/unmatched characteristics, and further, since another one of the kernel pixels matches a corresponding pixel in the unknown image, it is expected that the resulting kernel value will increase. Indeed, as shown in FIG. 1G(e), when the nine multiplication operations are carried out, four unilluminated pixels in the kernel match four unilluminated pixels in the unknown image, one illuminated pixel in the kernel matches one illuminated pixel in the unknown image, and four other illuminated pixels in the kernel do not match the unilluminated four pixels in the unknown image. When the nine products are summed, the result of "+1" is divided by nine for a calculated kernel value of "+0.11" in the fifth kernel position.

As the kernel is moved further rightward in FIG. 1F(f), a different one of the illuminated kernel pixels matches a corresponding illuminated pixel in the unknown image. FIG. 1G(f) represents the set of matched and unmatched pixels as a kernel value of "+0.11."

In FIG. 1F(g), the kernel is moved one more column to the right, and in this position, every pixel in the kernel matches every pixel in the unknown image. Since the nine multiplications performed when each pixel of the kernel is multiplied by its corresponding pixel in the unknown image results in a "+1.0," the sum of the nine products is calculated to be "+9.0," and the final kernel value for the particular position is calculated (i.e., 9.0/9) to be "+1.0," which represents a perfect match.

In FIG. 1F(h), the kernel is moved rightward again, which results in a single illuminated pixel match, four unilluminated pixel matches, and a kernel value of "+0.11," as illustrated in FIG. 1G(h).

The kernel continues to be moved as shown in FIGS. 1F(i), 1F(j), 1F(k), and 1F(l), and in each position, a kernel value is mathematically calculated. Since no illuminated pixels of the kernel are overlaid on illuminated pixels of the unknown image in in FIGS. 1F(i) to 1F(l), the calculated kernel value for each of these positions is "−0.11." The kernel values are shown in FIGS. 1G(i), 1G(j), 1G(k), and 1G(l) as "−0.11" in the respective four kernel positions.

FIG. 1H illustrates a stack of maps of kernel values. The topmost kernel map in FIG. 1H is formed when the twelfth kernel of the numeral "1" in FIG. 1B is moved into each position of the unknown image. The twelfth kernel will be recognized as the kernel used in each of FIGS. 1F(a) to 1F(l) and FIGS. 1G(a) to 1G(l). For each position where the selected kernel is conceptually overlaid on the unknown image, a kernel value is calculated, and the kernel value is stored in its respective position on the kernel map.

Also in FIG. 1H, other filters (i.e., kernels) are also applied to the unknown image. For simplicity in the discussion, the 29th kernel of the numeral "1" in FIG. 1B is selected, and the 61st kernel of the numeral "1" in FIG. 1B is selected. For each kernel, a distinct kernel map is created. The plurality of created kernel maps may be envisioned as a stack of kernel maps having a depth equal to the number of filters (i.e., kernels) that are applied. The stack of kernel maps may also be called a stack of filtered images.

In the convolutional process of the CNN system 10, a single unknown image is convolved to create a stack of filtered images. The depth of the stack is the same as, or is otherwise based on, the number of filters (i.e., kernels) that are applied to the unknown image. The convolutional process in which a filter is applied to an image is also referred to as a "layer" because they can be stacked together.

As evident in FIG. 1H, a large quantity of data is generated during the convolutional layering process. In addition, each kernel map (i.e., each filtered image) has nearly as many values in it as the original image. In the examples presented in FIG. 1H, the original unknown input image is formed by 100 pixels (10×10), and the generated filter map has 64 values (8×8). The simple reduction in size of the kernel map is only realized because the applied 9-pixel kernel values (3×3) cannot fully process the outer-most pixels at the edge of the image.

FIG. 1I shows a pooling feature that significantly reduces the quantity of data produced by the convolutional processes. A pooling process may be performed on one, some, or all of the filtered images. The kernel map in FIG. 11 is recognized as the top-most filter map of FIG. 1H, which is formed with the 12th kernel of the numeral "1" in FIG. 1B.

The pooling process introduces the concepts of "window size" and "stride." The window size is the dimensions of a window such that a single, maximum value within the window will be selected in the pooling process. A window may be formed having dimensions of m-pixels by n-pixels wherein "m" and "n" are integers, but in most cases, "m" and "n" are equal. In the pooling operation shown in FIG. 11, each window is formed as a 2-pixel-by-2-pixel window. In the pooling operation, a 4-pixel window is conceptually overlaid onto a selected portion of the kernel map, and within the window, the highest value is selected.

In the pooling operation, in a manner similar to conceptually overlaying a kernel on an unknown image, the pooling window is conceptually overlaid onto each portion of the kernel map. The "stride" represents how much the pooling window is moved after each pooling act. If the stride is set to "two," then the pooling window is moved by two pixels after each pooling act. If the stride is set to "three," then the pooling window is moved by three pixels after each pooling act.

In the pooling operation of FIG. 11, the pooling window size is set to 2×2, and the stride is also set to two. A first pooling operation is performed by selecting the four pixels in the top-most, left-most corner of the kernel map. Since each kernel value in the window has been calculated to be "−0.11," the value from the pooling calculation is also "−0.11." The value of "−0.11" is placed in the top-most, left-most corner of the pooled output map in FIG. 11.

The pooling window is then moved rightward by the selected stride of two pixels, and the second pooling act is performed. Once again, since each kernel value in the second pooling window is calculated to be "−0.11," the value from the pooling calculation is also "−0.11." The value of "−0.11" is placed in the second entry of the top row of the pooled output map in FIG. 11.

The pooling window is moved rightward by a stride of two pixels, and the four values in the window are evaluated. The four values in the third pooling act are "+0.11," "+0.11," "+0.11," and "+0.33." Here, in this group of four kernel values, "+0.33" is the highest value. Therefore, the value of "+0.33" is placed in the third entry of the top row of the pooled output map in FIG. 11. The pooling operation does not care where in the window the highest value is found, the pooling operation simply selects the highest (i.e., the greatest) value that falls within the boundaries of the window.

The remaining 13 pooling operations are also performed in a like manner so as to fill the remainder of the pooled output map of FIG. 11. Similar pooling operations may also be performed for some or all of the other generated kernel maps (i.e., filtered images). Further considering the pooled output of FIG. 11, and further considering the selected kernel (i.e., the twelfth kernel of the numeral "1" in FIG. 1B) and the unknown image, it is recognized that the highest values are found in the upper right-hand corner of the pooled output. This is so because when the kernel feature is applied to the unknown image, the highest correlations between the pixels of the selected feature of interest (i.e., the kernel) and the similarly arranged pixels in the unknown image are also found in the upper right-hand corner. It is also recognized that the pooled output has values captured in it that loosely represent the values in the un-pooled, larger-sized kernel map. If a particular pattern in an unknown image is being searched for, then the approximate position of the pattern can be learned from the pooled output map. Even if the actual position of the feature isn't known with certainty, an observer can recognize that the feature was detected in the pooled output. The actual feature may be moved a little bit left or a little bit right in the unknown image, or the actual feature may be rotated or otherwise not identical to the kernel feature, but nevertheless, the occurrence of the feature and its general position may be recognized.

An optional normalization operation is also illustrated in FIG. 11. The normalization operation is typically performed by a Rectified Linear Unit (ReLU). The ReLU identifies every negative number in the pooled output map and replaces the negative number with the value of zero (i.e., "0") in a normalized output map. The optional normalization process by one or more ReLU circuits helps to reduce the computational resource workload that may otherwise be required by calculations performed with negative numbers.

After processing in the ReLU layer, data in the normalized output map may be averaged in order to predict whether or not the feature of interest characterized by the kernel is found or is not found in the unknown image. In this way, each value in a normalized output map is used as a weighted "vote" that indicates whether or not the feature is present in the image. In some cases, several features (i.e., kernels) are convolved, and the predictions are further combined to characterize the image more broadly. For example, as illustrated in FIG. 1H, three kernels of interest derived from a known image of a numeral "1" are convolved with an unknown image. After processing each kernel through the various layers, a prediction is made as to whether or not the unknown image includes one or more pixel patterns that show a numeral "1."

Summarizing FIGS. 1A-1I, kernels are selected from a known image. Not every kernel of the known image needs to be used by the CNN. Instead, kernels that are determined to be "important" features may be selected. After the convolution process produces a kernel map (i.e., a feature image), the kernel map is passed through a pooling layer, and a normalization (i.e., ReLU) layer. All of the values in the output maps are averaged (i.e., sum and divide), and the output value from the averaging is used as a prediction of whether or not the unknown image contains the particular feature found in the known image. In the exemplary case, the output value is used to predict whether the unknown image contains a numeral "1." In some cases, the "list of votes" may also be used as input to subsequent stacked layers. This manner of processing reinforces strongly identified features and reduces the influence of weakly identified (or unidentified) features. Considering the entire CNN, a two-dimensional image is input to the CNN and produces a set of votes at its output. The set of votes at the output are used to predict whether the input image either does or does not contain the object of interest that is characterized by the features.

The CNN system 10 of FIG. 1A may be implemented as a series of operational layers. One or more convolutional layers may be followed by one or more pooling layers, and the one or more pooling layers may be optionally followed by one or more normalization layers. The convolutional layers create a plurality of kernel maps, which are otherwise called filtered images, from a single unknown image. The large quantity of data in the plurality of filtered images is reduced with one or more pooling layers, and the quantity of data is reduced further by one or more ReLU layers that normalize the data by removing all negative numbers.

FIG. 1J shows the CNN system 10 of FIG. 1A in more detail. In FIG. 1J(a), the CNN system 10 accepts a 10-pixel-by-10-pixel input image into a CNN. The CNN includes a convolutional layer, a pooling layer, a rectified linear unit (ReLU) layer, and a voting layer. One or more kernel values are convolved in cooperation with the unknown 10×10 image, and the output from the convolutional layer is passed to the pooling layer. One or more max pooling operations are performed on each kernel map provided by the convolutional layer. Pooled output maps from the pooling layer are used as input to a ReLU layer that produces normalized output maps, and the data contained in the normalized output maps is summed and divided to determine a prediction as to whether or not the input image includes a numeral "1" or a numeral "0."

In FIG. 1J(b), another CNN system 10a is illustrated. The CNN in the CNN system 10a includes a plurality of layers, which may include convolutional layers, pooling layers, normalization layers, and voting layers. The output from one layer is used as the input to a next layer. In each pass through a convolutional layer, the data is filtered. Accordingly, both image data and other types data may be convolved to search for (i.e., filter) any particular feature. When passing through pooling layers, the input data generally retains its predictive information, but the quantity of data is reduced. Since the CNN system 10a of FIG. 1J(b) includes many layers, the CNN is arranged to predict that the input image contains any one of many different features.

One other characteristic of a CNN is the use of back propagation to reduce errors and improve the quality of the neural network to recognize particular features in the midst of vast quantities of input data. For example, if the CNN arrives at a prediction that is less than 1.0, and the prediction is later determined to be accurate, then the difference between the predicted value and 1.0 is considered an error rate. Since the goal of the neural network is to accurately predict whether or not a particular feature is included in an input data set, the CNN can be further directed to automatically adjust weighting values that are applied in a voting layer.

Back propagation mechanisms are arranged to implement a feature of gradient descent. Gradient descent may be applied on a two-dimensional map wherein one axis of the map represents "error rate," and the other axis of the map represents "weight." In this way, such a gradient-descent map will preferably take on a parabolic shape such that if an error rate is high, then the weight of that derived value will be low. As error rate drops, then the weight of the derived value will increase. Accordingly, when a CNN that implements back propagation continues to operate, the accuracy of the CNN has the potential to continue improving itself automatically.

The performance of known object recognition techniques that use machine learning methods is improved by applying more powerful models to larger datasets, and implementing better techniques to prevent overfitting. Two known large datasets include LabelMe and ImageNet. LabelMe includes hundreds of thousands of fully segmented images, and more than 15 million high-resolution, labeled images in over 22,000 categories are included in ImageNet.

To learn about thousands of objects from millions of images, the model that is applied to the images requires a large learning capacity. One type of model that has sufficient learning capacity is a convolutional neural network (CNN) model. In order to compensate for an absence of specific information about the huge pool of data, the CNN model is arranged with at least some prior knowledge of the data set (e.g., statistical stationarity/non-stationarity, spatiality, temporality, locality of pixel dependencies, and the like). The CNN model is further arranged with a designer selectable set of features such as capacity, depth, breadth, number of layers, and the like.

Early CNN's were implemented with large, specialized super-computers. Conventional CNN's are implemented with customized, powerful graphic processing units (GPUs). As described by Krizhevsky, "current GPUs, paired with a highly optimized implementation of 2D convolution, are powerful enough to facilitate the training of interestingly large CNNs, and recent datasets such as ImageNet contain enough labeled examples to train such models without severe overfitting."

FIGS. 2A-2B may collectively be referred to herein as FIG. 2.

FIG. 2A is an illustration of the known AlexNet DCNN architecture. As described by Krizhevsky, FIG. 1 shows the "delineation of responsibilities between two GPUs. One GPU runs the layer-parts at the top of the figure while the other runs the layer-parts at the bottom. The GPUs communicate only at certain layers. The network's input is 150,528-dimensional, and the number of neurons in the network's remaining layers is given by 253,440-186,624-64,896-64,896-43,264-4096-4096-1000."

Krizhevsky's two GPUs implement a highly optimized two-dimensional (2D) convolution framework. The final network contains eight learned layers with weights. The eight layers consist of five convolutional layers CL1-CL5, some of which are followed by max-pooling layers, and three fully connected layers FC with a final 1000-way softmax, which produces a distribution over 1000 class labels.

In FIG. 2A, kernels of convolutional layers CL2, CL4, CL5 are connected only to kernel maps of the previous layer that are processed on the same GPU. In contrast, kernels of convolutional layer CL3 are connected to all kernel maps in convolutional layer CL2. Neurons in the fully connected layers FC are connected to all neurons in the previous layer.

Response-normalization layers follow the convolutional layers CL1, CL2. Max-pooling layers follow both the response-normalization layers as well as convolutional layer CL5. The max-pooling layers summarize the outputs of neighboring groups of neurons in the same kernel map. Rectified Linear Unit (ReLU) non-linearity is applied to the output of every convolutional and fully connected layer.

The first convolutional layer CL1 in the AlexNet architecture of FIG. 1A filters a 224×224×3 input image with 96 kernels of size 11×11×3 with a stride of 4 pixels. This stride is the distance between the receptive field centers of neighboring neurons in a kernel map. The second convolutional layer CL2 takes as input the response-normalized and pooled output of the first convolutional layer CL1 and filters the output of the first convolutional layer with 256 kernels of size 5×5×48. The third, fourth, and fifth convolutional layers CL3, CL4, CL5 are connected to one another without any intervening pooling or normalization layers. The third convolutional layer CL3 has 384 kernels of size 3×3×256 connected to the normalized, pooled outputs of the second convolutional layer CL2. The fourth convolutional layer CL4 has 384 kernels of size 3×3×192, and the fifth convolutional layer CL5 has 256 kernels of size 3×3×192. The fully connected layers have 4096 neurons each.

The eight layer depth of the AlexNet architecture seems to be important because particular testing revealed that removing any convolutional layer resulted in unacceptably diminished performance. The network's size is limited by the amount of memory available on the implemented GPUs and by the amount of training time that is deemed tolerable. The AlexNet DCNN architecture of FIG. 1A takes between five and six days to train on two NVIDIA GEFORCE GTX 580 3 GB GPUs.

FIG. 2B is a block diagram of a known GPU such as the NVIDIA GEFORCE GTX 580 GPU. The GPU is a streaming multiprocessor containing 32 unified device architecture processors that employ a flexible scalar architecture. The GPU is arranged for texture processing, shadow map processing, and other graphics-centric processing. Each of the 32 processors in the GPU includes a fully pipelined integer arithmetic logic unit (ALU) and floating point unit (FPU). The FPU complies with the IEEE 754-2008 industry standard for floating-point arithmetic. The GPU in this case is particularly configured for desktop applications.

Processing in the GPU is scheduled in groups of 32 threads called warps. Each of the 32 threads executes the same instructions simultaneously. The GPU includes two warp schedulers and two instruction dispatch units. In this arrangement, two independent warps can be issued and executed at the same time.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

A device may be summarized as including an integrated circuit, a reconfigurable stream switch formed in the integrated circuit; and an arithmetic unit. The arithmetic unit may be formed having at least one input arranged to receive streaming data passed through the reconfigurable stream switch; at least one output arranged to stream resultant data through the reconfigurable stream switch; and a plurality of data paths, at least one of the plurality of data paths dedicated to implementing an activation function according to an approximation of a second order polynomial, the second order polynomial having the form output=$AX^2+BX+C$. The at least one of the plurality of data paths that is dedicated to implementing the activation function may be dedicated to implementing a rectified linear unit (ReLU) function. The at least one data path dedicated to implementing the activation function may be configurable to implement an identify function, a binary step function, a soft-step function, a hyperbolic tangent function, an arc-tangent function, a rectified linear unit (ReLU) function, a parametric ReLU function, an exponential linear unit function, and a soft-plus function. The integrated circuit may be arranged for convolutional neural network operations. The device may include a coefficient repository coupled to the arithmetic unit, and the coefficient repository may be arranged to concurrently store coefficients for at least two activation functions.

The arithmetic unit may be configurable to accept the streaming data as a multidimensional input feature volume. The streaming data may include information specifying the geometric proportions of the input feature volume. The arithmetic unit may be arranged to define an input tile having an input tile height, an input tile width, and an input tile depth, and the arithmetic unit may be arranged to walk the input tile through the input feature volume in an algorithmically configurable pattern. The algorithmically configurable pattern may have a height, a width, and a depth. The arithmetic unit may include a data repository dedicated to storage of a look up table (LUT), the LUT arranged to store data for performing a plurality of second order polynomial approximations.

A machine learning method may be summarized as including streaming input data through a reconfigurable stream switch; receiving the input data at an input of an arithmetic unit, the arithmetic unit having a plurality of data paths, at least one of the plurality of data paths dedicated to implementing an activation function according to an approximation of a second order polynomial, the second order polynomial having the form: output=$AX^2+BX+C$; generating output data with the arithmetic unit, the output data corresponding to an output of the activation function; streaming the output data through the reconfigurable stream switch; and identifying at least one feature in the input data based on information in the stream of output data. The activation function may be configurable from a group that includes a binary step function, a soft-step function, a hyperbolic tangent function, an arc-tangent function, a rectified linear unit (ReLU) function, a parametric ReLU function, an exponential linear unit function, and a soft-plus function. The activation function may be performed as part of a deep convolutional neural network procedure. The input data may be image sensor data.

The method may include defining a feature volume in the image sensor data, the feature volume having a feature volume height, a feature volume width, and a feature volume depth; defining an input tile having an input tile height, an input tile width, and an input tile depth; and walking the input tile through the feature volume in an algorithmically configurable pattern.

At least one of the plurality of data paths may be dedicated to implementing a rectified linear unit (ReLU) function and the method may include generating output data corresponding to an output of the ReLU function.

A system may be summarized as including a memory, which may be a random access memory (RAM) and which may be an on-board memory; an applications processor; a digital signal processor (DSP) cluster; a configurable accelerator framework (CAF); and at least one communication bus architecture communicatively coupling the applications processor, the DSP cluster, and the CAF to the on-board memory, wherein the CAF includes a reconfigurable stream switch; and an arithmetic unit having a plurality of data paths, at least one of the plurality of data paths dedicated to implementing an activation function according to an approximation of a second order polynomial, the second order polynomial having the form: output=$AX^2+BX+C$. The system may include an integrated circuit package that contains the memory, the applications processor, the DSP cluster, the CAF, and the at least one communication bus architecture. The system may include a power manager circuit, the power manager circuit electrically coupleable to a battery. The system may be a mobile device.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 1E illustrates six portions of the right-side, known image of FIG. 1D;

FIG. 1I shows a pooling feature that significantly reduces the quantity of data produced by the convolutional processes;

FIG. 8D illustrates one visual representation of data having a form that may be streamed as input data 802 into an activation function accelerator;

DETAILED DESCRIPTION

The present invention may be understood more readily by reference to the following detailed description of the preferred embodiments of the invention. It is to be understood that the terminology used herein is for the purpose of describing specific embodiments only and is not intended to be limiting. It is further to be understood that unless specifically defined herein, the terminology used herein is to be given its traditional meaning as known in the relevant art.

It has been recognized by the inventors that learning machines can be improved if additional dedicated hardware structures are integrated with or otherwise made available to the architectures that implement the learning machine. One such improvement that can be made includes structures and acts that implement an activation function accelerator 800 as described herein. The inventive activation function accelerator is a particular type of hardware-based arithmetic unit described in the present disclosure, and which may be implemented on a wide variety of learning machines. For brevity, however, the present disclosure includes implementations of the inventive activation function accelerator 800 in a particular deep convolutional neural network disclosed in U.S. patent application Ser. No. 14/423,272 to DESOLI et al., and entitled DEEP CONVOLUTIONAL NETWORK HETEROGENEOUS ARCHITECTURE, which application is incorporated by reference into the present application. This particular deep convolutional network heterogeneous architecture learning machine discloses a system on chip (SoC) having a system bus, a plurality of addressable memory arrays coupled to the system bus, at least one applications processor core coupled to the system bus, and a configurable accelerator framework coupled to the system bus. The configurable accelerator framework is an image and deep convolutional neural network (DCNN) co-processing system. The SoC also includes a plurality of digital signal processors (DSPs) coupled to the system bus, wherein the plurality of DSPs coordinate functionality with the configurable accelerator framework to execute the DCNN.

FIGS. 3-6 and the accompanying detailed description thereof illustrate and present elements of an exemplary system on chip (SoC) 110 configurable as a high-performance, energy efficient hardware accelerated DCNN processor. FIG. 7 is a high level block diagram illustrating a data path supported by the activation function accelerator 800 within a convolution neural network algorithm. FIGS. 8A-8H and the accompanying detailed description thereof illustrate and present structures and data flow diagrams of activation function accelerators 800 integrated with the hardware accelerated DCNN processor of FIGS. 3-6.

Figure 1A:
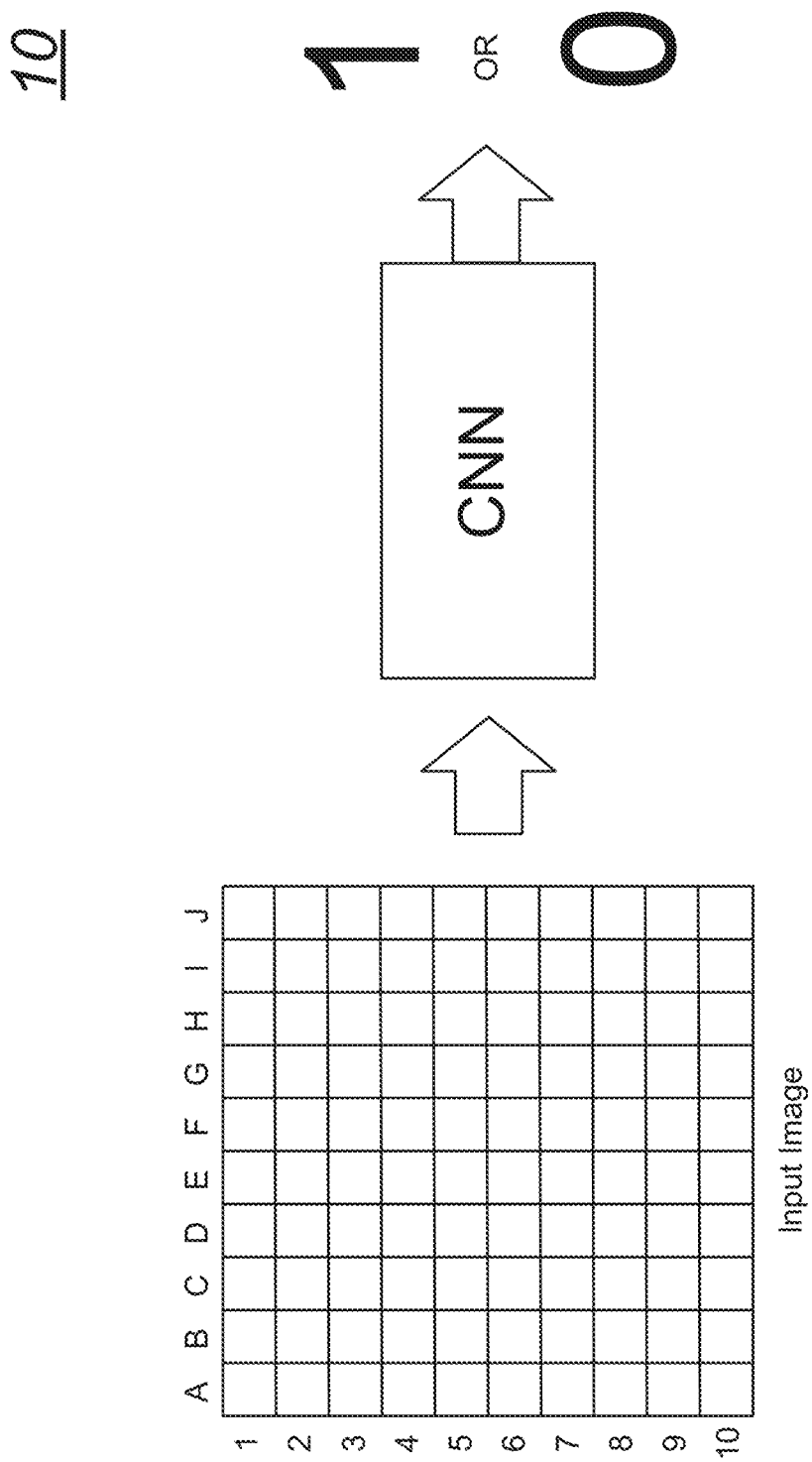
FIG. 1A is a simplified illustration of a convolutional neural network (CNN) system.
Figure 1B:
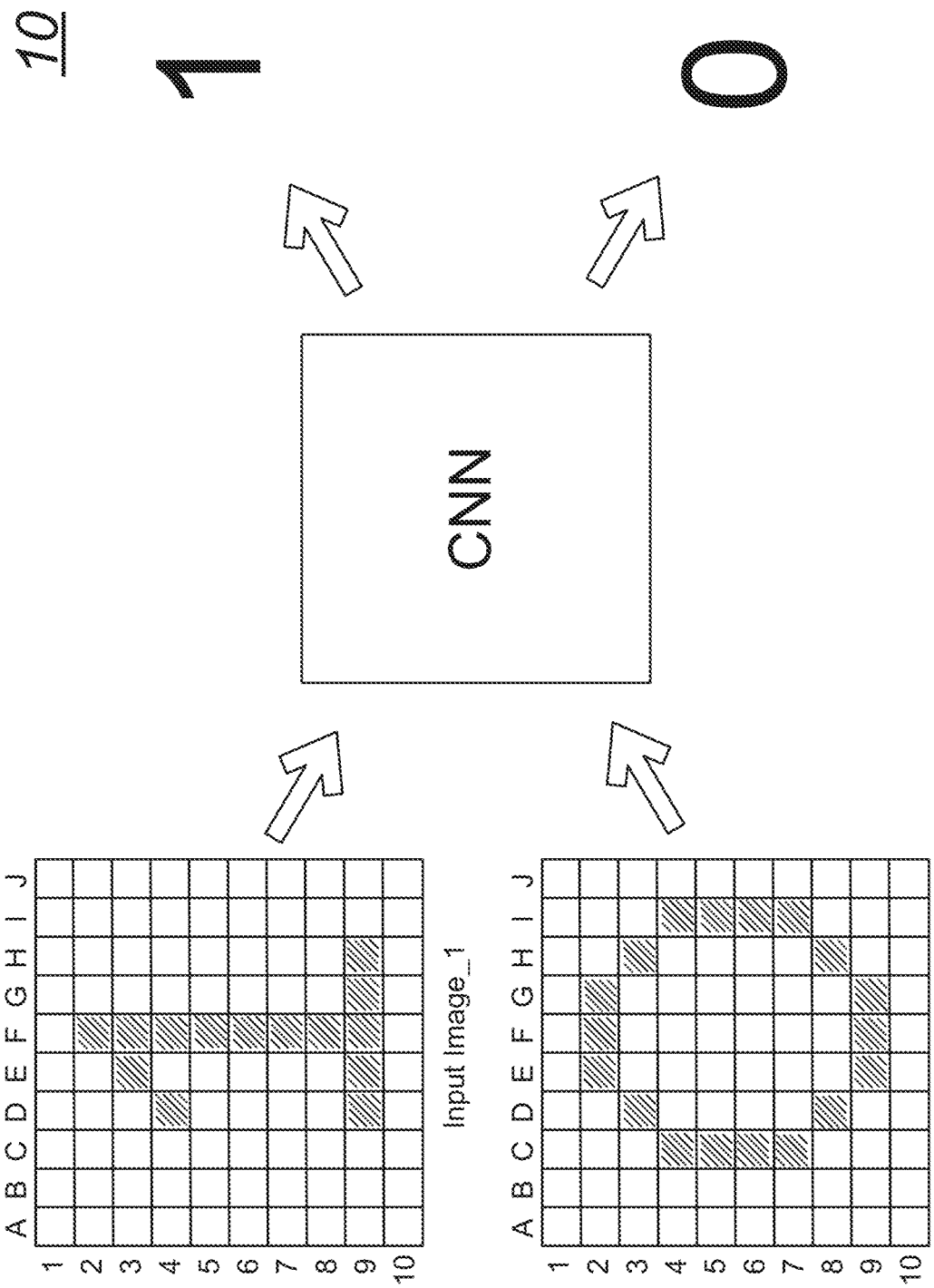
FIG. 1B illustrates the CNN system of FIG. 1A determining that a first pixel pattern illustrates a "1" and that a second pixel pattern illustrates a "0"
Figure 1C:
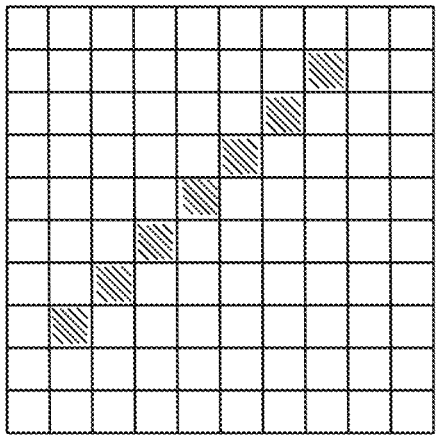
FIG. 1C shows several variations of different forms of ones and zeroes.
Figure 1C:
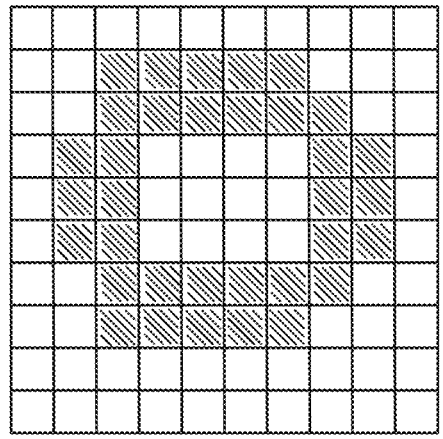
Figure 1C:
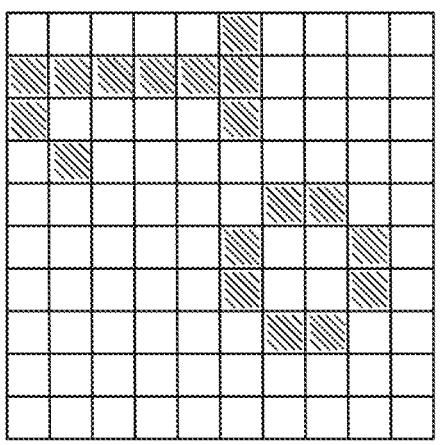
Figure 1C:
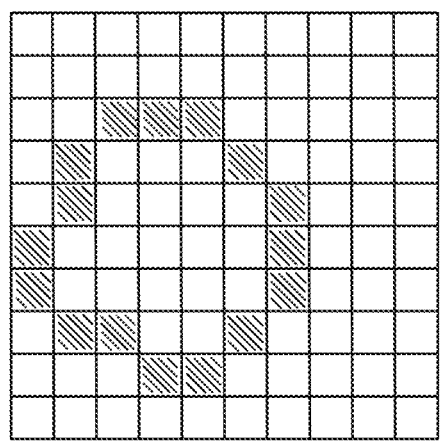
Figure 1C:
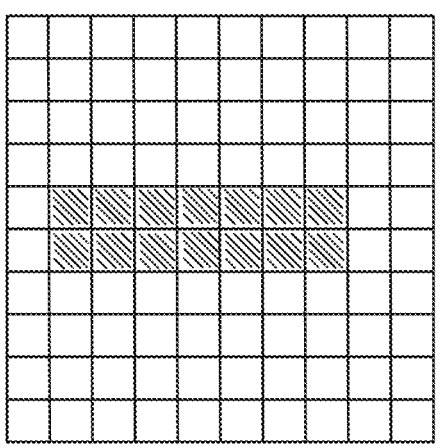
Figure 1C:
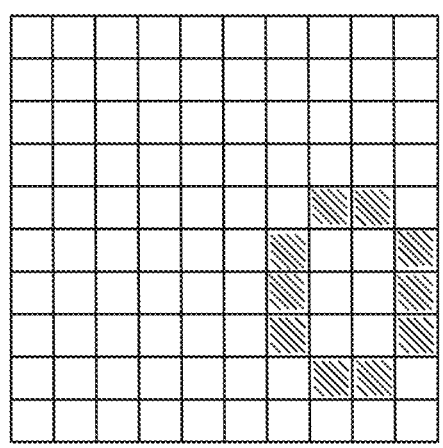
Figure 1D:
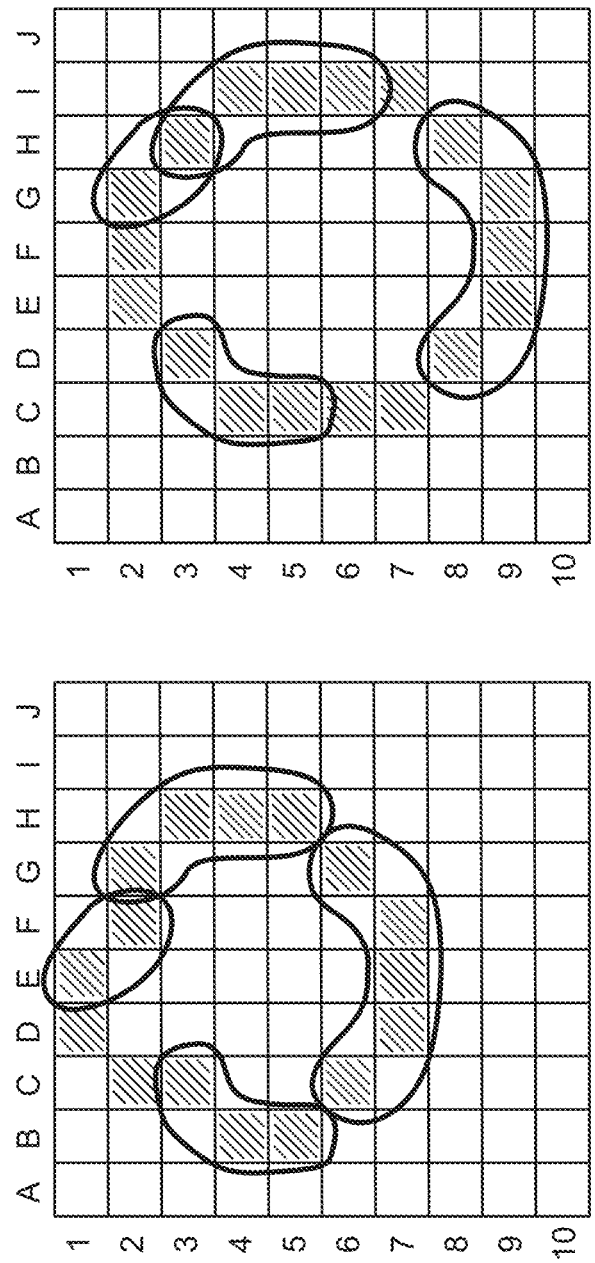
FIG. 1D represents a CNN operation that analyzes (e.g., mathematically combines) portions of an unknown image with corresponding portions of a known image.
Figure 1F:
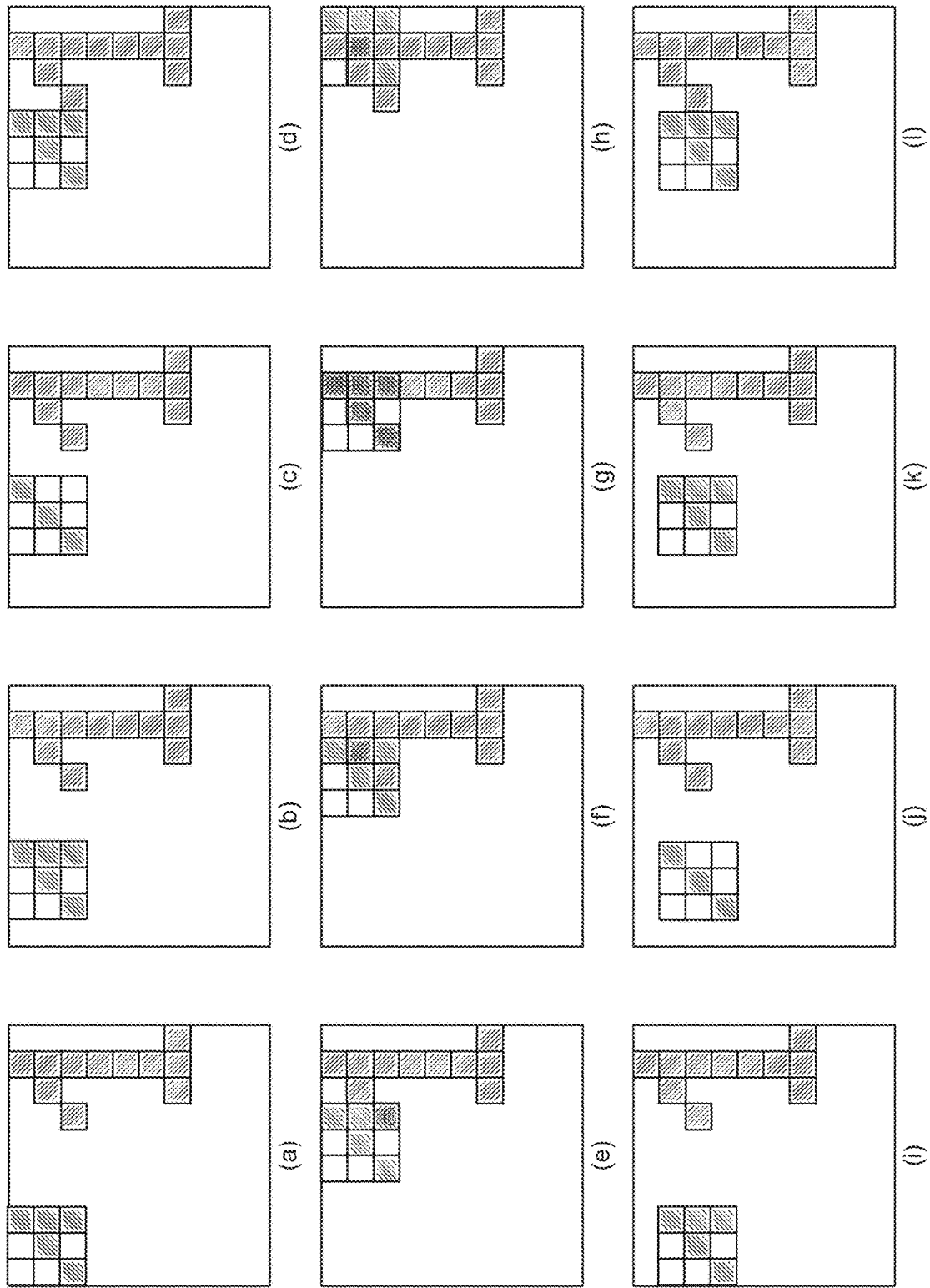
FIG. 1F illustrates 12 acts of convolution in a filtering process.
Figure 1G:
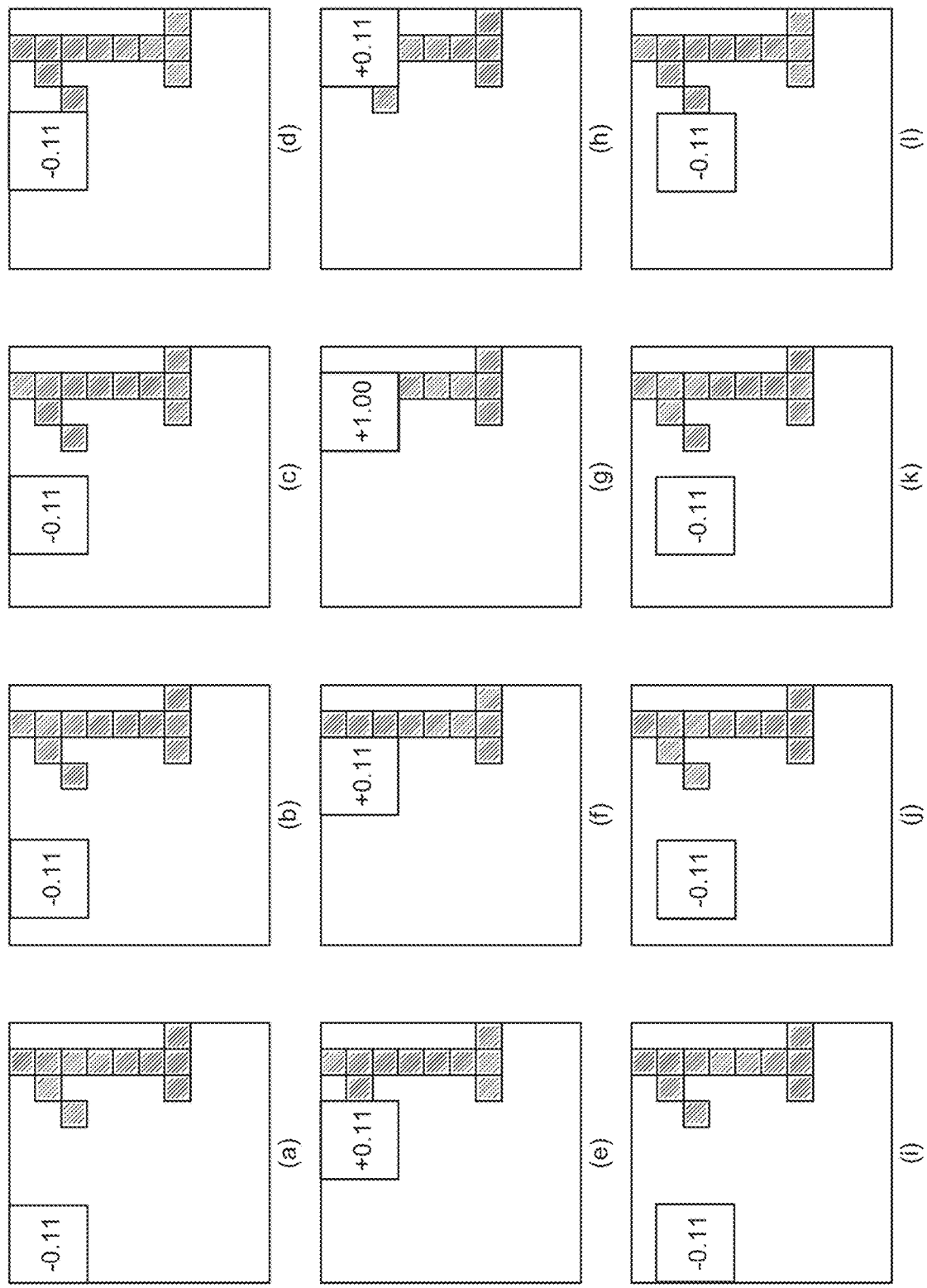
FIG. 1G shows the results of the 12 convolutional acts of FIG. 1F.
Figure 1H:
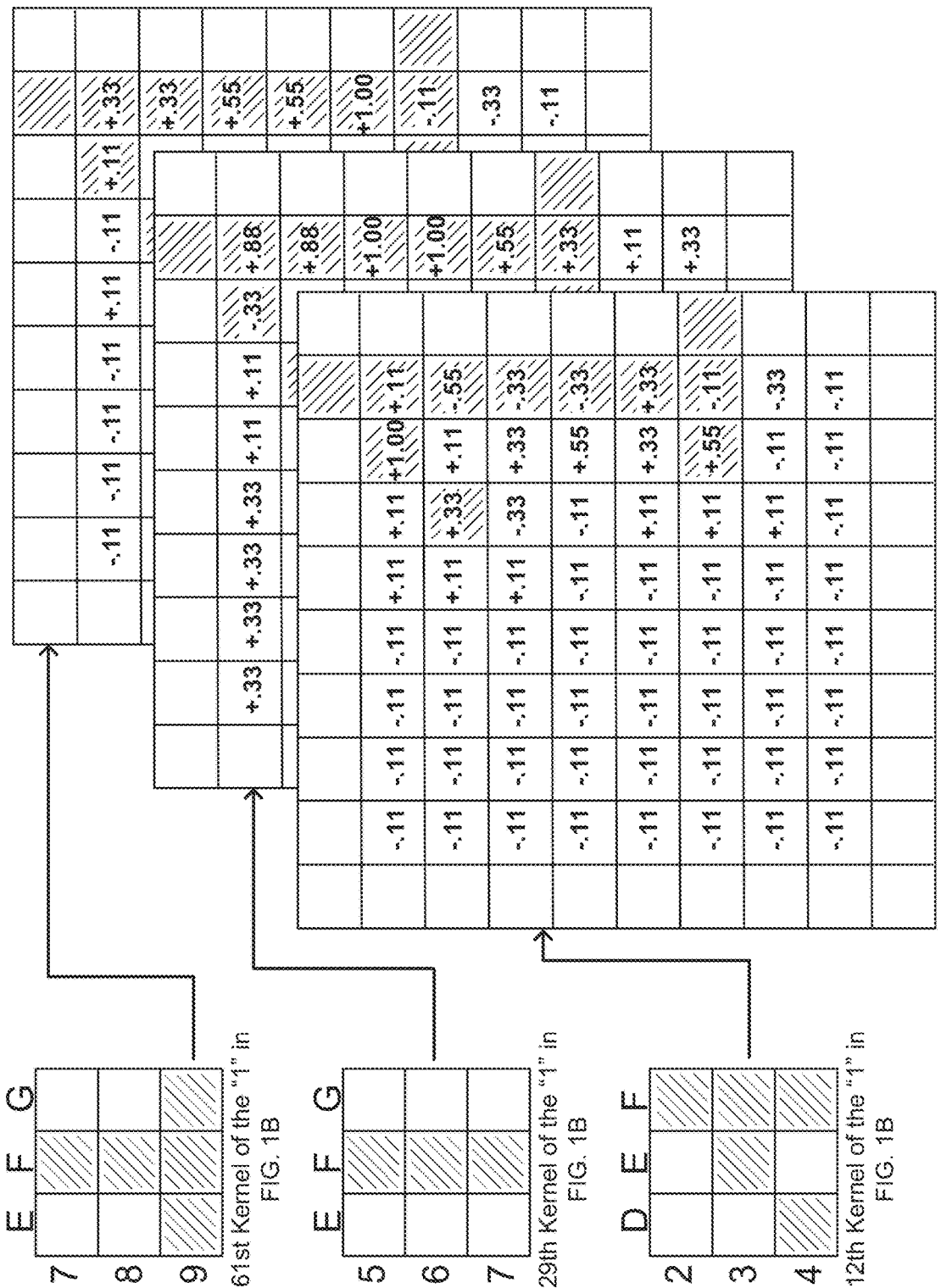
FIG. 1H illustrates a stack of maps of kernel values.
Figure 1J:
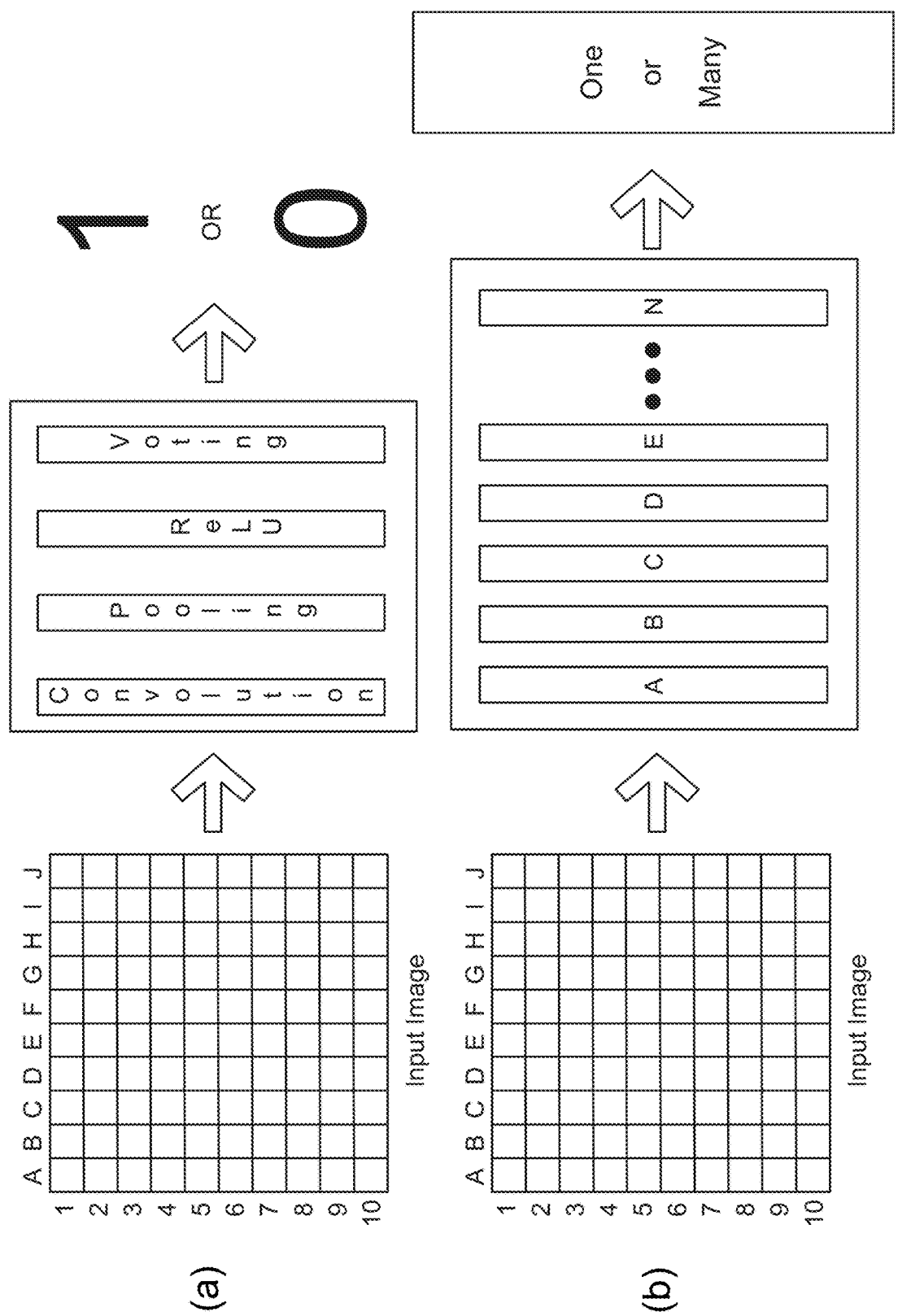
FIG. 1J shows the CNN system of FIG. 1A in more detail.
Figure 2A:
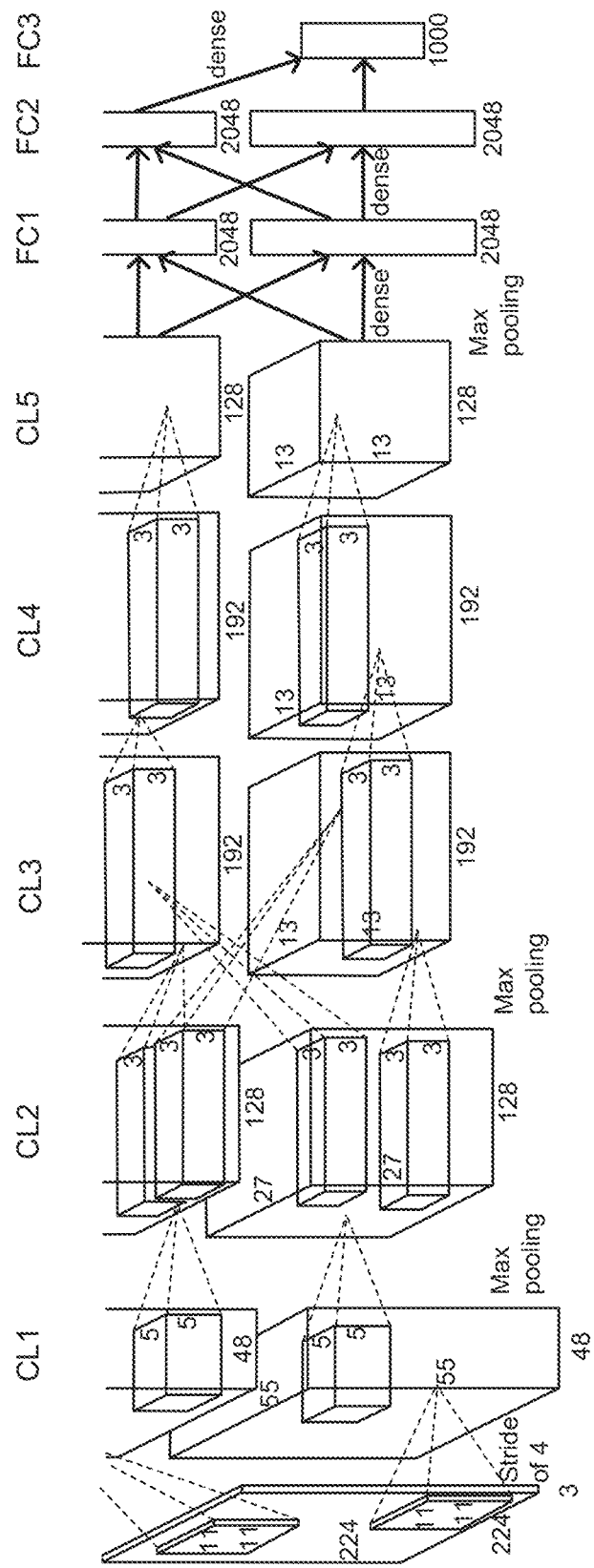
FIG. 2A is an illustration of the known AlexNet DCNN architecture.
Figure 2B:
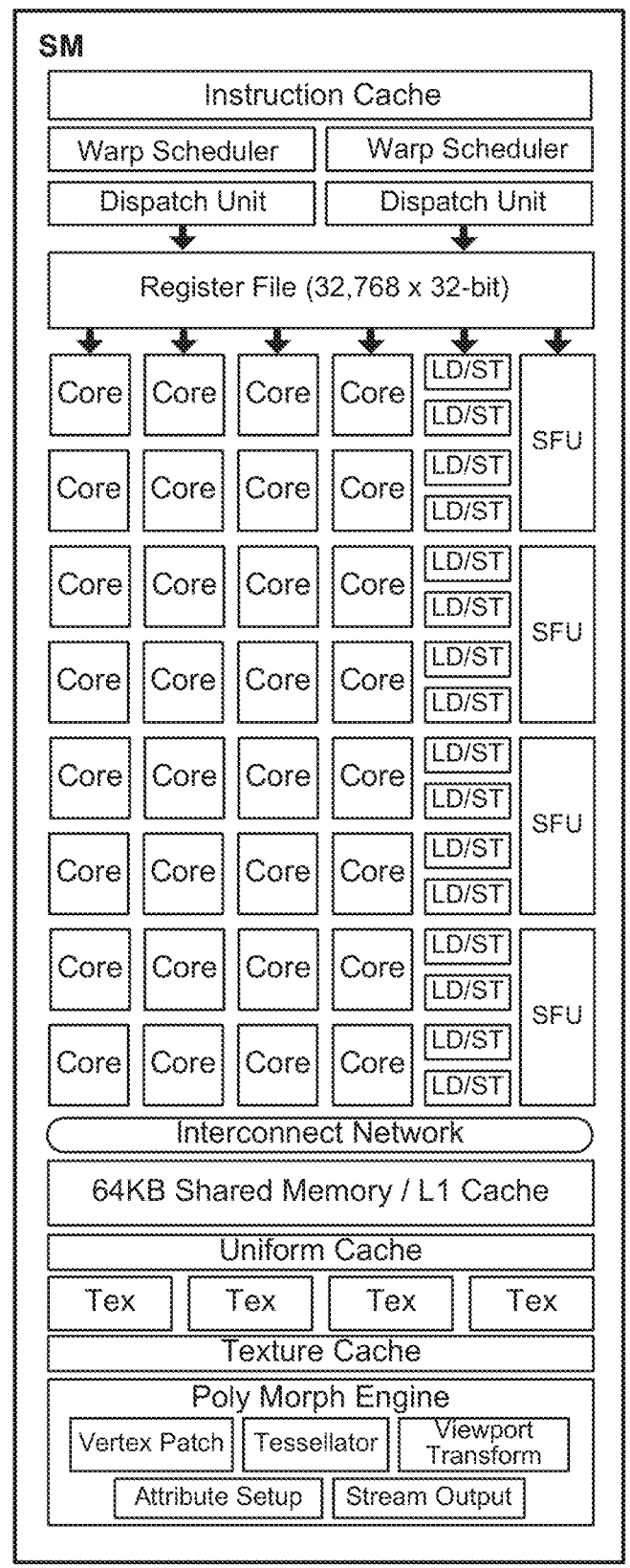
FIG. 2B is a block diagram of a known GPU.
Figure 3:
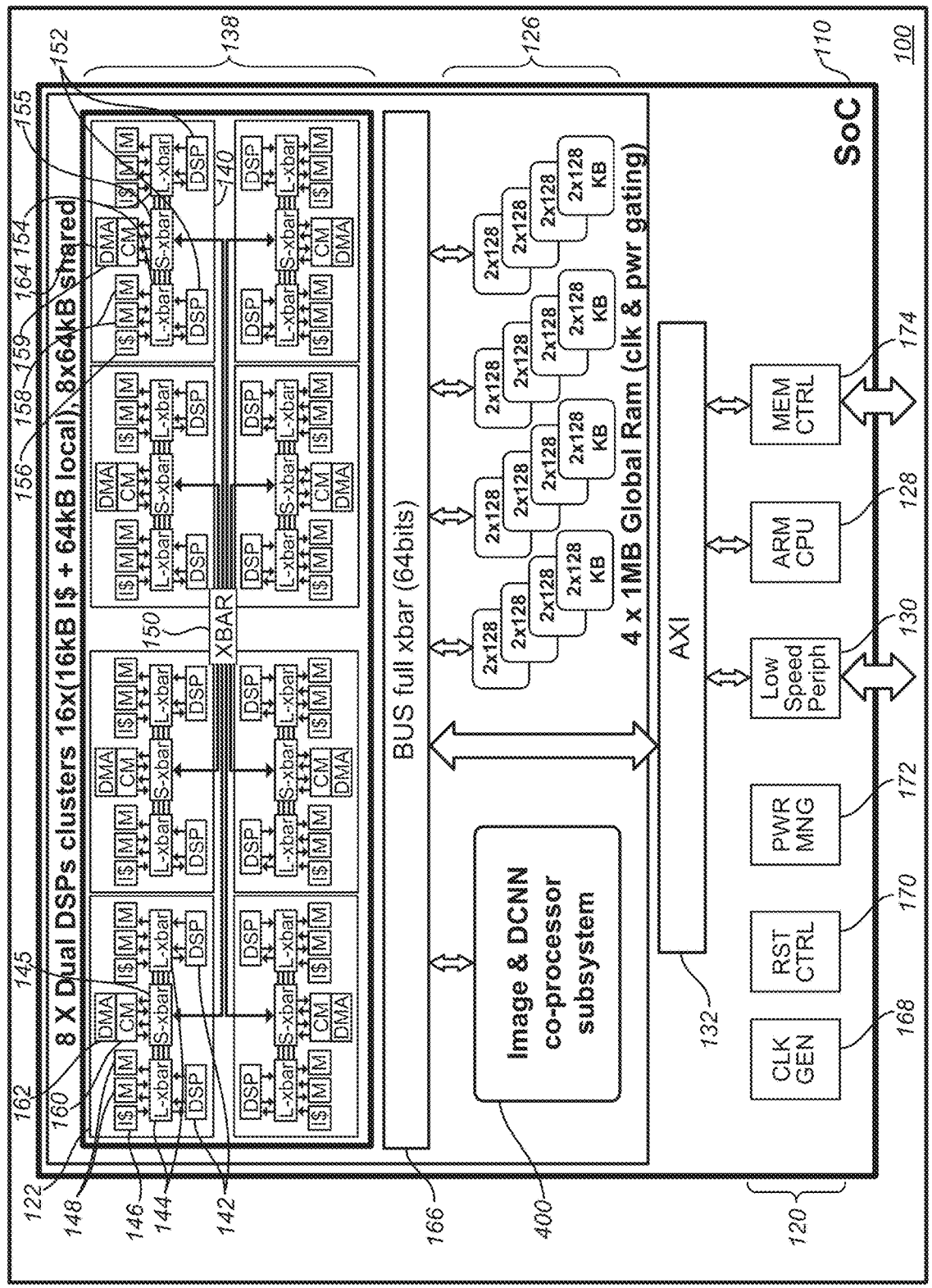
FIG. 3 is an exemplary mobile device having integrated therein a DCNN processor embodiment illustrated as a block diagram.

The exemplary SoC 110 of FIG. 3, which is particularly useful for machine learning applications, implements an image and DCNN co-processor subsystem 400 (FIG. 4), which may interchangeably be referred to as a configurable accelerator framework; an architecturally efficient stream switch 500 (FIG. 5), which creates data locality at previously unprecedented levels; a set of convolution accelerators 600 (FIG. 6), which perform a convolution of input feature data with kernel data derived from the training of the neural network; and a set of activation function accelerators 800 particularly arranged for a deep learning engine (FIGS. 8A-8H).

FIG. 3 is an exemplary mobile device 100 having integrated therein a DCNN processor embodiment illustrated as a block diagram. The mobile DCNN processor is arranged as a system on chip (SoC) 110, however other arrangements are also contemplated (e.g., multiple chips, several chip die in a single integrated circuit, and the like). The illustrated SoC 110 includes a plurality of SoC controllers 120, a configurable accelerator framework (CAF) 400 (e.g., an image and DCNN co-processor subsystem), an SoC global memory 126, an applications (e.g., a host) processor 128, and a plurality of DSPs 138, each of which are communicatively coupled, directly or indirectly, to a primary (e.g., system) communication bus 132 and a secondary communications (e.g., DSP) bus 166.

The configurable accelerator framework (CAF) 400 is communicatively coupled to the system bus 166 which provides a mechanism for convolution accelerators of the CAF 400 to access the SoC global memory 126 as needed and to communicate with the DSPs 138 as needed. The CAF 400 is illustrated in more detail in FIG. 4.

The SoC 110 includes various SoC controllers 120 some of which control the SoC 110, and others of which control one or more peripheral devices. SoC controllers 120 include an applications (e.g., a host) processor 128 (e.g., an ARM processor or some other host processor), a clock generator 168 (e.g., a clock manager), a reset controller 170, and a power manager 172 to provide additional support, control, and management of various timing, power consumption, and other aspects of the SoC 110 and other components. Other SoC controllers 120 that control peripherals include a low speed peripheral I/O interface 130 and an external memory controller 174 to communicate with or otherwise access external chips, components, or memory of the exemplary device 100 in which the SoC 110 is embedded.

The applications processor 128 may act as an intermediate module or as an interface to other programs or components of the exemplary electronic device 100 with which the SoC 110 is integrated. In some embodiments, the applications processor 128 may be referred to as an applications processor core. In various embodiments, the applications processor 128 loads an SoC configuration file at boot time and configures DSPs 138 and the CAF 400 according to the configuration file. As the SoC 110 processes one or more batches of input data (e.g., an image), the applications processor 128 may coordinate the reconfiguration of the CAF 400 or DSPs 138 based on the configuration file, which itself may be based on the DCNN layers and topology.

The SoC 110 also includes a primary communications bus 132 (e.g., an AXI—Advanced eXtensible Interface) that facilitates communications between the SoC controllers 120 and the DSPs 138 and between the SoC controllers 120 and the CAF 400. For example, the DSPs 138 or the CAF 400 can communicate, via the primary communications bus 132 with the applications processor 128, one or more peripheral controllers/peripheral communications interface (low speed peripheral I/O) 130 an external memory (not shown) via an external memory controller 174, or other components. The SoC controllers 120 may also include other supporting and cooperative devices such as a clock manager (e.g., a clock generator) 168, a reset controller 170, a power manager 172 to provide additional timing and power management to the SoC 110, and other components.

In some embodiments, and as illustrated in FIG. 3, the plurality of DSPs 138 are arranged in a plurality of DSP clusters, such as a first DSP cluster 122, a second DSP cluster 140, and several other DSP clusters that are not referenced for simplification of the illustration. Each DSP cluster 122, 140 includes a plurality (e.g., two) of DSPs 142, 152, a plurality (e.g., two) of local DSP crossbar switches 144, 154, and a DSP cluster crossbar switch 145, 155. Each DSP 142, 152 in a particular cluster is capable of communicating with other DSP's 142, 152 via the DSP cluster crossbar switch 145, 155. Each DSP 142, 152 has access to a corresponding instruction cache 146, 156, and local DSP memory 148, 158 via its corresponding local DSP crossbar switch 144, 154. In one non-limiting embodiment, each instruction cache 146, 156 is a 4-way 16 kB instruction cache and each local DSP memory 148, 158 is 64 kB of local RAM storage for its corresponding DSP. Each DSP cluster 122, 140 also includes a shared DSP cluster memory 160, 159 and a cluster DMA 162, 164 for accessing the SoC global memory 160, 159.

Each DSP cluster 122, 140 is communicatively coupled to a global DSP cluster crossbar switch 150 via the DSP cluster crossbar switch 145, 155 to enable each DSP 142, 152 in each DSP cluster 122, 140 to communicate with one another and other components on the SoC 110. The global DSP cluster crossbar switch 150 enables each DSP to communicate with other DSPs in the plurality of DSP clusters 138.

Additionally, the global DSP cluster crossbar switch 150 is communicatively coupled to a system bus 166 (e.g., secondary communications bus, xbar—SoC crossbar switch, or the like), which enables each DSP to communicate with other components of the SoC 110. For example, each DSP 142, 152 can communicate with one or more components (e.g., one or more convolution accelerators) of the CAF 400 or access an SoC global memory 126 via the system bus 166. In some embodiments, each DSP 142, 152 can communicate with the SoC memory 126 via the DMA 162, 164 of its corresponding DSP cluster 122, 140. Moreover, DSP 142, 152 may communicate with the controllers 120 or other modules of the SoC 110 as needed via the system bus 166. Each DSP accesses the system bus 166 via its local DSP crossbar switch 144, 154, its DSP cluster crossbar switch 145, 155, and the global DSP cluster crossbar switch 150.

The plurality of DSPs 138 can be assigned or allocated to perform specific instructions to accelerate other operations of the DCNN. These other operations may include non-convolutional operations performed during a DCNN process, which are in some cases primarily performed by the CAF 400. Examples of these non-convolutional operations include, but are not limited to, max or average pooling, nonlinear activation, cross-channel response normalization, classification representing a small fraction of the total DCNN computation but more amenable to future algorithmic evolutions, or other operations, e.g., Min, Max, Sqrt, Mac, Butterfly, Average, 2-4 SIMD ALU. In some cases, operations that previously have been performed using one or more of the DSPs 138 are now performed using the arithmetic unit for deep learning acceleration structures described herein with reference to FIG. 7. Accordingly, improved operations of the processors and their associated computing devices described herein may be realized by the arithmetic unit structures described herein.

DSPs 138 can operate concurrently (e.g., in parallel) with the operations of CA's in the CAF 400 and concurrently (e.g., in parallel) with data transfers, which may be synchronized by way of interrupts, mailboxes, or some other synchronization mechanism for concurrent execution.

In various embodiments, the SoC memory 126 includes a plurality of memory components for storing data that is accessible to the components of the CAF 400 or the DSPs 138. In at least one embodiment, the SoC memory 126 is configured in a hierarchical-type memory structure. In one non-limiting example, the SoC memory 126 includes four SRAM banks each with 1 Mbyte of storage space.

In at least one embodiment, the configurable accelerator framework (CAF) 400 may be organized as an image and DCNN co-processor subsystem of the SoC 110. As described herein, the CAF 400 includes a reconfigurable dataflow accelerator fabric connecting high-speed camera interfaces with any one or more of arithmetic units for deep learning acceleration (FIG. 6), sensor processing pipelines, croppers, color converters, feature detectors, video encoders, eight channel digital microphone interface, streaming DMAs and a plurality of convolution accelerators.

Figure 4:
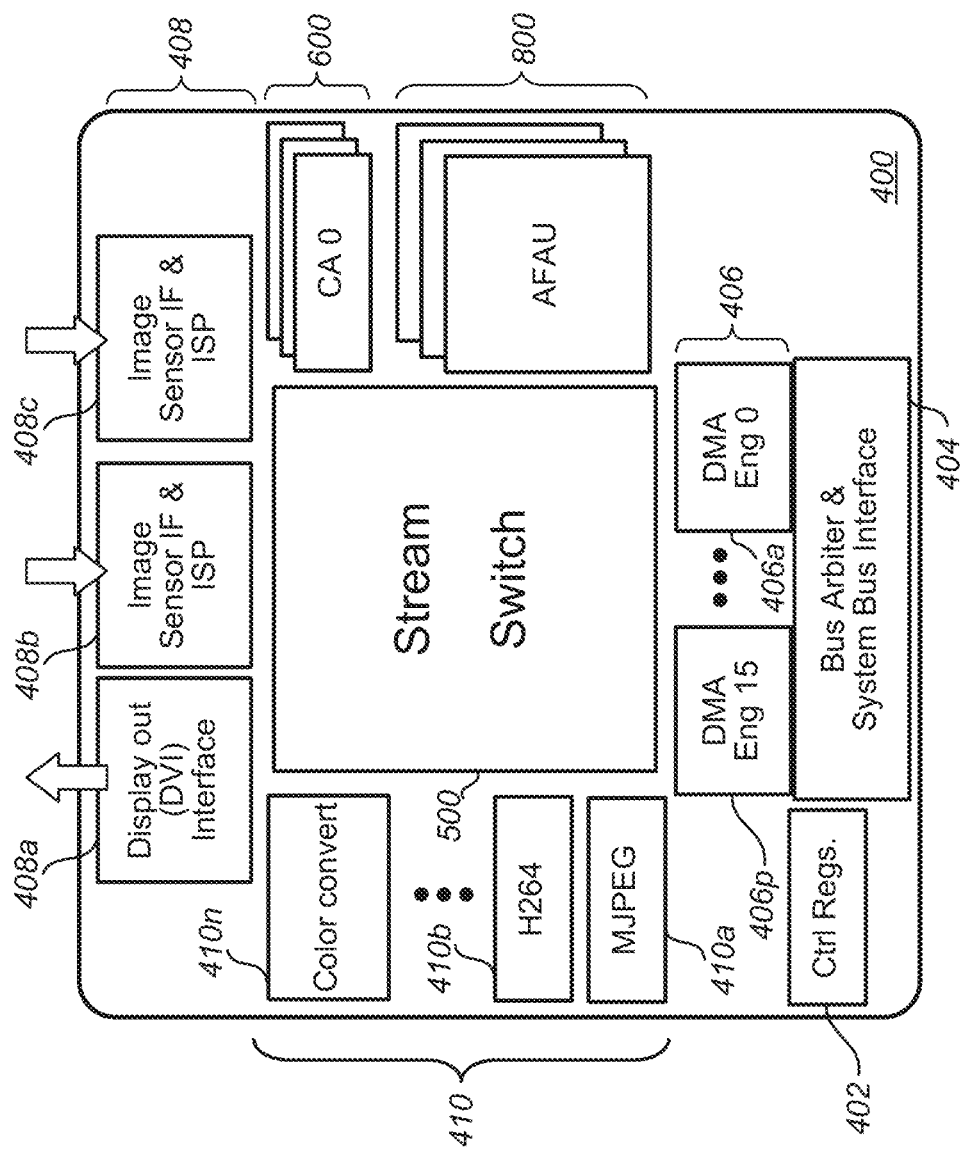
FIG. 4 is an embodiment depicting a configurable accelerator framework (CAF), such as the image and deep convolutional neural network (DCNN) co-processor subsystem of FIG. 3.

Additional details regarding the CAF 400 are described in conjunction with FIG. 4. Briefly, the CAF 400 receives incoming data (e.g., image data in FIG. 4, but other types of streaming data in different embodiments), such as from the camera interface, or other sensors, and distributes the incoming data to the various components of the CAF 400 (e.g., convolution accelerators, which are described in more detail in conjunction with FIG. 6, activation function accelerators 800 described in more detail in conjunction with FIGS. 7 and 8, and the like) and/or one or more of the plurality of DSPs 138 to employ the DCNN and recognize objects in the incoming images.

The CAF 400 utilizes unidirectional links to transport data streams via a configurable, fully connected switch to or from different kinds of source or sink components. For example, the configurable fully connected switch, which is described in more detail in conjunction with FIG. 5, can transport data via direct memory accesses (DMAs) to the SoC global memory 126, I/O interfaces (e.g., cameras), and various types of accelerators (e.g., convolution accelerator (CA) 600, activation function accelerators 800). In some cases, the CAF 400 is configured at boot time based on information received from a particular SoC configuration tool, and the CAF 400 is re-configured during run time based on defined DCNN layers and topology or information received from one or more DSPs 138, applications processor 128, or the like.

The CAF 400 allows for the definition of a selectable number of concurrent, virtual processing chains at run time. The CAF 400 also includes a full featured back pressure mechanism to control data flow to the various components of the framework. The CAF 400 is arranged for stream multicasting operations, which enable the reuse of a data stream at multiple block instances. Linked lists control the fully autonomous processing of an entire convolution layer. Multiple accelerators, grouped or chained together, handle varying sizes for feature maps data and multiple kernels in parallel. Grouping the convolutional accelerators (CA's) 600 to achieve larger computational entities enables choosing an acceptably optimal balancing of the available data bandwidth, budget power, and available processing resources. Each CA 600 includes a line buffer to fetch up to a predetermined number (e.g., 12) of feature map data words in parallel with a single memory access. Further supporting the CA 600 structures are the activation function accelerators 800, which perform math functions according to a second order polynomial approximation as in Equation 1 with a data locality heretofore unknown.

$$AX^2+BX+C \rightarrow \text{Output} \tag{1}$$

Rather than passing data for specific activation functions out of the CAF 400 to a separate device such as a DSP, data is retained within the CAF 400 architecture thereby achieving significant speed and data throughput gains.

In each CA (600), a register-based kernel buffer provides multiple read ports (e.g., 36 read ports), while multiple fixed-point multiply-accumulate (MAC) units (e.g., 36 16-bit MAC units) perform multiple MAC operations per clock cycle (e.g., up to 36 operations per clock cycle). An adder tree accumulates MAC results for each kernel column. The overlapping, column based calculation of the MAC operations allows an acceptably optimal reuse of the feature maps data for multiple MACs, thereby reducing power consumption associated with redundant memory accesses.

Kernel sets are partitioned in batches processed sequentially and intermediate results can be stored in the SoC global memory 126. Various kernel sizes (e.g., up to 12×12), various batch sizes (e.g., up to 16), and parallel kernels (e.g., up to 4) can be handled by a single CA 600 instance but any size kernel can be accommodated with the accumulator input.

The configurable batch size and a variable number of parallel kernels enable acceptably optimal trade-offs for the available input and output bandwidth sharing across different units and the available computing logic resources.

A different acceptably optimal configuration of CA's 600 in the CAF 400 is determined for each DCNN layer. These configurations may be determined or adjusted using a holistic tool that starts with a DCNN description format, such as Caffe' or TensorFlow. The CA 600 supports on-the-fly kernel decompression and rounding when the kernel is quantized nonlinearly with 8 or fewer bits per weight with top-1 error rate increases up to 0.3% for 8 bits.

FIG. 4 is an embodiment depicting a configurable accelerator framework (CAF) 400, such as the image and deep convolutional neural network (DCNN) co-processor subsystem 400 of FIG. 3. The CAF 400 may be configured for image processing, audio processing, prediction analysis (e.g., games of skill, marketing data, crowd behavior prediction, weather analysis and prediction, genetic mapping, disease diagnosis, and other scientific, commercial, consumer, and such processing) or some other type of processing; particularly processing that includes convolutional operations.

The CAF 400 is also arranged with a number of configurable modules. Some modules are optional, and some modules are required. Many optional modules are commonly included in embodiments of a CAF 400. One required module of a CAF 400 is, for example, the stream switch 500. The stream switch 500 provides a design time parametric, run-time reconfigurable accelerator interconnect framework to support data-flow based processing chains. Another required module is, for example, a set of CAF control registers 402 Other modules may be required as well. Optional modules of the CAF 400 include a system bus interface module 404, a selected number of DMA engines 406 (e.g., DMA controllers), a selected number of external device interfaces 408, a selected number of processing modules 410, a selected number of convolution accelerators (CA's) 600, and a selected number of activation function accelerators 800 (e.g., 1, 2, 4, 8, or another number).

The stream switch 500 is a reconfigurable unidirectional interconnection structure formed with a plurality of unidirectional "stream links." The stream links are arranged to transport multibit data streams from accelerators, interfaces, and other logic modules to the stream switch 500 and from the stream switch 500 to accelerators, interfaces, and other logic modules.

In addition to the stream switch 500, the CAF 400 may also include a system bus interface module 404. The system bus interface module 404 provides an interface to other modules of SoC 110. As shown in the exemplary embodiment of FIG. 3, the CAF 400 is coupled to the secondary communication bus 166. In other cases, the CAF 400 may be coupled to the primary communication bus 132 or some other communication mechanism. Control information may be passed unidirectionally or bidirectionally through the system bus interface module 404 of the CAF 400. Such interface is used to provide a host processor (e.g., DSP of DSP cluster 130, applications processor 128, or another processor) access to all of the CAF control registers 402, which are used to control, operate, or otherwise direct particular features of the framework. In some embodiments, each DMA engine 406, external device interface 408, processing module 410, convolution accelerator 600, and activation function accelerators 800 has an interface to the configuration network with a defined set of configuration registers (e.g., formed in CAF control registers 402).

The CAF 400 includes a plurality of DMA engines 406. In FIG. 4, sixteen DMA engines 406a to 406p are illustrated, but some other number of DMA engines may be included in other embodiments of SoC 110 according to one or more choices made by a semiconductor practitioner at design time. The DMA engines 406 are arranged to provide bidirectional channels for input data flow, output data flow, or input and output data flow. In these cases, substantial quantities of data are passed into the CAF 400, out from the CAF 400, or into and out from the CAF 400. For example, in some cases, one or more DMA engines 406 are used to pass streaming video data from memory or from a data source device (e.g., a high-definition (HD) video camera) that produces substantial quantities of video data. Some or all of the video may be passed in from the source device, in from or out to SoC global memory 126, and the like.

Figure 5:
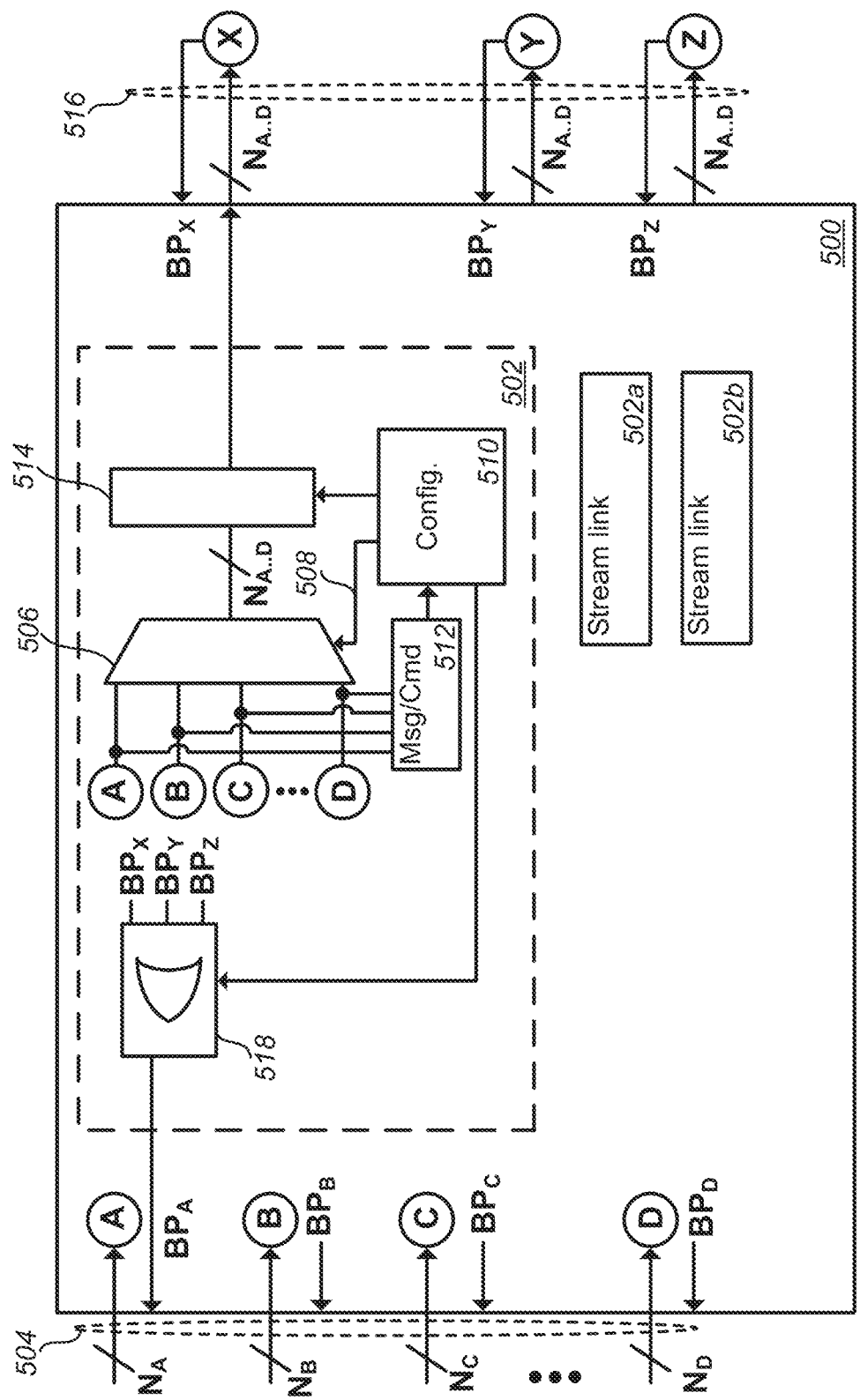
FIG. 5 is a stream switch embodiment in more detail.

In one exemplary embodiment, one or more DMA engines 406 are connected to the stream switch 500 with one input port 504 (FIG. 5) and one output stream port 516 (FIG. 5). The DMA engines 406 can be configured in either input or output mode. The DMA engines 406 can be configured to pack and send data to any address location accessible on the primary communication bus 132, the secondary communication bus 166, or some other address location. The DMA engines 406 can also additionally or alternatively be configured to unpack fetched data and translate the unpacked data into a data stream.

The CAF 400 of FIG. 4 includes a design-time selectable, run-time configurable plurality of external device interfaces 408. The external device interfaces 408 provide a connection to external devices which produce (i.e., source devices) or consume (i.e., sink devices) data. In some cases, the data that passes through an external device interface 408 includes streaming data. The amount of streaming data that is passed through an external device interface 408 may be predetermined in some cases. Alternatively, the amount of streaming data passed through an external device interface 408 may be indeterminate, and in such cases, the external device may simply produce or consume data whenever the particular external device is enabled and so directed. External devices coupled through the external device interfaces 408 may include image sensors, digital microphones, display monitors, or other source and sink devices. In FIG. 4, external device interface 408 includes a digital visual interface (DVI) external device interface 408a, a first image sensor interface and image signal processor (ISP) external device interface 408b, and a second image sensor interface and ISP external device interface 408c. Other interfaces are also contemplated, though for simplicity in illustration, only three external device interfaces 408 are shown.

A plurality of processing modules 410 are integrated in the CAF 400. Three processing modules 410 are illustrated for simplicity, but another selected number (e.g., two, four, eight, sixteen) of processing modules 410 may also be integrated in a CAF 400 at design time by a semiconductor practitioner. A first processing module 410 is an MPEG/JPEG processing module 410a arranged to perform certain video (i.e., MPEG) processing and certain image (i.e., JPEG) processing. A second processing module 410 is an H264 processing module 410b, which is arranged to perform particular video encoding/decoding operations. A third processing module 410 is a color converter processing module 410n, which is arranged to perform color-based operations on certain multimedia data.

In many cases, the DMA controllers 406, the external device interfaces 408, the processing modules 410, the convolution accelerators 600, the activation function accelerators 800, and other modules integrated in a CAF 400 are IP modules selected from a library by a semiconductor practitioner at design time. The semiconductor practitioner may specify the number of modules, features of particular modules, bus widths, power parameters, layout, memory availability, bus access, and many other parameters.

Table 2 is a non-exhaustive exemplary list of IP modules in a library; any of which may be incorporated into CAF 400 by a semiconductor practitioner. In many cases, as new modules are designed, and as existing modules are modified, the new IPs will be added to a library such as the library of Table 2.

TABLE 2

| CAF Library of IP modules | |
|---|---|
| Functional Unit | Application |
| RGB/YUV Sensor Interface | Interface |
| Bayer Sensor Interface | Interface |
| Video Out Interface (DVI) | Interface |
| Enhanced I/O (Sensor Interface, Video Out, Overlay) | Interface |
| ISP (Image Signal Processor) | Signal Processing |
| Mini ISP (Image Signal Processor) | Signal Processing (Bayer -> RGB) |
| GP Color Converter Unit | General Purpose |
| Image Cropper and Resizer Unit | General Purpose |
| Morph Filter Unit | General Purpose |
| Background Remove Unit (+shadow remove) | Background/Foreground segmentation |
| Reference Frame Update Unit | Background/Foreground segmentation |
| JPEG Encoder | Encoder |
| JPEG Decoder | Decoder |
| H264 Encoder | Encoder |
| H264 Encoder | Encoder (Baseline, Intra Only) |
| Rectification and Lens Distortion Correction | Stereo Vision |
| Census Transformation Unit (BRIEF) | Stereo Vision |
| Stereo Vision Depth Map Generator | Stereo Vision |
| Feature Point Detector (FAST) | Feature Detection |
| Feature Detection (Viola Jones) | Face Detection (e.g., Integral Image, ISA Extension) |
| Feature Detection (Optical Flow) | Facial Tracking |
| Feature Point Extractor (DoG + SIFT) | Feature Detection - Difference of Gaussian plus Scale Invariant Feature Transform |
| Feature Extraction | Edge Extraction (Sobel, Canny) |
| Clock and Interrupt Manager | System Control |
| Debug Support Unit | Debug |
| GP IO Unit | General Purpose |
| 3D convolution accelerator for neural networks | Processing |
| activation function accelerators | Processing Support |

In the configurable accelerator framework (CAF) 400 of FIG. 4, eight convolution accelerators 600 are represented, CA0 to CA7. In other CAF 400 embodiments, a different number of convolution accelerators are formed. The number of convolution accelerators 600 and the particular features available in each convolution accelerator 600 are in some cases based on parameter values selected by a semiconductor practitioner at design time.

The convolution accelerators (CA's) 600 are data processing units with a selected number (e.g., one, two, four, eight) of input and output stream link ports. One or more configuration registers (e.g., a set of configuration registers) are arranged to control operations of the CA 600. In some cases, configuration registers are included in the CAF control registers 402, and in these or other cases, certain configuration registers are formed as part of the CA 600.

One or more convolution accelerator template modules may be included in an IP modules library such as the library described with respect to Table 2. In these cases, data stored in the IP modules library includes relevant building blocks that reduce the work required to build a new accelerator that implements an accelerator's core functionality. A predefined set of configuration registers can be extended. Configurable FIFOs formed or otherwise located at the stream link ports can be used to absorb data rate fluctuations and provide some buffering margin required to relax certain flow control constraints in a processing chain.

Typically, each CA 600 either consumes data, generates data, or both consumes data and generates data. Data that is consumed passes through a first stream link of the reconfigurable stream switch 500, and data that is streamed passes through a second stream link of the stream switch 500. In at least some embodiments, CA's have no direct access to memory address space accessible by the primary communications bus 132 (FIG. 3), the secondary communications bus 166 (FIG. 3), or other bus addresses. However, if random memory access to data passed on a system bus is required, a CA 600 may also use an optional bus port interface, which may be along the lines of the system bus interface module 404 of FIG. 4, which is used for several things including permitting DMA engines to access memory locations on the system bus. As discussed above, some CA 600 implementations are part of a library, which can be used in other CAF 400 embodiments to simply instantiate the CA 600 in a global system definition file.

One or more activation function accelerator template modules may also be included in the IP modules library such as the library described with respect to Table 2. Here, the predefined set of configuration registers can be further extended to provide parameter storage for configuration of the included arithmetic units. The parameters are associated with configuration of any desirable number of multiplexor circuits, multiplier circuits, adder circuits, temporary storage circuits, data shift circuits, and other circuits.

Each activation function accelerator 800 is dedicated to performing execution of an activation function represented in the form of a piece-wise second order polynomial approximation such as the formula in Equation 1. Scalar data, vector data, streaming data, constant data, interleaved data, and any other desirable data available within the CAF 400 framework may be passed into the activation function accelerators 800 as operands, and generated resultant data will be passed out from the respective accelerator. The data passed into the activation function accelerators 800 may be sourced from a reconfigurable stream switch 500, a memory inside or outside of the CAF 400 frame work, a sensor or particular interface, or from some other source. Along these lines, each of these types of data sources may, in some cases, consume the data generated in the accelerator unit. As discussed herein, some activation function accelerator 800 implementations are part of a library, which can be used in other CAF 400 embodiments to simply instantiate the accelerator unit in a global system definition file.

System level programmers of machine learning systems desire flexibility to choose a desirable programming model for their particular implementation. To support this high level of flexibility, the CAF 400 is arranged with a reconfigurable stream switch 500. As described in the present disclosure, the stream switch 500 acts as a data transfer fabric to improve logic block (IP) reuse, data reuse, and the reuse of other components and logic, which in turn allows a reduction of on-chip and off-chip memory traffic, and which provides a much greater flexibility to leverage the same logic blocks in different application use cases. Integrated in the stream switch 500 is a plurality of unidirectional links arranged to transport data streams via a configurable fully connected switch to, from, and to and from different kinds of data sources, data sinks, and data sources and data sinks such as direct memory access (DMA) controllers, I/O interfaces (e.g., cameras), and various types of accelerators.

The transported data may take any desired format such as a stream of raster scan image frames, a stream of macroblock oriented images, audio streams, raw data blocks, a stream of input or output activation function values, or any other format. The stream switch 500 can also transport messages, commands, or other like control information along a processing chain forwarded by each unit to one or more or more targeted units where the control information is processed. The control information may be used to signal events, to reconfigure the processing chain itself, or to direct other operations.

FIG. 5 is a stream switch embodiment 500 in more detail. The stream switch 500 includes a user-selectable, design-time configurable first number of stream link input ports 504 and a user-selectable, design-time configurable second number of stream link output ports 516. In some cases, there is the same number of input ports as there are output ports. In other cases, there are more input ports than output ports, and in still other cases, there are more output ports than input ports. The number of input ports and the number of output ports are defined at design time.

In the stream switch 500 embodiment of FIG. 5, one stream link 502 embodiment is shown in detail. Other stream links 502a, 502b, are also illustrated without detail for simplicity in the illustration. The stream links 502a, 502b are generally arranged along the lines of the stream link 502, and for the sake of clarity in the disclosure any of the illustrated stream links may be identified as stream link 502.

At run-time, stream switch 500 communicatively couples input stream link ports to output stream link ports through a stream link 502 according to configuration data written to certain ones of the CAF control registers 402 (FIG. 4).

In the embodiment, one or more of the input stream link ports 504 may be desirably arranged to concurrently forward received data streams to one or multiple (multicast) output ports 516 on the same clock cycle. Thus, one input stream link port can be communicatively coupled (e.g., electrically connected for the passage of data) to one or more output stream link interfaces, which results in a physical replication of the input data stream. The stream link 502 provides a straightforward, unidirectional interface to transport data streams and control information associated with the data streams. In such embodiments, a single control signal, which may, in some cases, be propagated on a single dedicated or shared data path, provides flow control.

Some conductors of the stream link are used to pass data; some other conductors may include a data validity indicator, a first pixel indicator, a last pixel indicator, a line type definition, and a stall signal. The stall signal is used as a back pressure (e.g., flow control) mechanism. In some embodiments of the stream link, image data, command data, control information, messages, and the like are passed in a frame-based protocol along the processing chain though the stream switch 500.

In the stream switch 500, each output port 516 is associated with a particular stream link 502. In FIG. 5, for example, output port X is associated with stream link 502. In addition, one or more input ports 504 are associated with each stream link. In some cases, for example, each and every input port 504 is associated with each and every stream link 502. In this way, each input port 504 may pass data to any and all output ports 516 at the same time or at different times.

Individual communication path conduits of the stream link are unidirectional. That is, signals on each communication path conduit flow in only one direction. In some cases, a plurality of communication path conduits unidirectionally accept data received from an input port and pass the data to one or more output ports. In these cases, and in other cases, a single communication path conduit unidirectionally receives command information (e.g., flow control information) from an output port and passes the command information to one or more input ports. In some other cases, the command information received from an output port and passed to one or more input ports is passed on two or more communication path conduits.

As shown in the detailed stream link 502 of FIG. 5, the set of unidirectional communication path conduits from a plurality of input ports 504 are passed into a data switch 506. In some cases, the set of unidirectional communication path conduits from every input port 504 are passed into the data switch 506. In other cases, the unidirectional communication path conduits of one or more, but less then all, input ports 504 are passed into a data switch 506 of a particular stream link 502. The data switch b 506 may include multiplexor logic, demultiplexor logic, or some other form of switching logic.

As shown in FIG. 5, data passed into stream link 502 from a plurality of input ports 504 may be concurrently present at input nodes of the data switch 506. A selection mechanism 508 is arranged to determine which input data is passed through the data switch 506. That is, based on the selection mechanism 508, the input data from one of input ports A, B, C, D is passed through the data switch 506 to an output of the data switch 506. The output data will be passed on $N_A$ ... $_D$ unidirectional communication path conduits, which will match the number of unidirectional communication path conduits of the selected input port.

The selection mechanism 508 is directed according to stream switch configuration logic 510. The stream switch configuration logic 510 determines at run time which input port 504 shall supply data to the associated output port, and based on the determination, the stream switch configuration logic 510 forms an appropriate selection signal that is passed to the data switch 506. The stream switch configuration logic 510 operates at run time and in real time. The stream switch 510 may take direction from CAF control registers, from a DSP of the DSP cluster 122 (FIG. 3), from the application processor 128, or from some other control device. In addition, the stream switch configuration logic 510 may also take direction from message/command logic 512.

In some embodiments, data is passed uniformly through each particular stream link 502. That is, in some cases, one stream link 502 is configured (e.g. stream switch configuration logic 510, CAF control registers, or the like) to cooperatively pass any number N of first data elements (e.g., datums, bits, bytes, words, nibbles, tuples, or some other data samples, etc.), and one or more other stream links 502 are similarly configured to pass corresponding second data elements. In this configuration, for each data element passed through the first stream link 502, there is a corresponding data element passed through each of the other one or more stream links 502.

In other embodiments, data is not passed uniformly through each particular stream link 502. Data may be interleaved, for example, or passed in another non-uniform way. In an interleaved embodiment, the various stream links 502 may be configured to interleave data. In one such interleaved example, a first stream link 502 may be arranged to pass "M" data elements from a first source (e.g., input port 504), and then the first stream link 502 may be arranged to pass "N" data elements from a second source (e.g., a different input port 504).

Alternatively, in yet one more interleaving embodiment, two stream links 502 may be arranged to pass different numbers of data elements in a non-uniform way. That is, while a first stream link 502 is passing "M" data elements, a second stream link 502 is simultaneously or concurrently passing "N" data elements. In the examples, described herein, "M" and "N" are integers. In some cases, "M" and "N" are different integers.

In some stream switch 500 embodiments, certain specific messages that are passed through an input port 504, for example by an interface or an accelerator, are recognized by command logic 512 in one or more stream links 502 of the stream switch 500 and used to reprogram one or more stream links 502 in real time. In these or in other embodiments, the stream switch 500 is configured to merge data streams according to fixed patterns. For example, in at least one case, a stream switch 500 may be arranged to select and pass data to an output port 516 by switching between input streams passed on two or more input ports 504. For example, after each line, each frame, each N transactions, or by some other measure, the stream switch 500 may be configured to pass data from a different input port 504 to a selected output port 516.

Data passed from the data switch 506 may, in some cases, pass through one or more optional output synchronization logic stages 514. The output synchronization logic stages 514 may be used to store or otherwise buffer a selected amount (e.g., one or more bits, a few or many bytes, etc.) of data passed from a data source coupled to an input port 504 toward a data sink device coupled to an output port 516. Such buffering, synchronizing, and other such operations may be implemented when data source devices and data sink devices operate at different rates, different phases, using different clock sources, or in other manners that may be asynchronous to each other.

The stream switch 500 includes a back pressure stall signal mechanism, which is used to pass flow control information from a sink device to a source device. The flow control information is passed from a sink device to inform a data stream source device to lower its data rate. Lowering the data rate will help to avoid a data overflow in the sink device.

One portion of the back pressure stall signal mechanism includes a back pressure stall signal path that is included in each input port. The back pressure stall signal path is arranged as a back pressure unidirectional communication path conduit. In FIG. 5, four back pressure input port mechanisms are illustrated, $BP_A$, $BP_B$, $BP_C$, $BP_D$; one each for each of the illustrated input ports. In other embodiments, the back pressure mechanism of each input port may include one or more unidirectional communication path conduits. In some embodiments, the back pressure mechanism of each input port has the same number of unidirectional communication path conduits, which may be, for example, a single conduit. In these cases, for example, when a data source device coupled to the particular input port detects that a signal on the back pressure mechanism is asserted, the particular data source device will slow or stop the amount of data passed to the associated input port.

Each output port 516 includes another portion of a back pressure mechanism. One output port back pressure mechanism for each of the three illustrated output ports X, Y, Z, of FIG. 5 are illustrated, $BP_X$, $BP_Y$, $BP_Z$. In some cases, each output port back pressure mechanism includes a same number of unidirectional communication path conduits (e.g., one). In other cases, at least one output port has a back pressure mechanism with a different number of unidirectional communication path conduits than another back pressure mechanism of another output port.

The output port back pressure mechanism conduits are passed to combinatorial back pressure logic 518 in each stream link 502. In FIG. 5, back pressure logic 518 receives back pressure control signals $BP_X$, $BP_Y$, $BP_Z$. The combinatorial back pressure logic 518 also receives control information from the stream switch configuration logic 510. The combinatorial back pressure logic 518 is arranged to pass relevant flow control information back through the input port back pressure mechanism of an input port 504 to a particular data source device.

Figure 6:
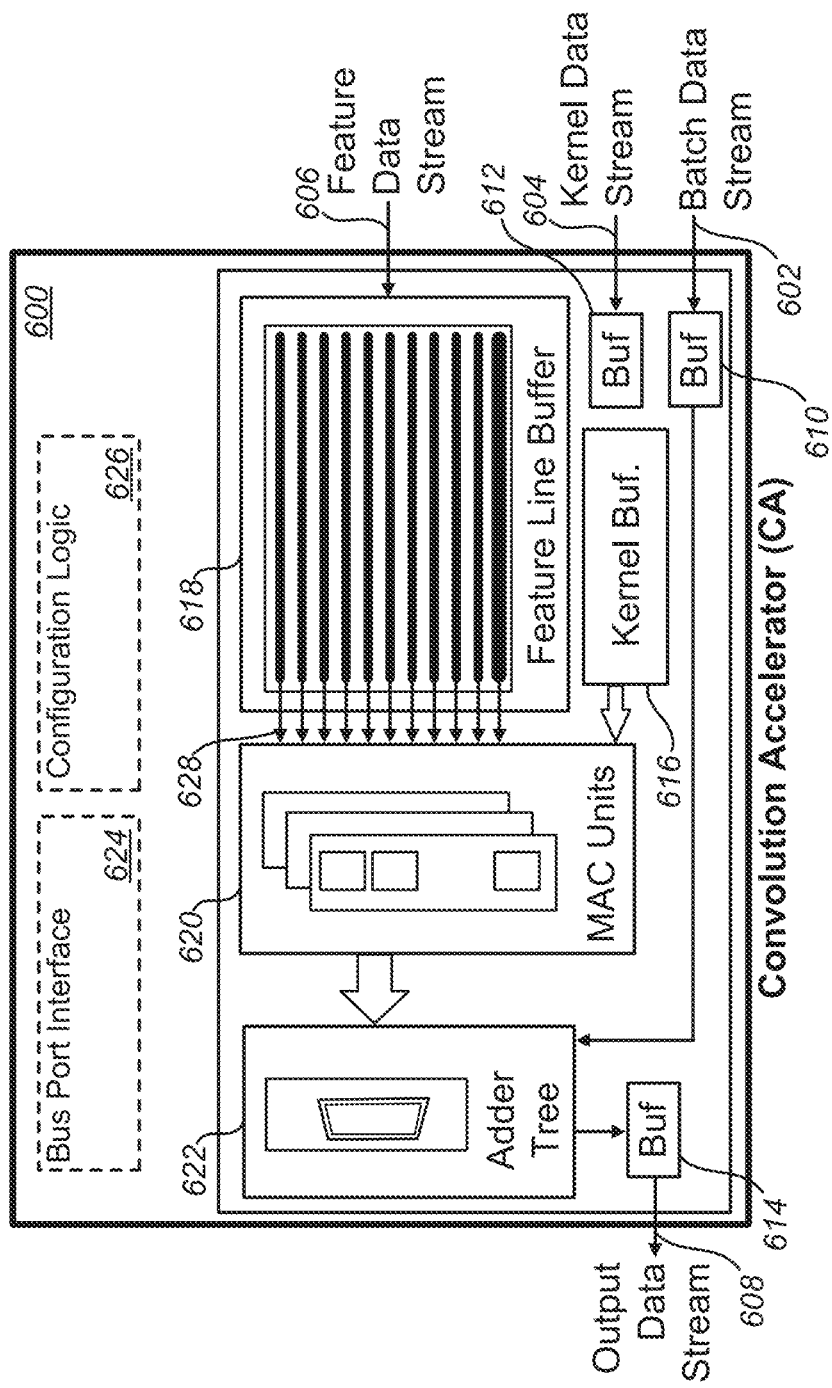
FIG. 6 is a convolution accelerator (CA) embodiment.
Figure 7:
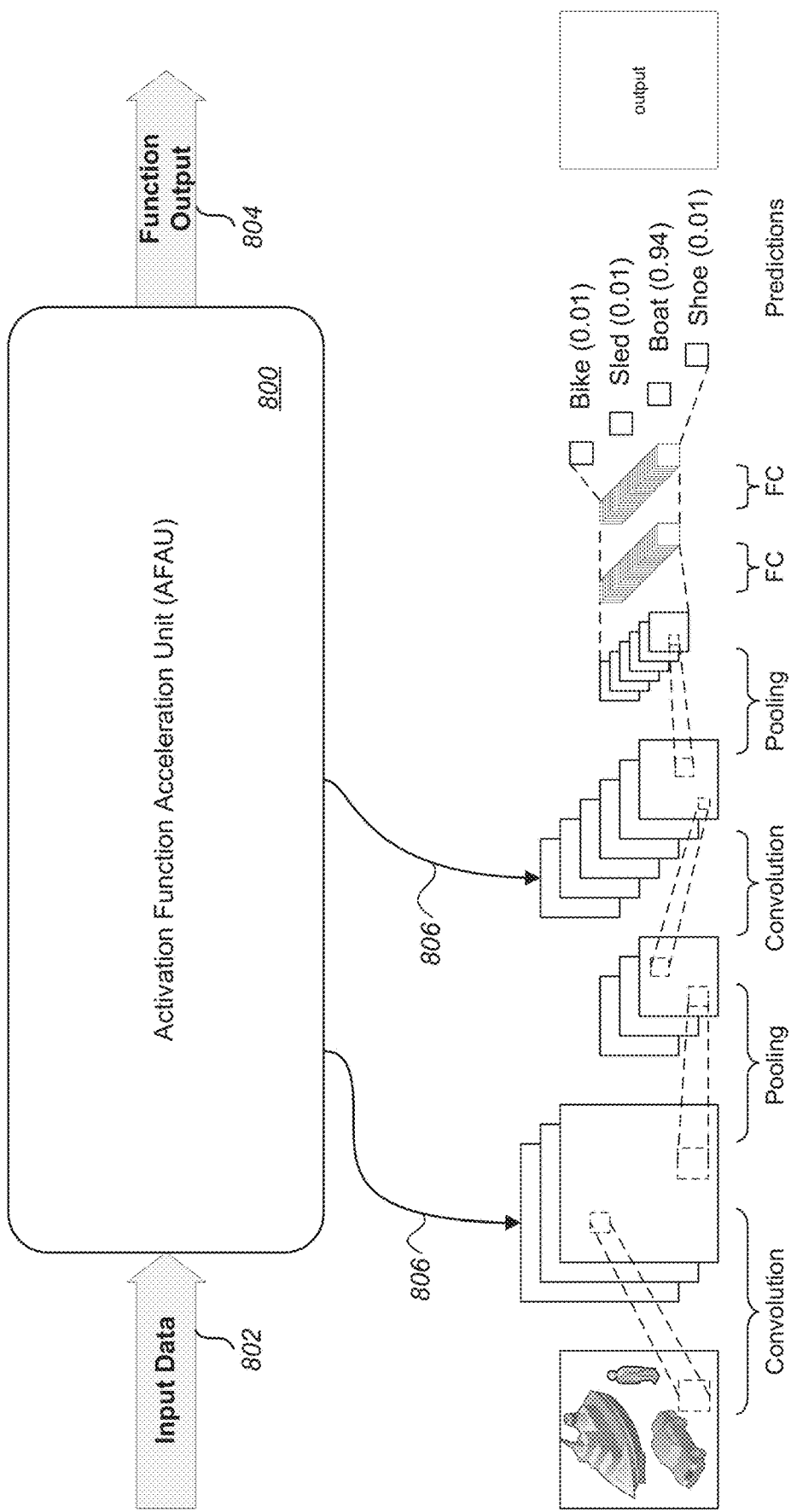
FIG. 7 is a high level block diagram illustrating a data path supported by the activation function acceleration unit within a convolution neural network algorithm.

FIG. 6 is a convolution accelerator (CA) embodiment 600. The CA 600 may be implemented as any one or more of the convolution accelerators 600 of FIG. 4.

The CA 600 includes three input data interfaces and one output data interface that are each arranged for coupling to a stream switch 500 (FIG. 5). A first CA input data interface 602 is arranged for coupling to a first stream switch output port 516, a second CA input data interface 604 is arranged for coupling to a second stream switch output port 516, and a third CA input data interface 606 is arranged for coupling to a third stream switch output port 516. A CA output data interface 608 is arranged for coupling to a selected stream switch input port 504. The specific stream switch 500 port that each CA input data interface 602, 604, 606 and output data interface 608 is coupled to may be determined by default, at boot time, or at run time, and the specific coupling may be programmatically changed at run time.

In an exemplary embodiment, the first CA input data port 602 is arranged to pass a stream of batch data into the CA 600, the second CA input data port 604 is arranged to pass a stream of kernel data into the CA 600, and the third CA input data port 606 is arranged to pass a stream of feature data into the CA 600. The output data port 608 is arranged to pass an output data stream from the CA 600.

The CA 600 includes several internal memory buffers. The internal memory buffers may share a common memory space in some embodiments. In other embodiments, some or all of the internal memory buffers may be separate and distinct from each other. The internal memory buffers may be formed as registers, flip flops, static or dynamic random access memory (SRAM or DRAM), or in some other structural configuration. In some cases, the internal memory buffers may be formed using a multiport architecture that lets, for example, one device performs data "store" operations in the memory while another device performs data "read" operations in the memory.

A first CA internal buffer 610 is physically or virtually arranged in line with the first CA input data interface 602. In this way, batch data streamed into the CA 600 may be automatically stored in the first CA internal buffer 610 until the data is passed to a particular math unit in the CA 600 such as an adder tree 622. The first CA internal buffer 610 may be fixed with a size that is determined at design time. Alternatively, the first CA internal buffer 610 may be defined with a variable size that is determined programmatically at boot time or run time. The first CA internal buffer 610 may be 64 bytes, 128 bytes, 256 bytes, or some other size.

A second CA internal buffer 612 and a third CA internal buffer 614 are formed along the lines of the first CA internal buffer 610. That is, the second and third CA internal buffers 612, 614 may each have their own fixed size that is determined at design time. Alternatively, the second and third CA internal buffers 612, 614 may have a variable size that is determined programmatically at boot time or run time. The second and third CA internal buffers 612, 614 may be 64 bytes, 128 bytes, 256 bytes, or some other size. The second CA internal buffer 612 is physically or virtually arranged in line with the second CA input data interface 604 to automatically store streamed kernel data until the kernel data is passed to a dedicated fourth CA internal buffer 616 that is dedicated to storing kernel buffer data. The third CA internal buffer 614 is physically or virtually arranged in line with the adder tree 622 to automatically store summed data until it can be passed through the CA output interface 604.

The fourth CA internal buffer 616 is a dedicated buffer arranged to desirably store kernel data and apply the stored kernel data to a plurality of CA multiply-accumulate (MAC) units 620.

The fifth CA internal buffer 618 is a feature line buffer that is arranged to receive streamed feature data passed through the third CA input interface 606. Once stored in the feature line buffer, the feature data is applied to the plurality of CA MAC units 620. Feature and kernel buffer data applied to the CA MAC units 620 is mathematically combined according to the convolutional operations described herein, and the resulting output products from the CA MAC units 620 are passed to the CA adder tree 622. The CA adder tree 622 mathematically combines (e.g., sums) the incoming MAC unit data and batch data passed through the first CA input data port.

In some cases, the CA 600 also includes an optional CA bus port interface 624. The CA bus port interface 624, when it is included, may be used to pass data into or out from the CA 600 from SoC global memory 126 or some other location. In some cases, the applications processor 128, a DSP of the DSP cluster 122, or some other processor directs the passage of data, commands, or other information to or from the CA 600. In these cases, the data may be passed through the CA bus port interface 624, which may itself be coupled to the primary communications bus 132, the secondary communication bus 166, or some other communications structure.

In some cases, the CA 600 may also include CA configuration logic 626. The CA configuration logic 626 may be fully resident with the CA 600, partially resident with the CA 600, or remote from the CA 600. The configuration logic 600 may, for example, be fully or partially embodied in the CAF control registers 402, the SoC controllers 120, or some other structures of the SoC 110.

FIG. 7 is a high level block diagram illustrating a data path supported by the activation function accelerator 800 within a convolution neural network algorithm. As illustrated in the figure, image data having a variety of features and complexity is streamed into a convolutional process, which may be carried out with convolution accelerators 600 (FIG. 6) in a configurable accelerator framework (CAF) 400 (FIG. 4), or formed in an SoC 110 (FIG. 3) of a mobile device 100 (FIG. 3). Input data 802, which may, for example, be or include feature map data, is streamed into the activation function accelerator 800. Output data 804 generated according to the selected activation function is streamed out from the activation function accelerator 800.

In the convolution processes, a stream of input images is passed into the neural network. Selected kernels are convolved through the width and height of each image and through the depth of a plurality of images to produce sets, or "stacks," of feature maps. Pooling layers perform sub-sampling operations and combine the outputs of feature clusters at one layer into a single feature in a subsequent layer. One or more additional convolution and pooling layers further filter the input data, and one or more full connection (FC) operations are performed throughout the layers to relate features in one layer to corresponding features in other layers. After the full connection operations, classifications/predictions emerge from the data.

As indicated in FIG. 7, activation functions are performed 806 during the convolution processes. The activation functions may include identity functions, binary step functions, logistic (e.g., soft step) functions, hyperbolic tangent functions, arc-tangent functions, rectified linear unit (ReLU) functions, parametric ReLU functions, exponential linear unit functions, and soft-plus functions. Other activation functions are of course contemplated by the inventors. For brevity, however, and to convey the spirit of the creative arrangements described in the present disclosure, a non-limiting set of activation functions are presented in Equations 2A-11B. Considering Equations 2A-11B, the "A" functions (i.e., 2A, 3A, 4A, etc.) represent the named equation, and the "B" functions (i.e., 2B, 3B, 4B, etc.) represent the derivative of the corresponding "A" equation. Each of these equations, and many others, can be approximated by desirably selecting coefficients applied as operands in a second order polynomial.

(Identity) (2A)
$$f(x) = x$$

(Identity)' (2B)
$$f'(x) = 1$$

(Binary Step) (3A)
$$f(x) = \begin{cases} 0 & \text{for } x < 0 \\ 1 & \text{for } x \geq 0 \end{cases}$$

(Binary Step)' (3B)
$$f'(x) = \begin{cases} 0 & \text{for } x \neq 0 \\ ? & \text{for } x = 0 \end{cases}$$

(Logistic) (4A)
$$f(x) = \frac{1}{1 + e^{-x}}$$

(Logistic)' (4B)
$$f'(x) = f(x)(1 - f(x))$$

(TanH) (5A)
$$f(x) = \tanh(x) = \frac{2}{1 + e^{-2x}} - 1$$

(TanH)' (5B)
$$f'(x) = (1 - f(x)^2)$$

(ArcTan) (6A)
$$f(x) = \tan^{-1}(x)$$

(ArcTan)' (7A)
$$f(x) = \frac{1}{x^2 + 1}$$

(ReLU) (8A)
$$f(x) = \begin{cases} 0 & \text{for } x < 0 \\ x & \text{for } x \geq 0 \end{cases}$$

(ReLU)' (8B)
$$f'(x) = \begin{cases} 0 & \text{for } x < 0 \\ 1 & \text{for } x \geq 0 \end{cases}$$

(PReLU) (9A)
$$f(x) = \begin{cases} \alpha x & \text{for } x < 0 \\ x & \text{for } x \geq 0 \end{cases}$$

(PReLU)' (9B)
$$f'(x) = \begin{cases} \alpha & \text{for } x < 0 \\ 1 & \text{for } x \geq 0 \end{cases}$$

(ELU) (10A)
$$f(x) = \begin{cases} \alpha(e^x - 1) & \text{for } x < 0 \\ x & \text{for } x \geq 0 \end{cases}$$

(ELU)' (10B)
$$f'(x) = \begin{cases} f(x) + \alpha & \text{for } x < 0 \\ 1 & \text{for } x \geq 0 \end{cases}$$

(SoftPlus) (11A)
$$f(x) = \log_e(1 + e^x)$$

(SoftPlus)' (11B)
$$f'(x) = \frac{1}{1 + e^x}$$

By forming the hardware-based activation function accelerators 800, and coupling these accelerator units to the stream switch 500, the convolution processes of a convolutional neural network or other machine learning device can execute with improved flexibility, data locality, and speed.

FIGS. 8A-8H may collectively be referred to herein as FIG. 8.

Figure 8A:
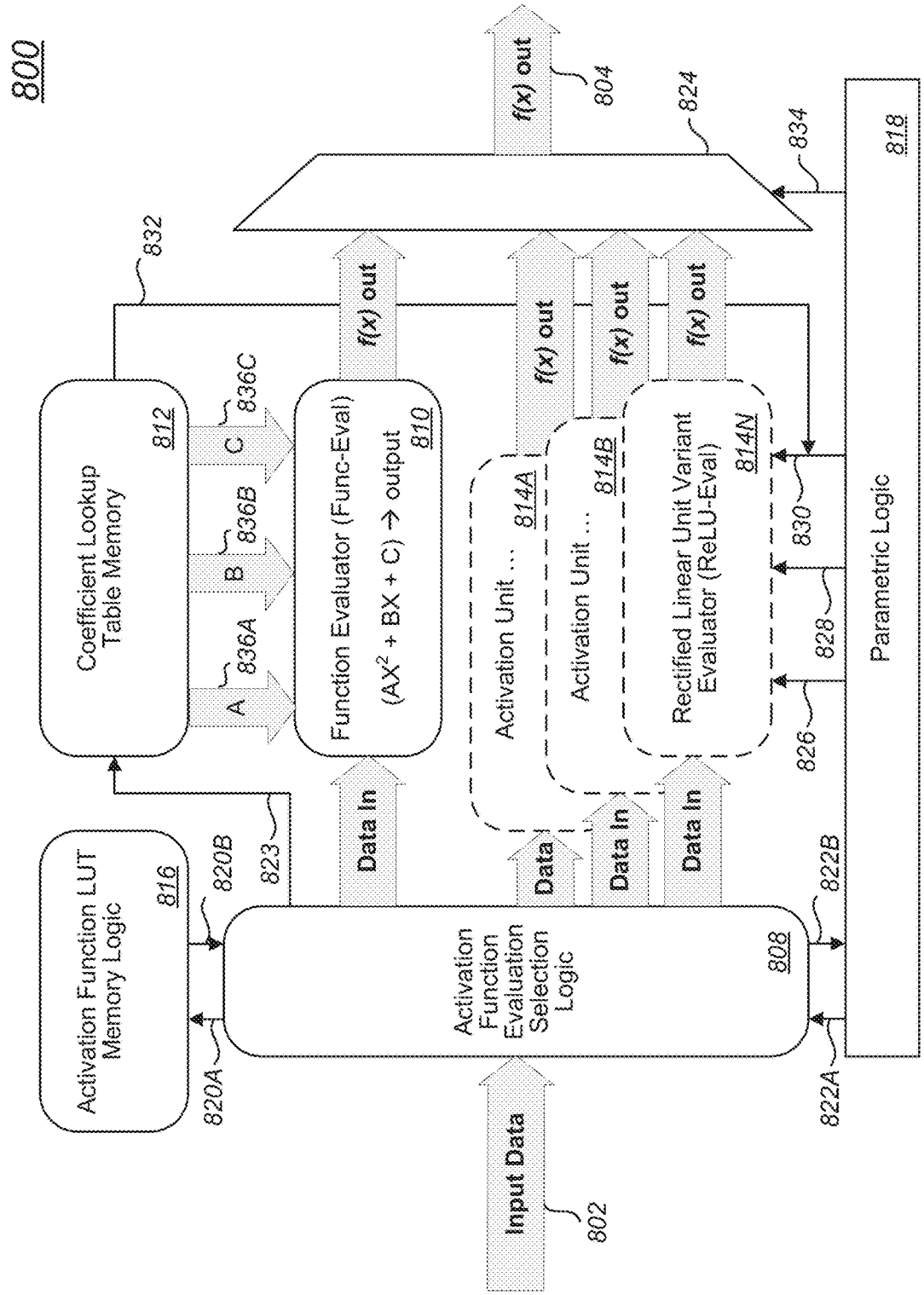
FIG. 8A is an embodiment of an activation function accelerator.

FIG. 8A is an embodiment of an activation function accelerator 800. Input data 802 is streamed into the activation function accelerator 800, and function output data 804 is passed out from the activation function accelerator 800. Activation function evaluation selection logic (EFESL) 808 directs operations of the activation function accelerator 800.

Every activation function accelerator 800 includes function evaluator logic 810. The function evaluator logic 810 is an adaptable hardware logic block arranged to accelerate any desirable activation function and represent the function in the form of a piece-wise second order polynomial approximation (Equation 1). To implement the second order polynomial approximation, a dedicated data repository, such as a memory, is organized as a coefficient lookup table to feed coefficient data into the function evaluator logic 810. In FIG. 8A, the coefficient lookup table memory 812 is illustrated as an integral part of the activation function accelerator 800, however in other embodiments, the coefficient lookup table memory 812 may be located in a different part of the CAF 400 (FIG. 4) or in a different part of SoC 110. In some cases, the coefficient lookup table memory 812 is a small memory that is pre-loaded with data to support one or more particular activation functions (e.g., during an initialization operation). In some cases, the coefficient lookup table memory 812 is a larger memory that stores coefficient data to support many or all of the activation functions that will be used in a particular neural network embodiment. In these and still other cases, the coefficient lookup table memory 812 may be arranged as a coefficient repository coupled to the function evaluator logic 810 (e.g., an arithmetic unit) and arranged to concurrently store coefficients for at least two activation functions.

Optionally, the activation function accelerator 800 includes zero or more dedicated data paths expressly arranged to implement a particular activation function. Three optional dedicated activation units are shown in the activation function accelerator 800 of FIG. 8A, but in other embodiments, an activation function accelerator 800 may include only a first dedicated activation unit 814A, first and second dedicated activation units 814A, 814B, or some other number of dedicated activation units.

Based on the inventors' discoveries, it has been learned that including at least one dedicated activation unit in addition to the function evaluator logic 810 will increase the speed and efficiency of convolution processes. Along these lines, in at least some embodiments, an activation function accelerator 800 includes a dedicated activation unit 814N arranged as a rectified linear unit (ReLU) variant evaluator (ReLU-EVAL). Including this dedicated activation unit 814N is desirable because certain ReLU variants (e.g., plain, leaky, parametric, and the like) are used frequently in convolutional neural networks.

To further support the operations of the activation function accelerator 800, the activation function evaluation selection logic 808 is communicatively coupled to a LUT memory logic module 816 and a parametric logic module 818. The communicative coupling may be unidirectional or bidirectional, and the communication may be arranged by direct signaling, a proprietary or standardized communication protocol, or by any other means. Communication lines 820A, 820B represent signal paths between the activation function evaluation selection logic 808 and the LUT memory logic module 816, and communication lines 822A, 822B represent signal paths between the activation function evaluation selection logic 808 and the parametric logic 818.

The LUT memory logic module 816 is arranged to cooperate with the activation function evaluation selection logic 808 to direct a timely delivery of coefficients from the coefficient lookup table memory 812 to the function evaluator logic 810. In some cases, coefficients of one activation function fill all of the available space in the coefficient lookup table memory 812. In some cases, even when the coefficients of one activation function do not fill all of the available space in the coefficient lookup table memory 812, no other coefficients are stored in the memory 812. In still other cases, the coefficients of two or more activation functions are concurrently stored in the coefficient lookup table memory 812, and in these cases, the coefficients may be used sequentially, in parallel, or in any desirable delivery format.

Acting in harmony with operations where the activation function evaluation selection logic 808 interrogates and receives data from the LUT memory logic module 816, the activation function evaluation selection logic 808 directs the coefficient lookup table memory 812 via a communication line 823. The communication is illustrated in FIG. 8A as unidirectional, but in some cases, communication may be bidirectional. For example, in the case of an error or other unexpected condition, the coefficient lookup table memory 812 may pass information back to the activation function evaluation selection logic 808 via an embodiment wherein communication line is arranged for bi-directional communications.

In some cases, the activation function evaluation selection logic 808, the logic of LUT memory logic module 816, or some other logic controls embodiments where coefficients for two or more activation functions are stored in the coefficient lookup table memory 812. In cases where only a single function is active and performing acts in the function evaluator logic 810 at a given time, the coefficient lookup table memory 812 can be dedicated for coefficients of the single function. One example of such singular operation includes exponential function enabled to perform the function on an input stream. In these cases, the coefficient lookup table memory 812 is programmed only with coefficients corresponding to an implementation of the exponential function. In other cases, however, there may be situations in which the function to be evaluated via the function evaluator logic 810 does not require all of the coefficient lookup table memory 812 memory to achieve the desired accuracy. Hence, in some cases, it is possible to share the coefficient lookup table memory 812 memory with coefficients of two or more functions thereby allowing the coefficient lookup table memory 812 to be primed with coefficient data for multiple functions even if only one function is active at a time. In this way, the activation function accelerator 800 may optionally permit two or more concurrent maintaining of multiple function contexts.

In optional cases where two or contexts are maintained (i.e., coefficients of two or more activation functions are concurrently stored in coefficient lookup table memory 812), the data can be used in many different ways. One way, for example, is to provide a function identifier (function ID) field in one or more configuration registers (e.g., parameter logic 818, CAF control registers 402, or the like). Passing the function ID to the coefficient lookup table memory 812 via communication line 823, for example, may be one way of indexing or otherwise triggering proper coefficients to be timely applied to the function evaluator logic 810. Another way of activating a function in the function evaluator logic 810 includes sending a configuration message via the stream link 502. In these cases, optional command information related to timely provision of desired coefficients from the coefficient lookup table memory 812 may be parsed and acted on.

Along these lines, the parametric logic 818 is arranged to cooperate with the activation function evaluation selection logic 808 to direct the timely delivery of streaming input data to the proper activation function circuitry. In some cases, the input data is passed only to the function evaluator logic 810 or only to any one or more of the desirable dedicated activation units 814A, 814B, 814N. In other cases, input data is passed to both (or all as the case may be) of the function evaluator logic 810 and to any one or more of the desirable dedicated activation units 814A, 814B, 814N.

The parametric logic module 818 may include memory, registers, combinatorial logic, switching logic, a state machine, a processor, or some other logic. The parametric logic module 818 may be directed by other operations of a particular machine learning algorithm. In some cases, the parametric logic module 818 is formed in or as part of a CAF control register module 402 (FIG. 4).

Some embodiments of the activation function accelerator 800 are arranged to receive control information or other direction signals from the activation function evaluation selection logic 808 via communication line 822B. This control or direction information may be retrieved from the input data 802 or from some other source such as a machine learning algorithm. The parametric logic module 818 may use the control information to configure portions of its own logic. In the alternative, or in addition, the parametric logic module 818 may provide other information to the dedicated activation units 814A, 814B, 814N, to the activation function evaluation selection logic 808, to an output data selection circuit 824, and in some cases, even to the coefficient lookup table memory 812, and the function evaluator logic 810.

As discussed herein, the parametric logic module 818 is arranged to provide flexibility to the activation function accelerator 800. Along these lines, it is recognized that that the parametric logic module 818 may be configured in many ways to implement the functions of an activation function accelerator 800. In various embodiments, the parametric logic module 818 provides any one or more of an operation mode signal to the activation function evaluation selection logic 808 via communication line 822A, an operation mode signal to the dedicated activation units 814A, 814B, 814N on communication line 826, an operation mode signal to the function evaluator logic 810 on communication line 826, scalar parameters to the dedicated activation units 814A, 814B, 814N on communication line 828, scalar parameters to the function evaluator logic 810 on communication line 828, vector parameters to the dedicated activation units 814A, 814B, 814N on communication line 830, vector parameters to the function evaluator logic 810 on communication line 830, control data to or from the coefficient lookup table memory 812 on communication line 832, and a selection signal to the output data selection circuit 824 on communication line 834.

Various operations of embodiments of the activation function accelerator 800 depicted in FIG. 8A are now described. In the embodiments, streaming input data 802, such as feature map data, is passed into the activation function accelerator 800. The activation function evaluation selection logic 808 receives operation mode information (e.g., input feature geometry, table start address, and the like) from the parametric logic module 818 via communication line 822A. As input data 802 is streamed in, the activation function evaluation selection logic 808 passes feature number information to the activation function LUT memory logic 816 on communication line 820A, which passes activation type information back via line 820B. The activation function evaluation selection logic 808 uses the activation type information to calculate address information. The address information is passed via communication line 822 to the coefficient lookup table memory 812, which passes "A," "B," and "C," coefficient data to the function evaluator logic 810 via communication lines 836A, 836B, and 836C, respectively. The function evaluator logic 810 performs the second order polynomial approximation using the streaming input data (i.e., Data In) and the coefficient data (i.e., A, B, C), and the function evaluator logic 810 passes the generated function output data (i.e., f(x) out) through the output data selection circuit 824 as output data 804.

Figure 8B:
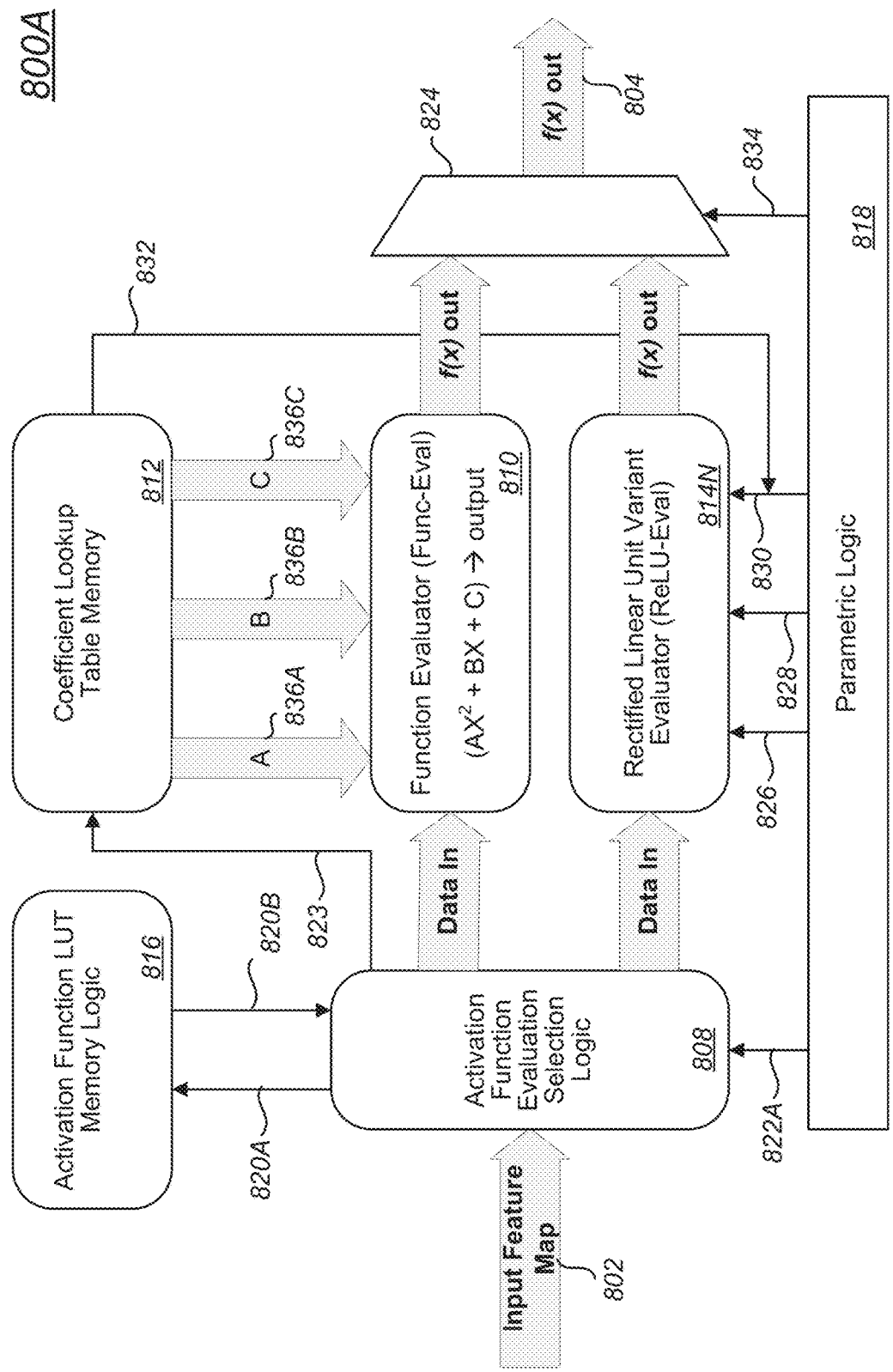
FIG. 8B is another embodiment of an activation function accelerator.

FIG. 8B is another embodiment of an activation function accelerator 800A. In an exemplary embodiment, the activation function accelerator 800A, just like the activation function accelerator 800 of FIG. 8A, may be formed as an arithmetic unit in an integrated circuit (e.g., a chip, a die, an integrated circuit package, and the like). The integrated circuit may be mounted in any type of computing device, such as a mobile computing device, and the integrated circuit may be arranged for convolutional neural network operations. The integrated circuit includes or is otherwise formed as a system on chip having a memory (e.g., random access memory (RAM), read only memory (ROM)), an applications processor, a digital signal processor cluster, and a configurable acceleration framework, which has a reconfigurable stream switch formed therein. The system includes at least one communication bus architecture communicatively coupling the applications processor, the DSP cluster, and the CAF to the memory. Other structures, such as power management structures, batteries, a user interface, network transceivers, sensors, and the like are understood, but not described in detail so as to avoid clouding or overshadowing other features of the disclosure. Nevertheless, it is understood that a power manager circuit electrically coupleable to a battery permits that battery to provide power to all of the circuits described in the present disclosure, and hence, the systems, devices, and methods described herein are each conducive to operations performed on a mobile device.

In the embodiment of FIG. 8B, two and only two data paths are formed. Nevertheless, it is appreciated that structures of FIG. 8B are represented and otherwise described with respect to FIG. 8A, and the same reference numbers are used in both embodiments. Where the structures and operations are the same, the information is not repeated again for brevity.

In FIG. 8B, a first data path passes input feature data through the activation function evaluation selection logic 808 into the function evaluator logic 810. The function evaluator logic 810 is dedicated to performance of a second order polynomial approximation having the form of Equation 1 and using coefficient data from coefficient lookup table memory 812. The second order polynomial approximation may be according to an activation function represented in any of Equations 2A to 11B herein or according to some other activation function. After the function evaluator logic 810 performs the approximation to generate function output data, the function output data passes from the function evaluator logic 810, through the output data selection circuit 824, and out of the activation function accelerator 800A as output data 804. The streaming input data 802 in FIG. 8B may be passed through reconfigurable stream switch 500 (FIGS. 4, 5), and the activation function output data 804 may be streamed through reconfigurable stream switch 500 o another portion of the configurable acceleration framework 400 (FIG. 4). In some cases, such as when the input data is image sensor feature data from an image sensor, the output data generated by the function evaluator logic 810 and streamed from the activation function accelerator 800A is used in a procedure (e.g., a deep convolutional neural network procedure) to identify at least one feature in the input data.

In FIG. 8B, a second data path passes input feature data through the activation function evaluation selection logic

808 into the rectified linear unit (ReLU) variant evaluator 814N, which is dedicated to implementing a particular ReLU function.

In some cases, the input data streamed into the activation function accelerator 800A is arranged as a multidimensional input feature volume. In some cases, the activation function accelerator 800A may be arranged to recognize the multi-dimensional input feature volume data without more information. In other cases, the activation function accelerator 800A may receive streaming input data that includes information specifying the geometric proportions of the input feature volume. The activation function accelerator 800A, using the activation function evaluation selection logic 808 for example, may be arranged to define an input tile having an input tile height, an input tile width, and an input tile depth. The feature volume may also have a feature volume height, a feature volume width, and a feature volume depth. In these cases, the data acted on by the function evaluator logic 810 or by the dedicated activation unit (e.g., dedicated activation unit 814A, 814B, 814N) is drawn from a procedure that walks the input tile through the input feature volume in an algorithmically configurable pattern. Here, the algorithmically configurable pattern can have a height, a width, and a depth, or the algorithmically configurable pattern can have other defining characteristics.

Figure 8C:
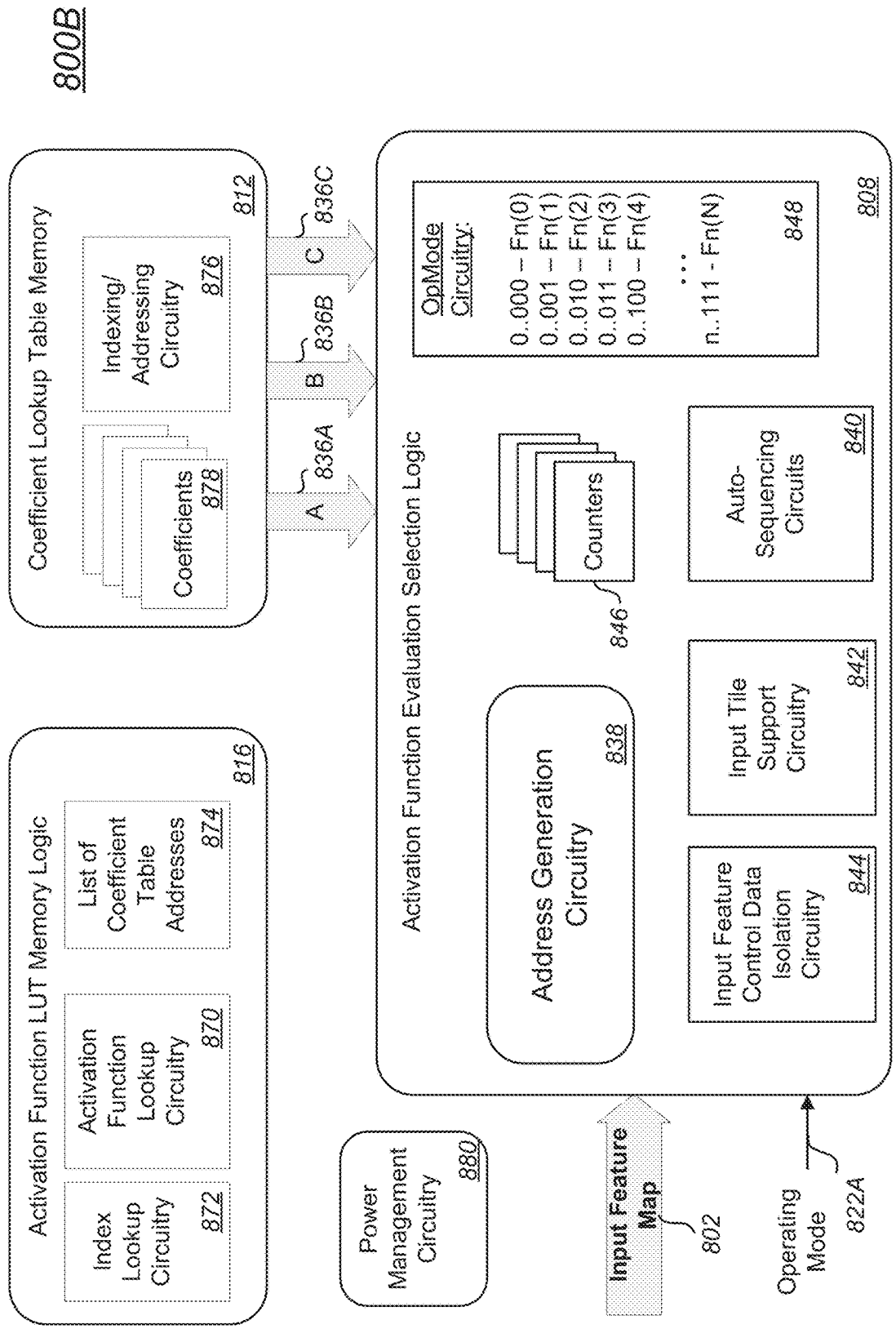
FIG. 8C depicts a first set of selected portions of an activation function accelerator.

FIG. 8C depicts a first set of selected portions of an activation function accelerator 800B. The activation function accelerator 800B may be along the lines of activation function accelerators 800 and 800A of FIGS. 8A and 8B, or the activation function accelerator 800B may be formed in other ways having features described in the present disclosure.

The input data 802 streamed into the activation function accelerator 800B is an input feature map. In this or in other cases, the input data 802 may be a feature volume, a tensor, or data in some other form.

FIG. 8D illustrates one visual representation of data having a form that may be streamed as input data 802 into an activation function accelerator 800B. The enclosing feature volume 850 of FIG. 8D has a feature width 852 (W), a feature height 854 (H), and a feature depth 856 (D). Dimensions of the feature volume are represented with upper-case letters, W, H, D. Also depicted in FIG. 8D, an input tile 860 is defined. The input tile 860 has an input tile width 862 (w), an input tile height 864 (h), and an input tile depth 866 (d). Dimensions of the input tile are represented with lower-case letters, w, h, d.

Turning back to FIG. 8C, the activation function evaluation selection logic 808 may include address generation circuitry 838. The address generation circuitry 838 is arranged to provide timed and sequenced addresses to the coefficient lookup table memory 812 data repository so that constant coefficient data (i.e., A, B, C) stored in a coefficients data repository 878 may be timely provided to the function evaluator logic 810 or in some cases to the dedicated activation unit 814A, 814B, 814N via communication paths 836A, 836B, 836C, respectively. As evident in FIG. 8C, coefficients data repository 878 may store coefficients of a plurality of activation functions. The addresses, and optionally the context identifying which coefficients are to be applied, may, for example, be provided via communication line 823 (FIGS. 8A, 8B) or via some other means. The address generation circuitry 838 may include auto-sequencing circuitry 840 to increment addresses, decrement addresses, offset addresses, interleave addresses, apply constant or variable strides, or perform other memory address configuration operations. Operations of the address generation circuitry 838 may be directed by the activation function evaluation selection logic 808, the parametric logic module 818 (e.g., operation mode signaling, input feature geometry signaling, table start address signaling, or the like), or by other circuits of the device.

To support operations of the address generation circuitry 838, the parametric logic module 818 may include memory, registers, buffers, and other repository circuitry that provide suitable storage and dissemination of control information. The repository circuitry of the parametric logic module 818 may also include other exemplary parameter circuitry (e.g., sub-circuits or configuration parameter circuits) such that fixed point arithmetic shift constants, operating mode signals and associated parameters, and scalar constants A, B, C can be provided to the activation function evaluation selection logic 808 or other portions of the activation function accelerator 800B. And the parametric logic module 818 may further include arithmetic shift circuitry to implement any number of right-shift values, left-shift values, or some other shift arrangement. The shift operations may be performed on any suitable values (e.g., addresses, data, multiply values, divide values, align values, scale values, sums, products, or shift data for another reason).

The address generation circuitry 838 may be arranged to work cooperatively with other circuits of the activation function evaluation selection logic 808 to flexibly support convolution operations of a machine learning algorithm. For example, operating mode parameters can be arranged to support feature input streams of any desirable geometry. Because of this support, the feature volume is not limited to any specific Width-by-Height-by-Depth (W×H×D) shapes as in at least some conventional cases. Instead, input tile support circuitry 842 of the address generation circuitry 838 can be configured to support nearly any scalable and flexible three-dimensional (3D) tiling scheme and feature volume 'walking' scheme. By specifying the input geometry (i.e., W×H×D) of the feature volume, and by specifying the width-by-height-by-depth (w×h×d) dimensions of the input tile, and by specifying the walking order, the input tile support circuitry 842 can be configured and applied to walk a given input through a feature volume in any desirable order.

Figure 8E:
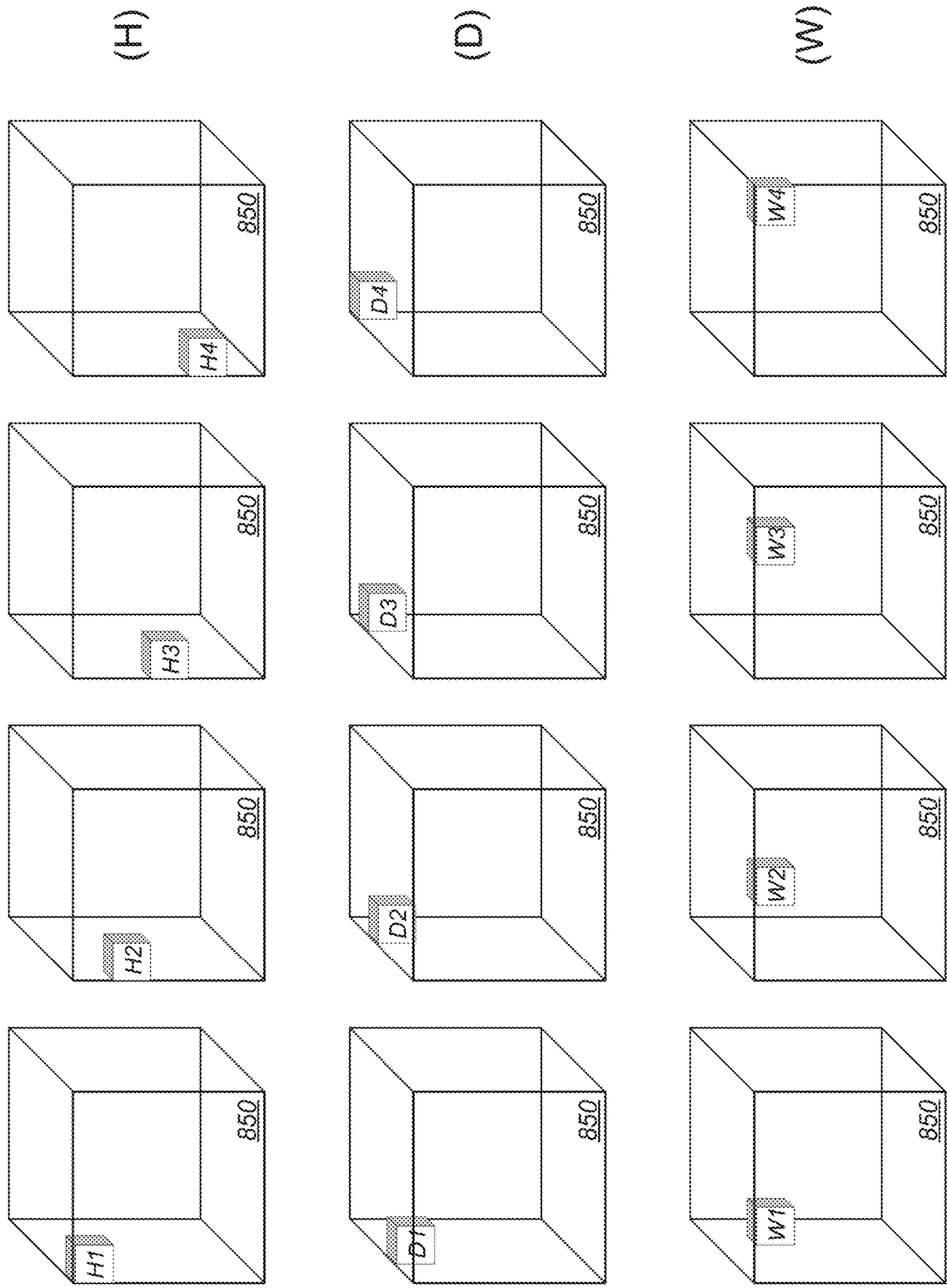
FIG. 8E is an input tile walked through a feature volume across height (H), followed by depth (D), followed by width (W)

Considering FIG. 8E, for example, the input tile 860 is walked through the feature volume 850 across height (H), followed by depth (D), followed by width (W).

Figure 8F:
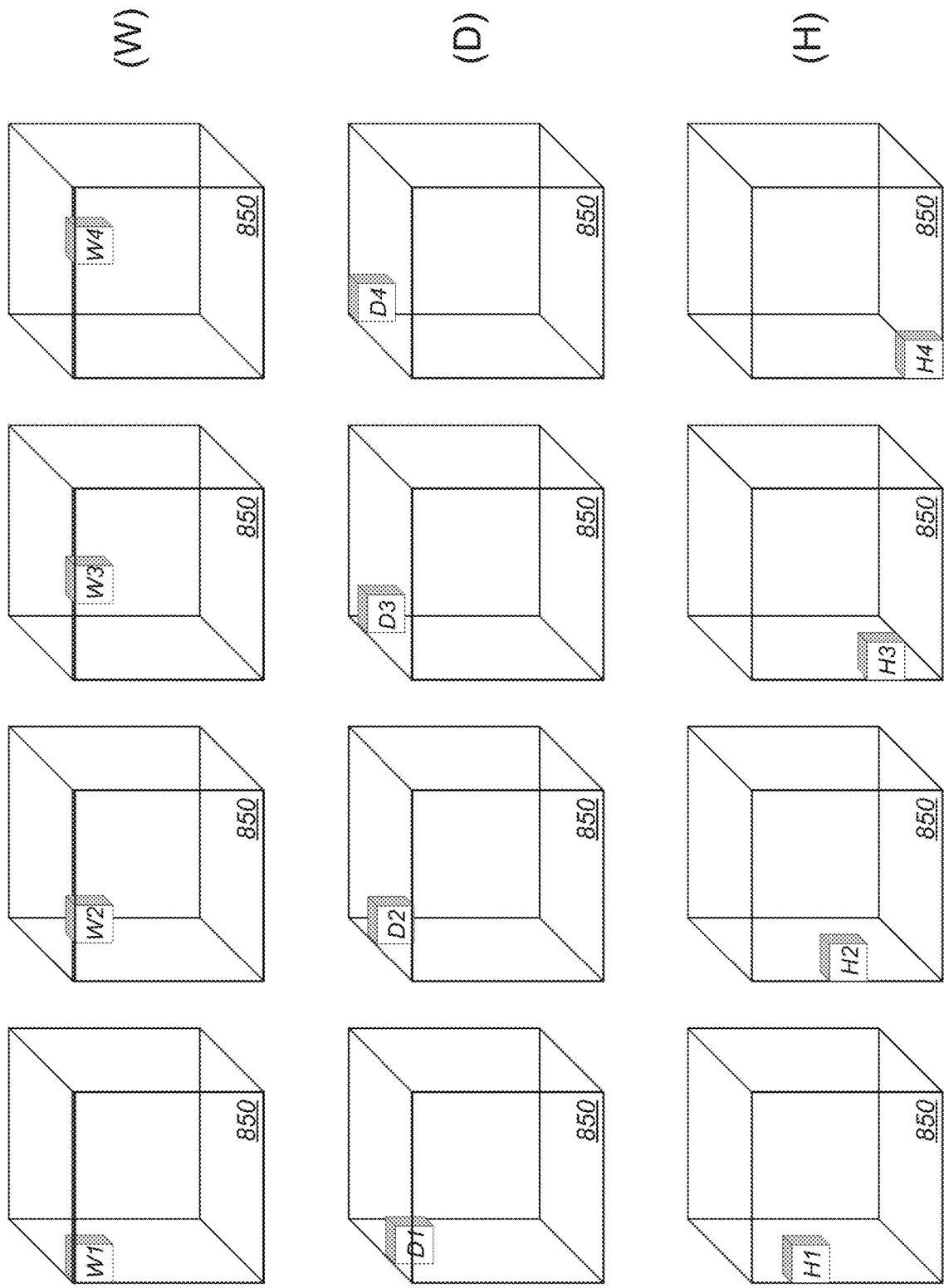
FIG. 8F is the input tile walked through the feature volume across width (W), followed by depth (D), followed by height (H)

Considering FIG. 8F, for example, the input tile 860 is walked through the feature volume 850 across width (W), followed by depth (D), followed by height (H).

In other cases, the input tile support circuitry 842 can be configured and used to walk the input tile 860 through the feature volume across depth, followed by height, followed by width, or in any other desirable pattern. In some cases, particular registers in or associated with the input tile support circuitry 842 are defined that set forth a particular walking order, stride, pattern, and the like. The pattern can be regular, irregular, or formed in any other way.

As evident in the examples of input tile 860 walking, the feature volume 850 can be navigated in many different ways by setting appropriate parameters in or for the address generation circuitry 838. Hence, the activation function accelerator 800B can operate with incoming data in nearly any particular format. The address generation unit 838 is arranged to properly address the "A," "B," and "C" values to apply in the activation function to the incoming data as specified by the input tile walking order, the input tile geometry, and the feature volume geometry.

One advantage of the cooperative configuration between the address generation unit 838, the activation function evaluation selection logic 808, the parametric logic module 818, and in some cases other circuits is that a convolution accelerator 600 that feeds activation function accelerator 800B can operate at any desirable granularity of data that is most acceptably optimal in terms of balancing performance, power, memory bandwidth, and data reuse; and in these cases, the convolution accelerator 600 can feed data directly to the activation function accelerator 800B through a reconfigurable stream switch 500 without any need to rearrange or reassemble the data in any other way. The machine learning algorithm specifies the expected input tile and feature volume input geometry using, for example, registers of the parametric logic module 818 that cooperate with the address generation circuitry 838.

To further support flexibility in defining the input feature volume and input tile structures, the activation function evaluation selection logic 808 may include input feature control data isolation circuitry 844. The optional input feature control data isolation circuitry 844, when included and used in an activation function accelerator 800B, can monitor input feature data that passes into the activation function accelerator 800B. In this way, a machine learning algorithm can arrange to pass data through a stream switch, and the machine learning algorithm can embed control information within the data. The control information may specify geometry of the feature map, geometry of the input tile, an input tile walking pattern, stride, boundaries, or any other relevant parameters, and these parameters are isolated by the input feature control data isolation circuitry 844. Once the parameters are isolated or otherwise retrieved, they can be used as described herein to direct the timely delivery of configuration parameters, addresses, or the like within the activation function accelerator 800B.

In some cases, the address generation circuitry 838 may be implemented with a plurality of auto-reloading counters 846 (e.g., four auto-reloading counters). The auto-reloading counters 846 may be prioritized, cascaded, operated in parallel, independent, or the counters may cooperate in other ways. Each of the auto-reloading counters 846 may, for example, be used to "count" the directional walking of the input tile 860 through the feature volume 850. For example, addresses can be auto-generated in the address generation circuitry 838 using values from the counters such that the input tile 860 walks across the height, width, and depth of the feature volume 850 in the order specified by the machine learning algorithm.

In other cases, the address generation circuitry 838 is further arranged to perform additional operations related to the activation functions enabled by the activation function accelerator 800B. For example, the address generation circuitry 838 may be arranged to cooperate with the activation function LUT memory logic 816 to determine an address or index of a particular feature along a depth, width, or height dimension. Here, a "feature number," for example, can correspond to a particular index, address, or other information associated with the corresponding dimension of the incoming input stream or tensor. The feature number can be used by activation function lookup circuitry 870 to lookup an activation function type in activation function LUT memory logic 816, which is enabled to return "activation type" information. The activation type information can be used as a start address of a table stored in memory, an index, or some other information that permits proper lookup (e.g., using indexing/addressing circuitry 876) in the coefficient lookup table memory 812. In this way, the desired second order polynomial approximation (e.g., corresponding to one of Equations 2A-11B) will be performed on the correct data, and any number of same or different activation functions can be performed on the same data or different data very efficiently (e.g., using less power than a corresponding conventional operation), very quickly (e.g., faster than a corresponding conventional operation), and with an acceptably small amount of memory.

In some embodiments, the activation function evaluation selection logic 808 receives the operating mode information on communication line 822A. The operating mode may be used by operating mode circuitry 848 to determine which activation function will be applied. In some cases, the operating mode circuitry 848 defines table operations that select an activation function based on a determined bit pattern. The pattern can comprise any number of bits or a different means, such as combinatorial logic, to select a desired activation function. Operating mode circuitry 848 is illustrated as formed within the activation function evaluation selection logic 808. In other cases, the operating mode circuitry 848 is formed in another part of the activation function accelerator 800B and arranged to act in concert with the activation function evaluation selection logic 808.

The operating mode circuitry may be supported by other circuits of the activation function accelerator 800B. For example, in some cases, the activation function LUT memory logic 816, or some other part of the activation function accelerator 800B, includes index lookup circuitry 872 and a list of coefficient table addresses 874. When so directed by the activation function evaluation selection logic 808, for example using control information or data passed on communication line 820A (FIG. 8A), the index lookup circuitry 872 is arranged to retrieve a particular index. The index may be used by the operating mode circuitry 848 to select a proper configuration of function evaluator logic 810. The index may also be used by the activation function LUT memory logic 816 to select proper table addresses from the list of coefficient table addresses 874. The list of coefficient table addresses 874 may be formed in memory and be desirably loaded during initialization of the device, during reprogramming of the device, during operation of a machine learning algorithm, or at other times. In some cases, the list of coefficient table addresses 874 passes address information via communication line 820B (FIG. 8A), which is then communicated to the coefficient lookup table memory 812 via communication line 823, to select coefficients from the coefficients data repository 878 that correspond to the selected activation function.

In one exemplary case implemented by the inventors, the operating mode circuitry 848 selects from a 3-bit pattern. The exemplary case is non-limiting, but representative of one way in which the activation function evaluation selection logic 808 can determine an operating mode and select an appropriate activation function. In such cases, the 3-bit pattern may also be used optionally to select one of a plurality of contexts of coefficients concurrently stored in the coefficient lookup table memory 812.

According to the operating mode circuitry 848, when an operating mode is 000b, a first rectified linear unit (ReLU) operation is performed (e.g., Fn(0)).

When an operating mode is 001b, a first parametric ReLU operation is performed (e.g., Fn(1)). In the first parametric ReLU operation, a single parameter is applied to each feature of an input tensor. The single parameter can be supplied via a register of the parametric logic module 818 or from some other location.

When an operating mode is 010b, a second parametric ReLU operation is performed (e.g., Fn(2)). Here, a different parameter can be applied to each feature of the input tensor. In at least one case, the number of parameters is the same as the depth of the input feature volume, and the parameters can be supplied via a register of the parametric logic module 818 or from some other location.

When an operating mode is 011b, a thresholded ReLU operation is performed (e.g., Fn(3)). In this case, a single "threshold" parameter is applied to each feature of the input tensor. The threshold parameter can be supplied via a register of the parametric logic module 818 or from some other location.

When an operating mode is 100b, a function evaluator is active (e.g., Fn(4)), and every feature uses the same function. This mode can represent a way of performing multiple activation functions.

When an operating mode is 101b, a function evaluator is active, and every feature may use a different activation function. The 101b operating mode may therefore be acted on in the operating mode circuitry 848 to cause operations in the activation function LUT memory logic 816 and the coefficient lookup table memory 812.

Other operating modes can of course defined.

Recognizing that not every mode implicates all of the circuitry of the activation function accelerator 800B, the operating mode may also be used to control power management circuitry 880, which may be electrically coupled to one or more batteries. For example, when an operating mode performs only a ReLU variant evaluator operation, the dedicated activation unit 814N can be activated, and other circuits, such as the activation function LUT memory logic 816 and the coefficient lookup table memory 812, can be clock gated, powered down, or treated in another way via operations performed or directed by the power management circuitry 880. Other operations along these lines can be cooperatively implemented with the activation function evaluation selection logic 808.

Figure 8G:
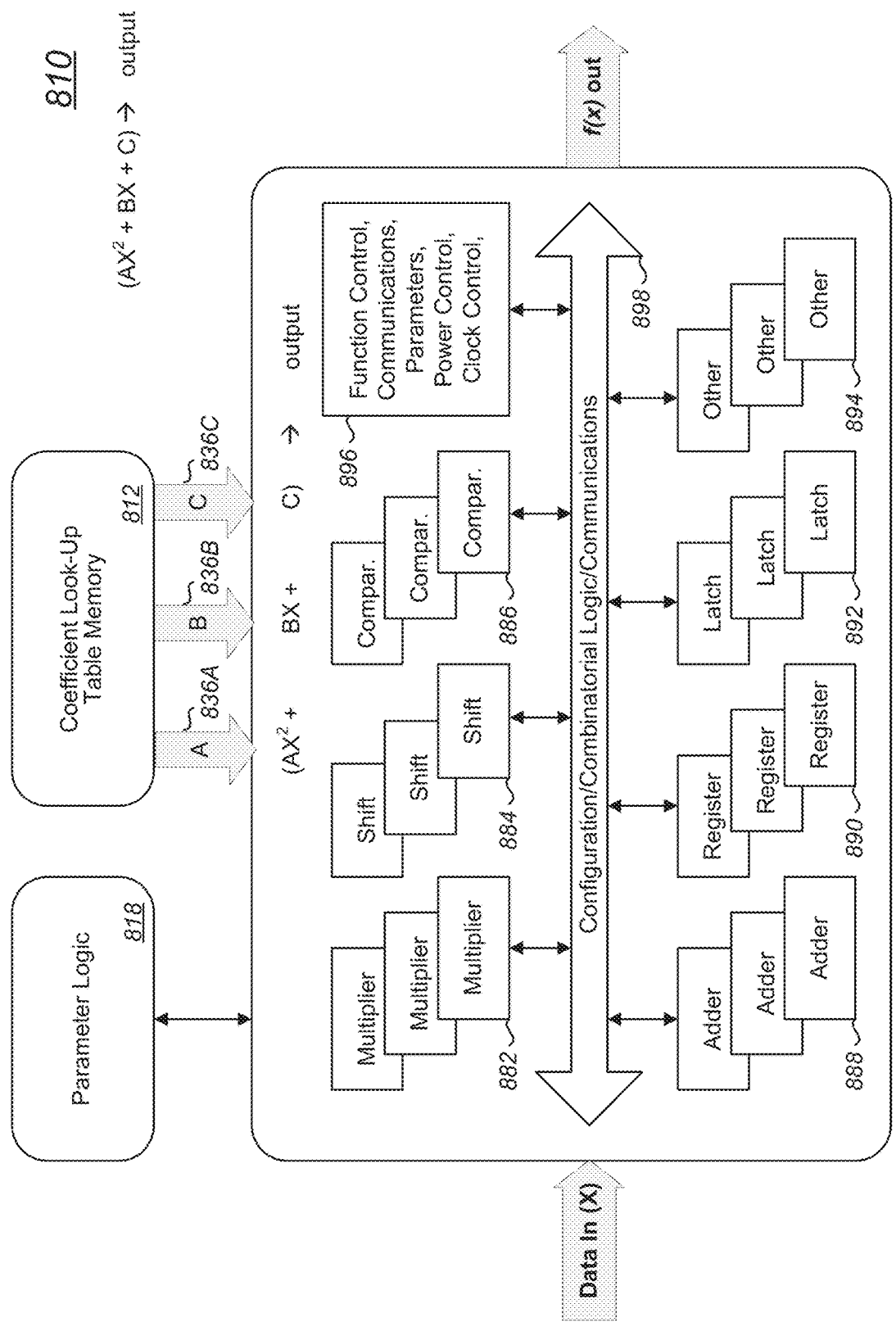
FIG. 8G is an embodiment of a function evaluator logic module of the type shown in FIGS. 8A and 8B.

FIG. 8G is an embodiment of a function evaluator logic 810 module of the type shown in FIGS. 8A and 8B. The function evaluator logic 810 is arranged to perform a second order polynomial approximation having the form depicted in Equation 1. The embodiment represented in FIG. 8G is can be suitably arranged in many ways to perform the desired second order polynomial approximation, and to this end, the arrangement of structures, number of structures, positioning of structures, and whether or not any of the particular structures are even included in the embodiment is shown so as to simplify the figure while still conveying an understanding of the function evaluator logic 810 technology to one of ordinary skill in the art.

The function evaluator logic 810 includes multiplier circuitry 882, shift circuitry 884, comparator circuitry 886, adder circuitry 888, repository circuitry 890, latch circuitry 892, other circuitry 894, and control circuitry 896. Other circuits may also be included, but which are not shown for simplicity.

In some embodiments, as directed by control information, one or more of the circuits in the function evaluator logic 810 are configurably coupled together via bus circuitry 898, which may include configuration circuits, data paths, combinatorial logic, switching logic, communication paths, and the like. In this way, the function evaluator logic 810 can be configured to perform one, two, or any other desirable number of second order polynomial approximations having the form depicted in Equation 1. In other embodiments, the function evaluator logic 810 includes only a single circuit that is dedicated to performance of a single second order polynomial approximation having the form depicted in Equation 1. So in some cases, the function evaluator logic 810 is flexible and configurable, while in other cases, the function evaluator logic 810 is dedicated to only a single task and not flexible or configurable at all.

The multiplier circuitry 882 may be arranged to perform fixed point multiplication operations, floating point multiplication operations, look-up table multiplication operations, or other multiplication operations. The multiplication circuitry 882 can be arranged to multiply stream input data (e.g., "X") by itself in a squaring operation (e.g., "X"×"X" or "$X^2$"). The multiplication circuitry 882 can be further arranged to multiply the squared product by a coefficient vector (e.g., "A") passed from coefficient lookup table memory 812 via communication path 836A. Additionally, the multiplication circuitry 882 may be further arranged to multiply stream input data (e.g., "X") by a coefficient vector (e.g., "B") passed from coefficient lookup table memory 812 via communication path 836B.

The shift circuitry 884 may be arranged to support the multiplier circuitry 882 or other functions such as normalization of input data, interpretation of control parameters, and the like.

The comparator circuitry 886 may be used to compare any one piece of data against any one or more other pieces of data. Inputs to the comparator circuitry 886 may include stream input data (e.g., "X"), coefficient vector data (e.g., "A," "B," "C"), constant values from inside or outside the function evaluator logic 810, and other values.

Adder circuitry 888 may be arranged to sum any one or more values such as first term data in the second order polynomial approximation (e.g., "$AX^2$"), second term data in the second order polynomial approximation (e.g., "BX"), third term data in the second order polynomial approximation (e.g., "C"), or any other values.

The data repository circuitry 890 may include registers, buffers, memory arrays, first-in-first-out (FIFO) structures, or the like. In some cases, the data repository circuitry 890 is formed within the function evaluator logic 810, and in other cases, the data repository circuitry 890 is separate from the function evaluator logic 810 (e.g., part of the parameter logic module 818, or the like). Portions of the data repository circuitry 890 may store values to be multiplied, added, compared, shifted, output, or the like. Along these lines, portions of the data repository circuitry 890 may store products, sums, output function values, or the like. The data stored in data repository circuitry 890 may be vector data, scalar data, or data of some other format.

Latch circuitry 892 is arranged to temporarily store values that would or could otherwise be transitory. In some cases, output function values are stored in latch circuitry 892 prior to being passed out from the function evaluator logic 810.

The other circuitry 894, when included in the function evaluator logic 810 may be arranged for any other desirable use. For example, the other circuitry 894 may perform or approximate delay operations, inversion operations, gating operations, switching operations (e.g., multiplexing, de-multiplexing, and the like), rounding operations, user interface operations, packetizing operations, phase shift operations, threshold operations, and the like.

And the control circuitry 896 is arranged to direct operations of the function evaluator logic 810. The control circuitry 896 may include communication circuits or management control of the functions that configure the bus circuitry and other features of the function evaluator logic 810. The control circuitry may store or direct certain parameters of the function evaluator logic 810. The control circuitry 896 may also interact with the power management circuitry 880 (FIG. 8C) to reduce power, increase power, change clock parameters, and the like in dependence on how a machine learning algorithm is using the function evaluator logic 810.

Figure 8H:
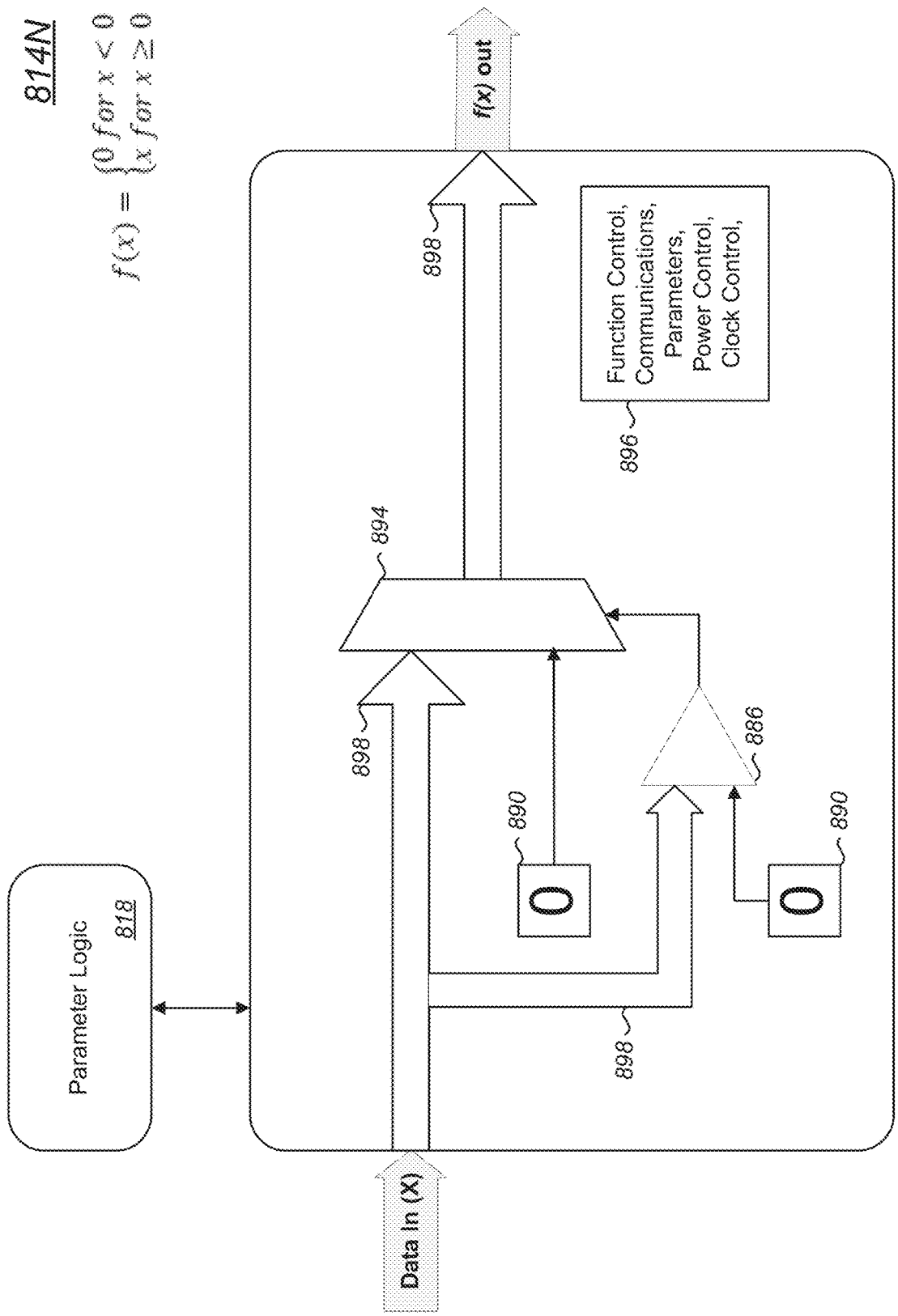
FIG. 8H is an embodiment of a dedicated activation unit expressly arranged to perform a rectified linear unit (ReLU) activation function.

FIG. 8H is an embodiment of a dedicated activation unit 814N expressly arranged to perform a rectified linear unit (ReLU) activation function. The dedicated activation unit 814N includes bus circuitry 898, data repository circuitry 890, comparator circuitry 886, other circuitry 894 arranged as a multiplexor switching circuit, and control circuitry 896.

In the dedicated activation unit 814N of FIG. 8H, input data is passed into the rectified linear unit (ReLU) activation function and communicated to a comparator circuit 896. The input data is compared to a value of zero that is stored in the data repository circuitry 890. If the input data is less than zero, then one signal is passed into the multiplexer circuit; and if the input data is not less than zero, then an alternative signal is passed into the multiplexor circuit. Depending on the outcome of the comparison by comparator circuitry 886, either the input data or a zero value will be passed to the output of the dedicated activation unit 814N (i.e., the output of the ReLU function).

The present disclosure refers to a "semiconductor practitioner." A semiconductor practitioner is generally one of ordinary skill in the semiconductor design and fabrication arts. The semiconductor practitioner may be a degreed engineer or another technical person or system having such skill as to direct and balance particular features of a semiconductor fabrication project such as geometry, layout, power use, included intellectual property (IP) modules, and the like. The semiconductor practitioner may or may not understand each detail of the fabrication process carried out to form a die, an integrated circuit, or other such device.

FIGS. 8A-8H include data flow diagrams illustrating non-limiting processes that may be used by embodiments of the mobile computing device 100. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing device embodiments such as mobile device 100. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Amongst other things, the exemplary mobile devices of the present disclosure (e.g., mobile device 100 of FIG. 3) may be configured in any type of mobile computing device such as a smartphone, a tablet, a laptop computer, a wearable device (e.g., eyeglasses, jacket, shirt, pants, socks, shoes, other clothing, hat, helmet, other headwear, wristwatch, bracelet, pendant, other jewelry), vehicle-mounted device (e.g., train, plane, helicopter, unmanned aerial vehicle, unmanned underwater vehicle, unmanned land-based vehicle, automobile, motorcycle, bicycle, scooter, hoverboard, other personal or commercial transportation device), industrial device, or the like. Accordingly, the mobile devices include other components and circuitry that is not illustrated, such as, for example, a display, a network interface, memory, one or more central processors, camera interfaces, audio interfaces, and other input/output interfaces. In some cases, the exemplary mobile devices may also be configured in a different type of low-power device such as a mounted video camera, an Internet-of-Things (IoT) device, a multimedia device, a motion detection device, an intruder detection device, a security device, a crowd monitoring device, or some other device.

Processors, as described herein, include central processing units (CPU's), microprocessors, microcontrollers (MCU), digital signal processors (DSP), application specific integrated circuits (ASIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. A processor may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

In some cases, the processor or processors described in the present disclosure, and additionally more or fewer circuits of the exemplary mobile devices described in the present disclosure, may be provided in an integrated circuit. In some embodiments, all of the elements shown in the processors of the present figures (e.g., SoC 110) may be provided in an integrated circuit. In alternative embodiments, one or more of the arrangements depicted in the present figures (e.g., SoC 110) 6 may be provided by two or more integrated circuits. Some embodiments may be implemented by one or more dies. The one or more dies may be packaged in the same or different packages. Some of the depicted components may be provided outside of an integrated circuit or die.

The processors shown in the present figures and described herein may be fixed at design time in terms of one or more of topology, maximum available bandwidth, maximum available operations per unit time, maximum parallel execution units, and other such parameters. Some embodiments of the processors may provide re-programmable functionality (e.g., reconfiguration of SoC modules and features to implement a DCNN) at run-time. Some or all of the re-programmable functionality may be configured during one or more initialization stages. Some or all of the re-programmable functionality may be configured on the fly with no latency, maskable latency, or an acceptable level of latency.

As known by one skilled in the art, a computing device as described in the present disclosure, and mobile device 100 being such a computing device, has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

The computing devices illustrated and described herein, of which mobile device 100 is one example, may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity, but are well understood by skilled practitioners.

When so arranged as described herein, each computing device may be transformed from a generic and unspecific computing device to a combination device comprising hardware and software configured for a specific and particular purpose. Along these lines, the features of the combination device bring improvements to the technological computing arts heretofore unseen and unknown.

Database structures, if any are present in the mobile devices or supporting network devices described herein, may be formed in a single database or multiple databases. In some cases hardware or software storage repositories are shared amongst various functions of the particular system or systems to which they are associated. A database may be formed as part of a local system or local area network. Alternatively, or in addition, a database may be formed remotely, such as within a "cloud" computing system, which would be accessible via a wide area network or some other network.

In at least one embodiment, mobile devices described herein may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, WiFi, cellular-based networks, or the like.

Buttons, keypads, computer mice, memory cards, serial ports, bio-sensor readers, touch screens, and the like may individually or in cooperation be useful to an operator of the mobile device or other such devices as described herein. The devices may, for example, input control information into the system. Displays, printers, memory cards, LED indicators, temperature sensors, audio devices (e.g., speakers, piezo device, etc.), vibrators, and the like are all useful to present output information to the operator of these mobile devices. In some cases, the input and output devices are directly coupled to the control systems described herein and electronically coupled to a processor or other operative circuitry. In other cases, the input and output devices pass information via one or more communication ports (e.g., RS-232, RS-485, infrared, USB, etc.)

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks, have not been shown or described in detail to avoid unnecessarily obscuring descriptions of the embodiments.

Unless the context requires otherwise, throughout the specification and claims which follow, the word "comprise," and variations thereof, such as "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
    an integrated circuit;
    a reconfigurable stream switch formed in the integrated circuit; and
    an arithmetic unit, the arithmetic unit having:
        at least one input coupled to the reconfigurable stream switch and arranged to receive streaming data passed through the reconfigurable stream switch;
        at least one output coupled to the reconfigurable stream switch and arranged to stream resultant data through the reconfigurable stream switch; and
        a plurality of data paths, at least one of the plurality of data paths dedicated to implementing an activation function according to an approximation of a second order polynomial, the second order polynomial having the form: output=$AX^2$+BX+C where X corresponds to streaming data associated with the activation function, and A, B and C are coefficients of the activation function.

2. The device according to claim 1 wherein the at least one of the plurality of data paths dedicated to implementing the activation function is dedicated to implementing a rectified linear unit (ReLU) function.

3. The device according to claim 1 wherein the at least one data path dedicated to implementing the activation function is configurable to implement an identify function, a binary step function, a soft-step function, a hyperbolic tangent function, an arc-tangent function, a rectified linear unit (ReLU) function, a parametric ReLU function, an exponential linear unit function, a soft-plus function, or combinations thereof.

4. The device according to claim 1 wherein the integrated circuit is arranged for convolutional neural network operations.

5. The device according to claim 1, comprising:
    a coefficient repository coupled to the arithmetic unit, the coefficient repository arranged to concurrently store coefficients for at least two activation functions.

6. The device according to claim 1 wherein the arithmetic unit is configurable to accept the streaming data as a multidimensional input feature volume.

7. The device according to claim 6 wherein the streaming data includes information specifying geometric proportions of the input feature volume.

8. The device according to claim 6 wherein the arithmetic unit is arranged to define an input tile having an input tile height, an input tile width, and an input tile depth, and wherein the arithmetic unit is arranged to walk the input tile through the input feature volume in an algorithmically configurable pattern.

9. The device according to claim 8 wherein the algorithmically configurable pattern has a height, a width, and a depth.

10. The device according to claim 1, wherein the arithmetic unit includes:
    a data repository dedicated to storage of a look up table (LUT), the LUT arranged to store data for performing a plurality of second order polynomial approximations.

11. A machine learning method, comprising:
    streaming input data through a reconfigurable stream switch;
    receiving the input data streamed through the reconfigurable stream switch at an input of an arithmetic unit, the arithmetic unit having a plurality of data paths, at least one of the plurality of data paths dedicated to implementing an activation function according to an approximation of a second order polynomial, the second order polynomial having the form: output=$AX^2$+BX+C, where X corresponds to streaming data associated with the activation function, and A, B and C are coefficients of the activation function;
    generating output data with the arithmetic unit, the output data corresponding to an output of the activation function;
    streaming the output data through the reconfigurable stream switch; and
    identifying at least one feature in the input data based on information in the stream of output data.

12. The method according to claim 11 wherein the activation function is configurable from a group that includes a binary step function, a soft-step function, a hyperbolic tangent function, an arc-tangent function, a rectified linear unit (ReLU) function, a parametric ReLU function, an exponential linear unit function, and a soft-plus function.

13. The method according to claim 11 wherein the activation function is performed as part of a deep convolutional neural network procedure.

14. The method according to claim 13 wherein the input data is image sensor data.

15. The method according to claim 14, comprising:
    defining a feature volume in the image sensor data, the feature volume having a feature volume height, a feature volume width, and a feature volume depth;
    defining an input tile having an input tile height, an input tile width, and an input tile depth; and
    walking the input tile through the feature volume in an algorithmically configurable pattern.

16. The method according to claim 11 wherein at least one of the plurality of data paths is dedicated to implementing a rectified linear unit (ReLU) function, the method comprising:
    generating output data corresponding to an output of the ReLU function.

17. A system, comprising:
    memory;
    an applications processor;
    a digital signal processor (DSP) cluster;
    a configurable accelerator framework (CAF); and
    at least one communication bus architecture communicatively coupling the applications processor, the DSP cluster, and the CAF to the memory, wherein the CAF includes:
        a reconfigurable stream switch; and an arithmetic unit, the arithmetic unit having:
- at least one input coupled to the reconfigurable stream switch and arranged to receive streaming data passed through the reconfigurable stream switch;
- at least one output coupled to the reconfigurable stream switch and arranged to stream resultant data through the reconfigurable stream switch; and
- a plurality of data paths, at least one of the plurality of data paths dedicated to implementing an activation function according to an approximation of a second order polynomial, the second order polynomial having the form: output=$AX^2+BX+C$, where X corresponds to streaming data associated with the activation function, and A, B and C are coefficients of the activation function.

18. The system according to claim 17, comprising:
an integrated circuit package that contains the memory, the applications processor, the DSP cluster, the CAF, and the at least one communication bus architecture.

19. The system according to claim 17, comprising:
a power manager circuit, the power manager circuit electrically coupleable to a battery.

20. The system according to claim 17 wherein the system is a mobile device.

\* \* \* \* \*